United States Patent
Esenlik et al.

(10) Patent No.: US 10,992,944 B2
(45) Date of Patent: *Apr. 27, 2021

(54) IMAGE DECODING METHOD, IMAGE CODING METHOD, IMAGE DECODING APPARATUS, IMAGE CODING APPARATUS, AND IMAGE CODING AND DECODING APPARATUS

(71) Applicant: Sun Patent Trust, New York, NY (US)

(72) Inventors: Semih Esenlik, Nazilli (FR); Matthias Narroschke, Schaafheim (DE); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,359

(22) Filed: Jul. 9, 2019

(65) Prior Publication Data
US 2019/0335188 A1 Oct. 31, 2019

Related U.S. Application Data

(63) Continuation of application No. 15/915,489, filed on Mar. 8, 2018, now Pat. No. 10,397,593, which is a
(Continued)

(51) Int. Cl.
*H04N 19/44* (2014.01)
*H04N 13/189* (2018.01)
(Continued)

(52) U.S. Cl.
CPC ........... *H04N 19/44* (2014.11); *H04N 13/189* (2018.05); *H04N 19/11* (2014.11); *H04N 19/119* (2014.11);
(Continued)

(58) Field of Classification Search
CPC .... H04N 19/44; H04N 13/189; H04N 19/119; H04N 19/167; H04N 19/17; H04N 19/11;
(Continued)

(56) References Cited

U.S. PATENT DOCUMENTS 9,602,825 B2 3/2017 Esenlik
9,948,942 B2 4/2018 Esenlik
(Continued)

FOREIGN PATENT DOCUMENTS

JP 2013-098735 5/2013
WO 2013/067311 5/2013

OTHER PUBLICATIONS

Gordon Clare et al., "Wavefront Parallel Processing for HEVC Encoding and Decoding", Joint Collaborative Team on Video Coding (JCT-VC) of ITU-T SG16 WP3 and ISO/IEC JTC1/SC29/WG11, JCTVC-F274, Ver.2, 6th Meeting: Torino, IT, Jul. 14-22, 2011.

(Continued)

*Primary Examiner* — Joseph G Ustaris
*Assistant Examiner* — Jill D Sechser
(74) *Attorney, Agent, or Firm* — Wenderoth, Lind & Ponack, L.L.P.

(57) ABSTRACT

An image decoding method for decoding a bitstream including a coded signal resulting from coding tiles and slices into which an image is partitioned, the method including decoding the coded signal, wherein each of the slices is either a normal slice having, in a header, information used for an other slice or a dependent slice which is decoded using information included in a slice header of another slice, and when the normal slice starts from a position other than a beginning of a first tile, a second tile coded next to the first tile does not start from the dependent slice.

1 Claim, 43 Drawing Sheets

Related U.S. Application Data continuation of application No. 15/394,998, filed on Dec. 30, 2016, now Pat. No. 9,948,942, which is a continuation of application No. 15/003,351, filed on Jan. 21, 2016, now Pat. No. 9,602,825, which is a continuation of application No. 14/682,298, filed on Apr. 9, 2015, now Pat. No. 9,277,229, which is a continuation of application No. 14/031,169, filed on Sep. 19, 2013, now Pat. No. 9,036,697.

(60) Provisional application No. 61/705,891, filed on Sep. 26, 2012.

(51) Int. Cl.

| | |
|---|---|
| *H04N 19/597* | (2014.01) |
| *H04N 19/176* | (2014.01) |
| *H04N 19/46* | (2014.01) |
| *H04N 19/61* | (2014.01) |
| *H04N 19/436* | (2014.01) |
| *H04N 19/174* | (2014.01) |
| *H04N 19/11* | (2014.01) |
| *H04N 19/136* | (2014.01) |
| *H04N 19/192* | (2014.01) |
| *H04N 19/119* | (2014.01) |
| *H04N 19/167* | (2014.01) |
| *H04N 19/17* | (2014.01) |

(52) U.S. Cl.
CPC ......... *H04N 19/136* (2014.11); *H04N 19/167* (2014.11); *H04N 19/17* (2014.11); *H04N 19/174* (2014.11); *H04N 19/176* (2014.11); *H04N 19/192* (2014.11); *H04N 19/436* (2014.11); *H04N 19/46* (2014.11); *H04N 19/597* (2014.11); *H04N 19/61* (2014.11)

(58) Field of Classification Search
CPC .. H04N 19/136; H04N 19/192; H04N 19/597; H04N 19/176; H04N 19/46; H04N 19/61; H04N 19/436; H04N 19/174
See application file for complete search history.

(56) References Cited

U.S. PATENT DOCUMENTS

| | | | | |
|---|---|---|---|---|
| 10,397,593 | B2* | 8/2019 | Esenlik | .................. H04N 19/17 |
| 2012/0106624 | A1 | 5/2012 | Huang | |
| 2012/0163452 | A1 | 6/2012 | Horowitz | |
| 2012/0183074 | A1* | 7/2012 | Fuldseth | .............. H04N 19/436 |
| | | | | 375/240.24 |
| 2012/0230428 | A1* | 9/2012 | Segall | .................. H04N 19/129 |
| | | | | 375/240.25 |
| 2013/0107971 | A1 | 5/2013 | Okawa | |
| 2013/0114735 | A1 | 5/2013 | Wang | |
| 2013/0114736 | A1 | 5/2013 | Wang et al. | |
| 2016/0142724 | A1 | 5/2016 | Esenlik | |

OTHER PUBLICATIONS

Sung-Chang Lim et al., "CE4 Subtest2: Cross-check report of Sony's proposal JCTVC-F420 (tests 2.3.d and 2.3.e) by ETRI", Joint Collaborative Team on Video Coding (JCT-VC) of ITU-T SG16 WP3 and ISO/IEC JTC1/SC29/WG11, JCTVC-F355, Ver.1, 6th Meeting: Torino, Jul. 14-22, 2011.

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, Ver.8, 10th Meeting: Stockholm, SE, Jul. 11-20, 2012.
International Search Report dated Nov. 26, 2013 in International (PCT) Application No. PCT/JP2013/005269.
T. Schierl, Dependent Slices, Joint Collaborative Team on Video Coding (JCT-VC) of ITU-T SG 16 WP 3 and ISO/IEC JTC 1/SC 29/WG 11, JCTVC I0229r1, 9th Meeting: Geneva, CH, Apr. 2012, pp. 1-8.
Tammy Lee and Jeonghoon Park, on dependent slices, Joint Collaborative Team on Video Coding (JCT-VC) of ITU-T SG 16 WP 3 and ISO/IEC JTC 1/SC 29/WG 11, JCTVC-J0217_r1, 10th Meeting: Stockholm, SE, Jul. 2012, pp. 1-7.
Muhammed Coban and Ye-Kui Wang, on tiles and wavefront parallel processing, Joint Collaborative Team on Video Coding (JCT-VC) of ITU-T SG 16 WP 3 and ISO/IEC JTC 1/SC 29/WG 11, JCTVC-J0123, 10th Meeting: Stockholm, SE, Jul. 2012, pp. 1-6.
M. Alvarez-Mesa et al., Parallel video decoding in the emerging HEVC standard, 2012 IEEE International Conference on Acoustics, Speech and Signal Processing (ICASSP), Mar. 2012, pp. 1545-1548.
Semih Esenlik et al., AHG4: Dependent slices restriction, Joint Collaborative Team on Video Coding (JCT-VC) of ITU-T SG 16 WP 3 and ISO/IEC JTC 1/SC 29/WG 11, JCTVC-K0183, 11th Meeting: Shanghai, CN, Oct. 2012, pp. 1-6.
Minhua Zhou, AHG4: Enable parallel decoding With tiles, Joint Collaborative Team on Video Coding (JCT-VC) of ITU-T SG16 WP3 and ISO/IEC JTC1/SC29/WG11, $9^{th}$ Meeting: Geneva, Switzerland, May 2012, JCTVC-I0118, pp. 1-9.
Sullivan et al., "Overview of the High Efficiency Video Coding (HEVC) Standard", Dec. 2012.
Pourazad et al., "HEVC: The New Gold Standard for Video Compression", Jul. 2012.
Schierl et al., "RTP Payload Format for High Efficiency Coding", Oct. 2012.
Extended European Search Report dated Sep. 25, 2015 in corresponding European Application No. 13842930.3.
Tammy Lee et al., "On dependent slices", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, Document: JCTVC-J0217, Jul. 2, 2012, XP030112579.
T. Schierl et al., "Dependent Slices", Joint Collaborative Team on Video Coding (JCT-VC) of ITU-T SG16 WP3 and ISO/IEC JTC1/SC29/WG11, $9^{th}$ Meeting: Geneva, CH, Apr. 27-May 7, 2012, Document: JCTVC-I0229, Apr. 16, 2012, XP030111992.
Benjamin Bross et al., "High efficiency Video coding (HEVC) text specification draft 8", Joint Collaborative Team on Video Coding (JCT-VC) of ITU-T SG16 WP3 and ISO/IEC JTC1/SC29/WG11, $10^{th}$ Meeting: Stockholm, SE, Jul. 11-20, 2012, Document: JCTVC-J1003_d0, Jul. 23, 2012, XP030112947.
Muhammed Coban et al., "On tiles and wavefront parallel processing", Joint Collaborative Team on Video Coding (JCT-VC) of ITU-T SG16 WP3 and ISO/IEC JTC1/SC29/WG11, $10^{th}$ Meeting: Stockholm, SE, Jul. 11-20, 2012, Document JCTVC-J0123, Jul. 3, 2012, XP030112485.
Rickard Sjoberg et al., "Overview of HEVC high-level syntax and reference picture management", IEEE Transactions on Circuits and Systems for Video Technology, Jan. 1, 2012, XP055045360.
Office Action dated Oct. 12, 2016 in Australian Patent Application No. 2013322041.
Sullivan et al. "Video Compression—From Concepts to the H.264/AVC Standard", Proceedings of the IEEE, Vol. 93, No. 1 Jan. 2005.
Jill M. Boyce, "Weighted Prediction in the H.264/MPEG AVC Video Coding Standard," ISCAS 2004.

* cited by examiner

FIG. 5

| slice_header(){ | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| silice_address | u(v) |
| if( dependent_slice_enabled_flag && !first_slice_in_pic_flag ) | |
| dependent_slice_flag | u(1) |
| if( dependent_slice_flag==0 ){ slice header info } | |
| if( tiles_or_entropy_coding_sync_idc == 1 \|\| tiles_or_entropy_coding_sync_idc == 2 ){ | |
| num_entry_point_offsets | ue(v) |
| if( num_entry_point_offsets > 0 ){ | |
| offset_len_minus1 | ue(v) |
| for( i = 0; i < num_entry_point_offsets; i++ ) | |
| entry_point_offset [i] | u(v) |
| } | |
| } | |

320

321

Dependent slice flag

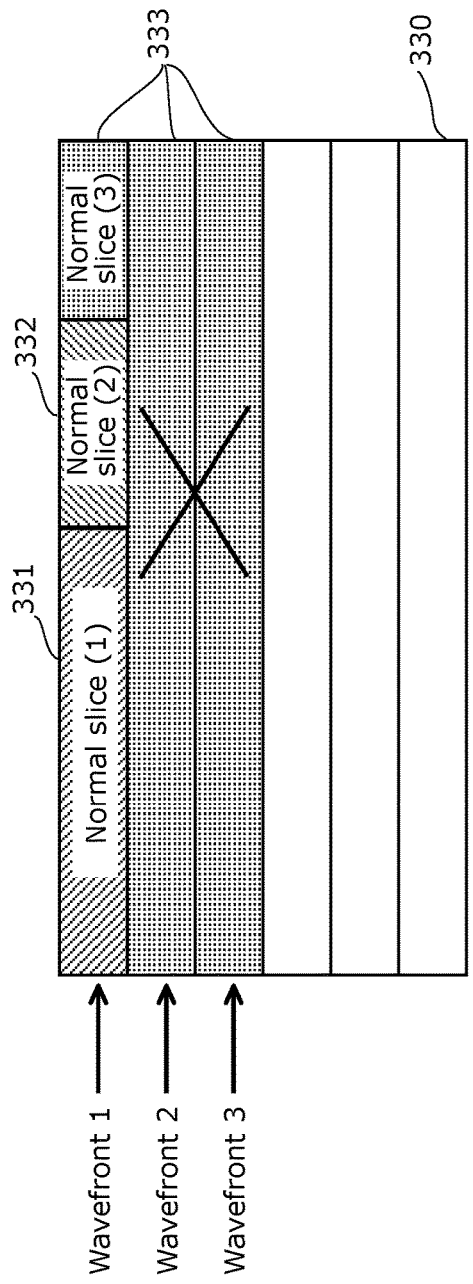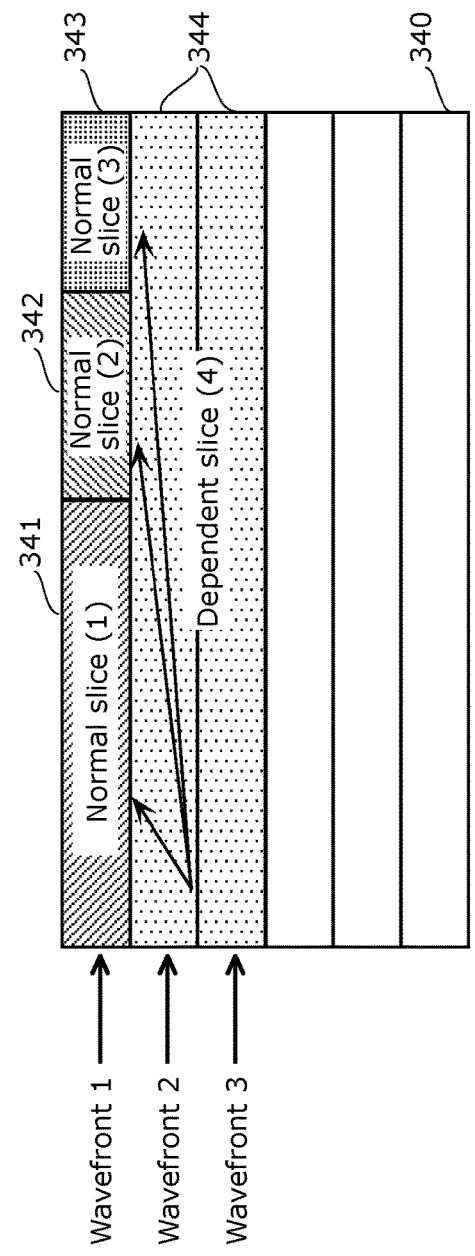

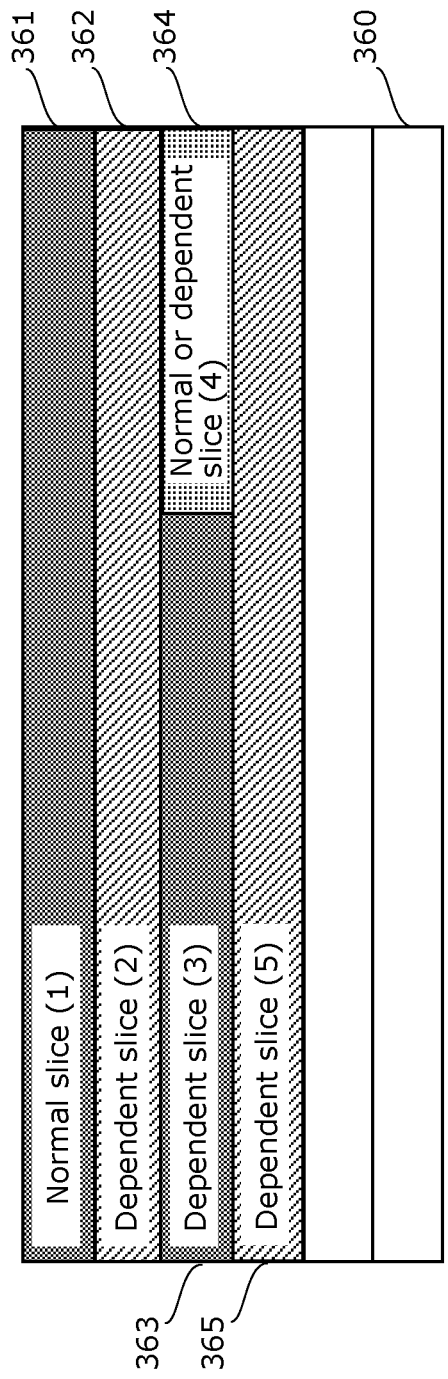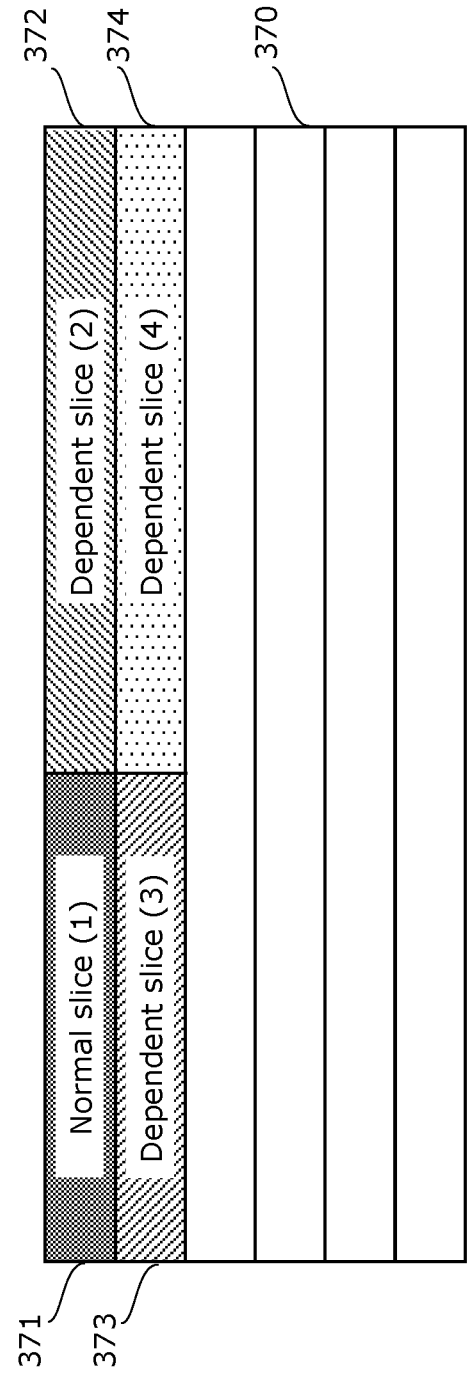

FIG. 12

| | Descriptor |
|---|---|
| Slice_header(){ | |
| first_slice_in_pic_flag = 0 | u(1) |
| Pic_parameter_set_id | ue(v) |
| if( !first_slice_in_pic_flag ) | |
| slice_address | u(v) |
| if( dependent_slice_enabled_flag && !first_slice_in_pic_flag ) | |
| dependent_slice_flag | u(1) |
| if( dependent_slice_flag == 1 && entropy_coding_sync_enabled_flag == 1 && slice_address % PicWidthInCtbsY == 0 ) | |
| entropy_default_initialization_flag | u(1) |
| if( dependent_slice_flag == ) ({ slice header info } | |
| if( tiles_or_entropy_coding_sync_idc == 1 \|\| tiles_or_entropy_coding_sync_idc == 2 ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset[i] | u(v) |
| } | |
| } | |

381 brackets: dependent_slice_flag, entropy_default_initialization_flag
380: entire table

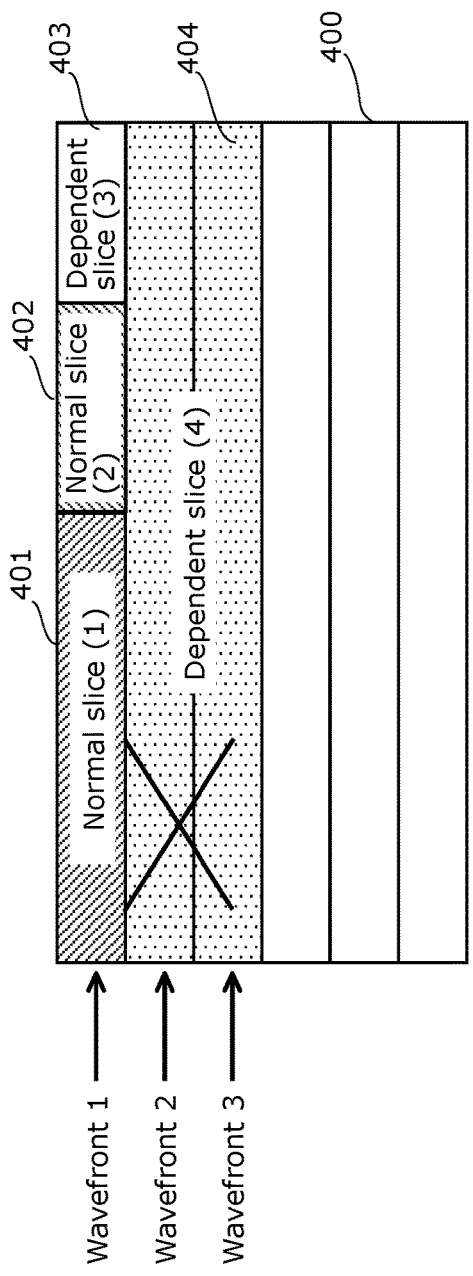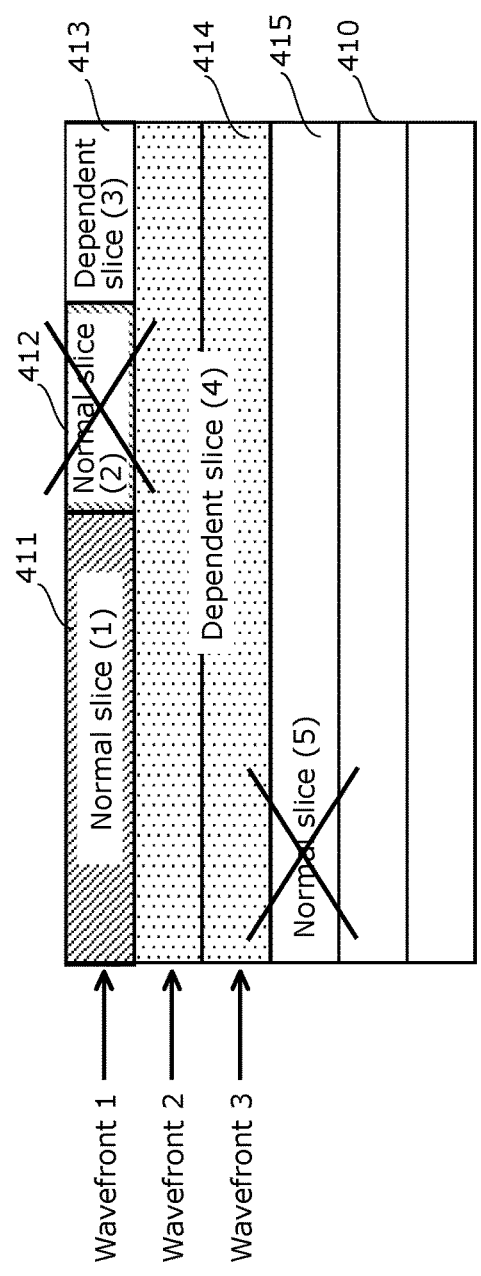

FIG. 19

| slice_header() { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( dependent_slice_flag==0 ){ slice header info } | |
|   if( tiles_or_entropy_coding_sync_idc == 1 \|\| | |
|     tiles_or_entropy_coding_sync_idc == 2 ){ | |
|     num_entry_point_offsets | ue(v) |
|     if( num_entry_point_offsets > 0 ){ | |
|       offset_len_minus1 | ue(v) |
|       for( i = 0; i < num_entry_point_offsets; i++ ) | |
|         entry_point_offset [i] | u(v) |
|     } | |
| } | |

← Dependent slice flag

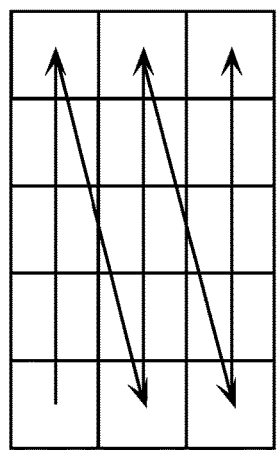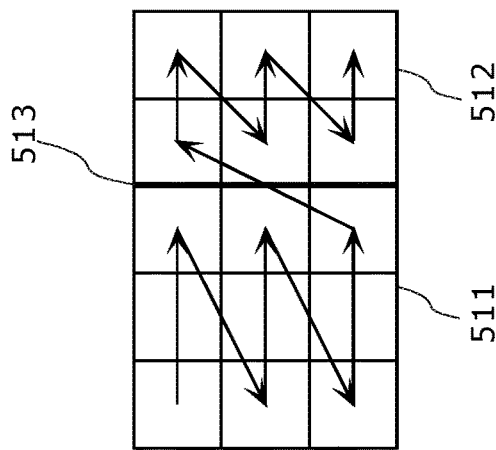

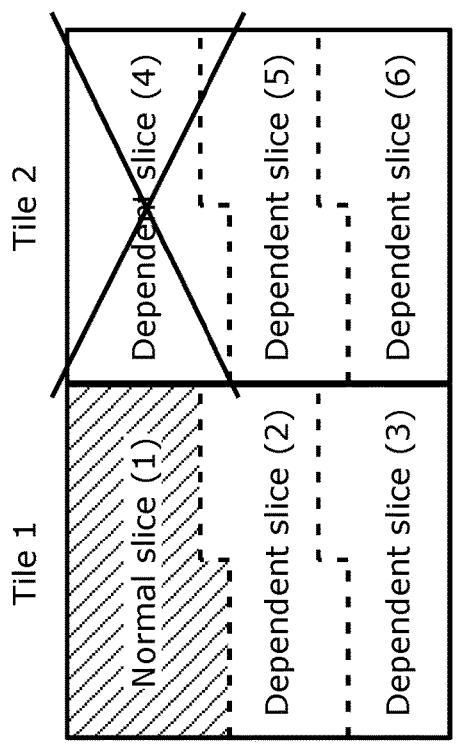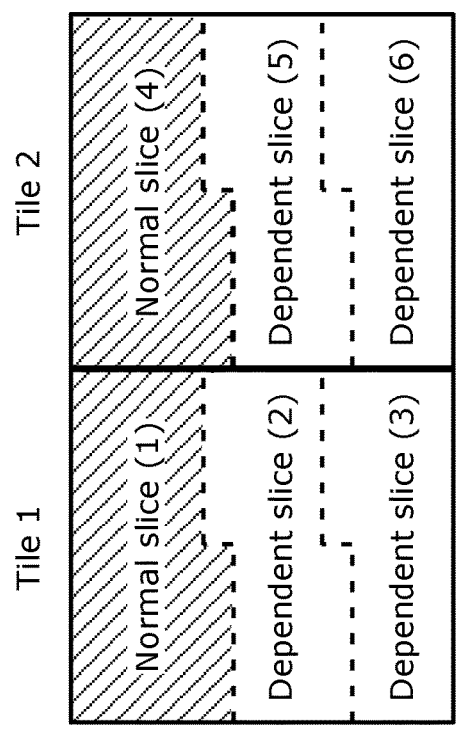

FIG. 34

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 37
Stream of TS packets
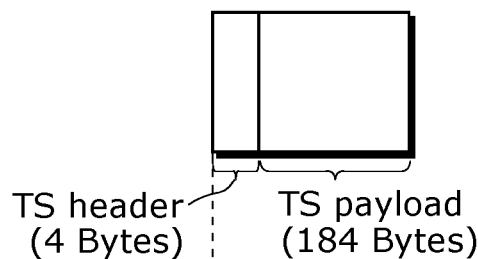
TS header (4 Bytes)  TS payload (184 Bytes)
Stream of source packets
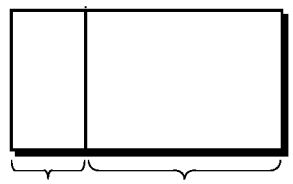
TP_extra_header (4 Bytes)  TS packet (188 Bytes)
Multiplexed data
SPN 0 1 2 3 4 5 6 7 ···
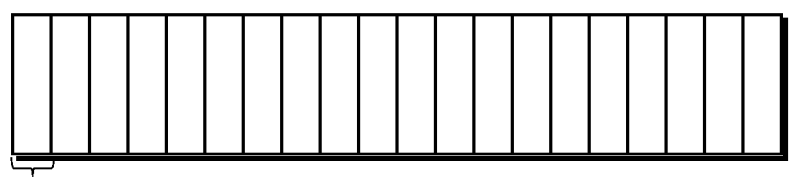
Source packet Data structure of PMT

FIG. 45

| Corresponding standard | Driving frequency |
|---|---|
| MPEG-4 AVC | 500 MHz |
| MPEG-2 | 350 MHz |
| ⋮ | ⋮ |

IMAGE DECODING METHOD, IMAGE CODING METHOD, IMAGE DECODING APPARATUS, IMAGE CODING APPARATUS, AND IMAGE CODING AND DECODING APPARATUS

FIELD

One or more exemplary embodiments disclosed herein relate generally to an image coding method and an image decoding method.

BACKGROUND

At present, the majority of standardized video coding algorithms are based on hybrid video coding. Hybrid video coding methods typically combine several different lossless and lossy compression schemes in order to achieve the desired compression gain. The hybrid video coding is also the basis for ITU-T standards (H.26x standards such as H.261 and H.263) as well as ISO/IEC standards (MPEG-X standards such as MPEG-1, MPEG-2, and MPEG-4).

The most recent and advanced video coding standard is currently the standard denoted as H.264/MPEG-4 advanced video coding (AVC) which is a result of standardization efforts by Joint Video Team (JVT), a joint team of ITU-T and ISO/IEC MPEG groups.

A video coding standard referred to as High-Efficiency Video Coding (HEVC) is also currently examined by Joint Collaborative Team on Video Coding (JCT-VC) with the purpose of improving efficiency regarding the high-resolution video coding.

CITATION LIST

Non Patent Literature

Non Patent Literature 1: "Wavefront Parallel Processing for HEVC Encoding and Decoding" by C. Gordon et al., no. JCTVC-F274-v2, from the Meeting in Torino, July 2011
Non Patent Literature 2: "Tiles" by A. Fuldseth et al., no. JCTVC-F355-v1, from the Meeting in Torino, July 2011
Non Patent Literature 3: JCTVC-J1003_d7, "High efficiency video coding (HEVC) text specification draft 8" of July 2012

SUMMARY

Technical Problem

There is a desire for improving, in image coding methods and image decoding methods, efficiency in a situation where both parallel tile processing and dependent slices are used.

One non-limiting and exemplary embodiment provides an image coding method and an image decoding method which make it possible to improve the efficiency when the both parallel tile processing and dependent slices are used.

Solution to Problem

In one general aspect, an image decoding method for decoding a bitstream including a coded signal resulting from coding tiles and slices into which an image is partitioned, the method comprising decoding the coded signal, wherein each of the slices is either a normal slice having, in a header, information used for an other slice or a dependent slice which is decoded using information included in a slice header of another slice, and when the normal slice starts from a position other than a beginning of a first tile, a second tile coded next to the first tile does not start from the dependent slice.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

One or more exemplary embodiments or features disclosed herein provide an image coding method and an image decoding method which make it possible to improve efficiency when both parallel tile processing and dependent slices are used.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a diagram showing a slice header of an entropy slice or a dependent slice according to the embodiments.

FIG. 6 is a diagram showing an exemplary non-allowed slice structure when WPP is applied according to the embodiments.

FIG. 7 is a diagram showing an exemplary allowed slice structure when WPP is applied according to the embodiments.

FIG. 10 is a diagram showing an exemplary slice structure according to the embodiments.

FIG. 11 is a diagram showing an exemplary slice structure according to the embodiments.

FIG. 12 is a diagram showing exemplary syntax of a slice header according to Embodiment 1.

FIG. 16 is a diagram showing an exemplary picture partitioned into slices according to Embodiment 2.

FIG. 17 is a diagram showing an exemplary picture partitioned into slices according to Embodiment 2.

FIG. 19 is a diagram showing a slice header according to Embodiment 4.

FIG. 21A is a diagram showing a scanning order according to Embodiment 4.

FIG. 21B is a diagram showing a scanning order according to Embodiment 4.

FIG. 27A is a diagram showing an exemplary non-allowed slice structure according to Embodiment 4.

FIG. 27B is a diagram showing an exemplary allowed slice structure according to Embodiment 4.

FIG. 34 illustrates a structure of multiplexed data.

FIG. 37 shows a structure of TS packets and source packets in the multiplexed data.

FIG. 45 shows an example of a look-up table in which video data standards are associated with driving frequencies.

DESCRIPTION OF EMBODIMENTS (Underlying Knowledge Forming Basis of the Present Disclosure)

In relation to the image coding method and the image decoding method disclosed in the Background Art section, the inventors have found the following problems.

First, an image coding apparatus and an image decoding apparatus in HEVC are described.

A video signal input to an image coding apparatus includes images each referred to as a frame (picture). Each frame includes pixels arranged in a two-dimensional matrix. In all the above-mentioned standards based on the hybrid video coding, each individual frame is partitioned into blocks each including pixels. The size of the blocks may vary, for instance, in accordance with the content of an image. A different coding method may be used on a per block basis. For example, the largest size of the blocks is 64×64 pixels in HEVC. This largest size is referred to as a largest coding unit (LCU). The LCU can be recursively divided into four coding units (CUs).

In H.264/MPEG-4 AVC, coding is performed on a per macroblock (usually 16×16-pixel block) basis. There is a case where the macroblock is divided into subblocks.

Typically, a coding step in hybrid video coding includes spatial and/or temporal prediction. In short, each of current blocks to be coded is predicted using blocks spatially or temporally adjacent to the current block, that is, coded video frames. Next, a residual block that is a difference between the current block and the prediction result is calculated. Next, the residual block is transformed from spatial (pixel) domain to frequency domain. The transformation aims at reducing correlation of an input block.

Next, a transform coefficient resulting from the transformation is quantized. This quantization is lossy compression. Lossless compression is performed on the quantization coefficient thus obtained, using entropy coding. In addition, side information necessary for reconstructing the coded video signal is coded and output with the coded video signal. This information is, for instance, information about spatial prediction, temporal prediction, and/or quantization.

Figure 1:
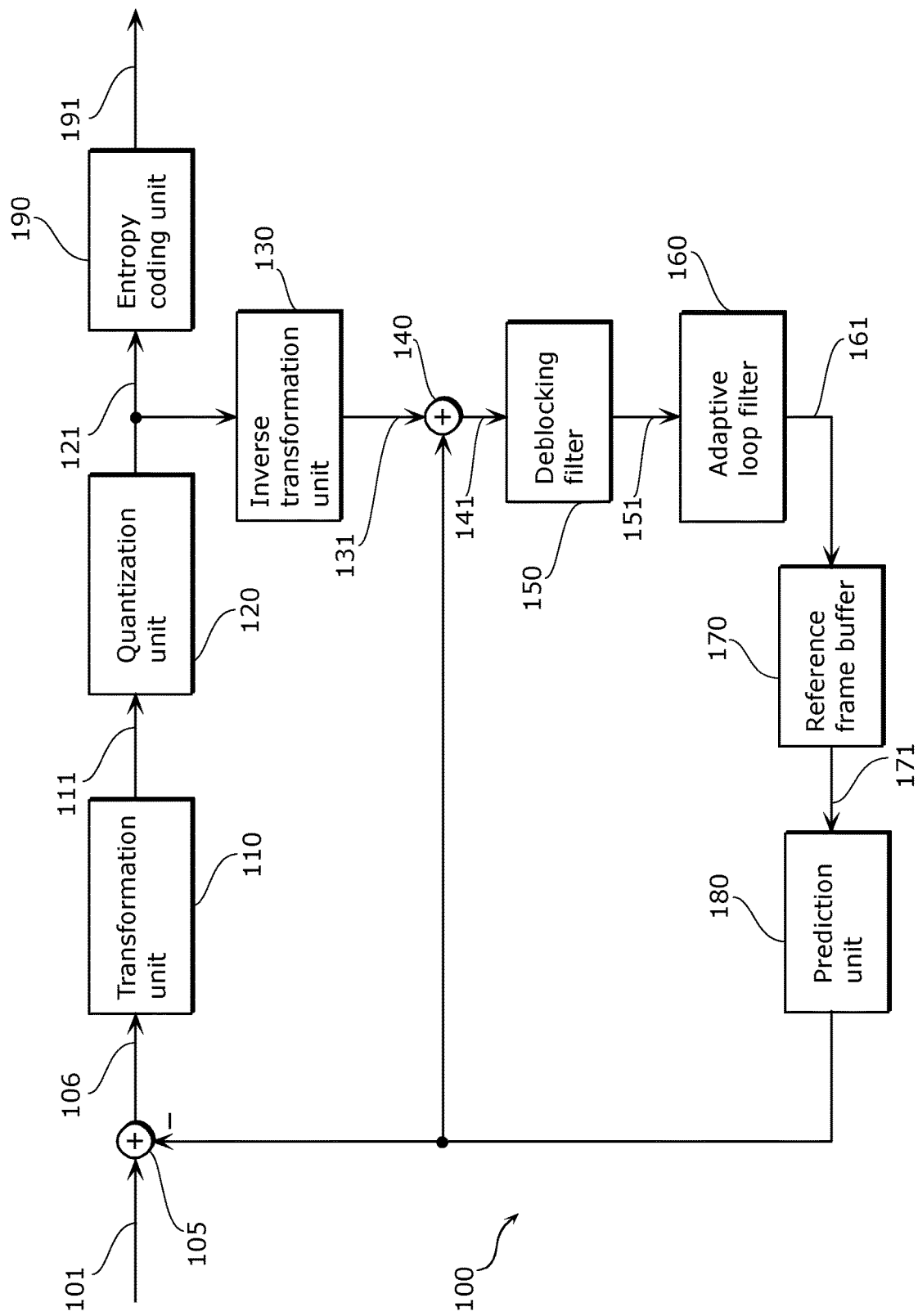
FIG. 1 is a block diagram showing an image coding apparatus according to embodiments.

FIG. 1 is a block diagram showing an exemplary image coding apparatus 100 compliant with H.264/MPEG-4 AVC and/or HEVC.

A subtractor 105 calculates a residual signal 106 (residual block) that is a difference between a current block to be coded of an input image signal 101 and a corresponding prediction signal 181 (prediction block). The prediction signal 181 is generated by temporal prediction or spatial prediction by a prediction unit 180. A type of the prediction can be changed on a per frame or block basis. A block and/or a frame predicted using the temporal prediction is referred to as being inter-coded, and a block and/or a frame predicted using the spatial prediction is referred to as being intra-coded.

A prediction signal used for the temporal prediction is derived using a coded and decoded image stored in a memory. A prediction signal used for the spatial prediction is derived using boundary pixel values of adjacent coded and decoded blocks stored in the memory. In addition, the number of intra-prediction directions is determined according to a size of coding units.

The residual signal 106 is also referred to as a prediction error or a prediction residual. A transformation unit 110 transforms the residual signal 106 to generate a transformation coefficient 111. A quantization unit 120 quantizes the transformation coefficient 111 to generate a quantization coefficient 121. An entropy coding unit 190 performs entropy coding on the quantization coefficient 121, with the purpose of further reduction in an amount of data to be stored and lossless transmission. For example, the entropy coding is variable-length coding. In addition, a length of a code word is determined based on a probability of occurrence of a code.

A coded signal 191 (coded bitstream) is generated through the above processing.

The image coding apparatus 100 includes a decoding unit for obtaining a decoded image signal (reconstructed image signal). Specifically, an inverse transformation unit 130 performs inverse quantization and inverse transformation on the quantization coefficient 121 to generate a residual signal 131. This residual signal 131 is strictly different from the original residual signal 106 due to a quantization error also referred to as quantization noise.

Next, an adder 140 adds the residual signal 131 and the prediction signal 181 to generate a decoded image signal 141. As stated above, to maintain compatibility between the image coding apparatus and the image decoding apparatus, each of the image coding apparatus and the image decoding apparatus generates the prediction signal 181 using the coded and decoded image signal.

With the quantization, the quantization noise is superimposed on the decoded image signal 141. The superimposed noise often differs for each of blocks due to coding performed on a per block basis. With this, when especially strong quantization is performed, block boundaries of the decoded image signal become salient. Such blocking noise causes image quality to appear degraded in human visual recognition. To reduce the blocking noise, a deblocking filter 150 performs deblocking filter processing on the decoded image signal 141.

For instance, in deblocking filter processing in H.264/MPEG-4 AVC, filter processing suitable for each of regions is selected for each region. For example, when blocking noise is large, a strong (narrowband) low-pass filter is used, and when blocking noise is small, a weak (broadband) low-pass filter is used. The intensity of the low-pass filter is determined according to the prediction signal 181 and the residual signal 131. The deblocking filter processing smoothes edges of blocks. With this, subjective image quality of the decoded image signal is enhanced. An image on which filter processing has been performed is used for motion-compensating prediction of the next image. Consequently, this filter processing reduces an prediction error, thereby increasing coding efficiently.

An adaptive loop filter 160 performs sample adaptive offset processing and/or adaptive loop filter processing on a decoded image signal 151 after the deblocking filter processing, to generate a decoded image signal 161. As above, the deblocking filter processing enhances the subjective image quality. In contrast, the sample adaptive offset (SAO) processing and the adaptive loop filter (ALF) processing aim at increasing reliability on a per pixel basis (objective quality).

The SAO is processing for adding an offset value to a pixel according to adjacent pixels. The ALF is used to compensate image distortion caused by compression. For instance, the ALF is a Wiener filter having a filter coefficient determined in a manner that a mean square error (MSE) between the decoded image signal 151 and the input image signal 101 is minimized. For example, a coefficient of the ALF is calculated and transmitted on a per frame basis. Moreover, the ALF may be applied to an entire frame (image) or a local region (block). In addition, side information indicating a region on which filter processing is to be performed may be transmitted on a per block basis, frame basis, or quadtree basis.

To decode an inter-coded block, it is necessary to store, in a reference frame buffer 170, part of a coded and decoded image. The reference frame buffer 170 holds the decoded image signal 161 as a decoded image signal 171. The prediction unit 180 performs inter-prediction using motion-compensating prediction. Specifically, a motion estimator first searches blocks included in a coded and decoded video frame for a block most similar to a current block. This similar block is used as the prediction signal 181. A relative displacement (motion) between the current block and the similar block is transmitted as motion data to the image decoding apparatus. This motion data is, for instance, three-dimensional motion vectors included in side information provided with coded video data. Here, the expression "three-dimensional" includes spatial two dimension and temporal one dimension.

It is to be noted that to optimize prediction accuracy, a motion vector having a spatial sub-pixel resolution such as a half pixel resolution and a quarter pixel resolution may be used. The motion vector having the spatial sub-pixel resolution indicates a spatial location in a decoded frame where no pixel value exists, that is, a location of a subpixel. Thus, it is necessary to spatially interpolate a pixel value to perform motion-compensating prediction. This interpolation is performed by an interpolation filter (included in the prediction unit 180 shown in FIG. 1), for instance.

Both in the intra-coding mode and the inter-coding mode, the quantization coefficient 121 is generated by transforming and quantizing the residual signal 106 that is the difference between the input image signal 101 and the prediction signal 181. Generally, the transformation unit 110 uses, for this transformation, two-dimensional discrete cosine transform (DCT) or orthogonal transformation that is an integer version of the DCT. This efficiently reduces correlation of natural video. In addition, a low-frequency component is generally more important to image quality than a high-frequency component, and thus more bits are used for the low-frequency component than for the high-frequency component.

The entropy coding unit 190 transforms a two-dimensional array of the quantization coefficient 121 into a one-dimensional array. Typically, so-called zigzag scanning is used for this transformation. In the zigzag scanning, a two-dimensional array is scanned in a predetermined order from a DC coefficient at the left top corner of the two-dimensional array to an AC coefficient at the right bottom corner of the same. Energy normally concentrates in coefficients at the left upper part of the two-dimensional array which correspond to a low frequency, and thus when the zigzag scanning is performed, the latter values tend to be zero. With this, it is possible to achieve efficient coding by using Run-length encoding as part of or pre-processing of the entropy coding.

In H.264/MPEG-4 AVC and HEVC, various types of the entropy coding are used. Although the fixed-length coding is performed on some syntax elements, the variable-length coding is performed on most of the syntax elements. In particular, context-adaptive variable-length coding is performed on a prediction residual, and various other types of integer coding are performed on other syntax elements. In addition, there is also a case where context-adaptive binary arithmetic coding (CABAC) is used.

The variable-length coding enables lossless compression of a coded bitstream. However, code words are of variable length, and thus it is necessary to continuously decode the code words. In other words, before a preceding code word is coded or decoded, a following code word cannot be coded or decoded without restarting (initializing) the entropy coding or without separately indicating a location of the first code word (entry point) when decoding is performed.

A bit sequence is coded into one code word by arithmetic coding based on a predetermined probability model. The predetermined probability model is determined based on contents of a video sequence in the case of CABAC. Thus, the arithmetic coding and CABAC are performed more efficiently as a length of a bitstream to be coded is greater. To put it another way, the CABAC applied to the bit sequence is more efficient in a bigger block. The CABAC is restarted at the beginning of each sequence. Stated differently, the probability model is initialized at the beginning of each video sequence with a determined value or a predetermined value.

H.264/MPEG-4, H.264/MPEG-4 AVC, and HEVC include two functional layers, the video coding layer (VCL) and the network abstraction layer (NAL). The video coding layer provides a coding function. The NAL encapsulates information elements into standard units referred to as NAL units, depending on a use such as transmission over a channel or storage into a storage device. The information elements are, for instance, coded prediction error signals or information necessary for decoding a video signal. The information necessary for decoding a video signal is a prediction type, a quantization parameter, a motion vector, and so on.

Each of the NAL units can be classified into: a VCL NAL unit including compressed video data and related information; a non-VCL unit encapsulating additional data such as a parameter set relating to an entire video sequence; and supplemental enhancement information (SEI) for providing additional information usable for increasing decoding accuracy.

For example, the non-VCL unit includes a parameter set. The parameter set refers to a set of parameters relating to coding and decoding of a certain video sequence. Examples of the parameter set include a sequence parameter set (SPS) including parameters relating to coding and decoding of an entire video sequence (picture sequence).

The sequence parameter set has a syntax structure including syntax elements. A picture parameter set (PPS) to be referred to is specified by pic_parameter_set_id, a syntax element included in each slice header. In addition, an SPS to be referred to is specified by seq_parameter_set_id, a syntax element included in the PPS. As above, the syntax elements included in the SPS are applied to the entire coded video sequence.

The PPS is a parameter set that defines parameters applied to coding and decoding of one picture included in a video sequence. The PPS has a syntax structure including syntax elements. The picture parameter set (PPS) to be referred to is specified by pic_parameter_set_id, a syntax element included in each slice header. As above, the syntax elements included in the SPS are applied to an entire coded picture.

Therefore, it is easier to keep track of the SPS than the PPS. This is because the PPS changes for each picture, whereas the SPS stays constant for the entire video sequence that may last for several minutes or several hours.

A VPS is parameters in the highest layer, and includes information relating to video sequences. The information included in the VPS is a bit rate, a temporal_layering structure of the video sequences, and so on. In addition, the VPS includes information about a dependency between layers (dependency between different video sequences). As a result, the VPS can be considered as information about the video sequences, and an outline of each of the video sequences can be obtained based on the VPS.

Figure 2:
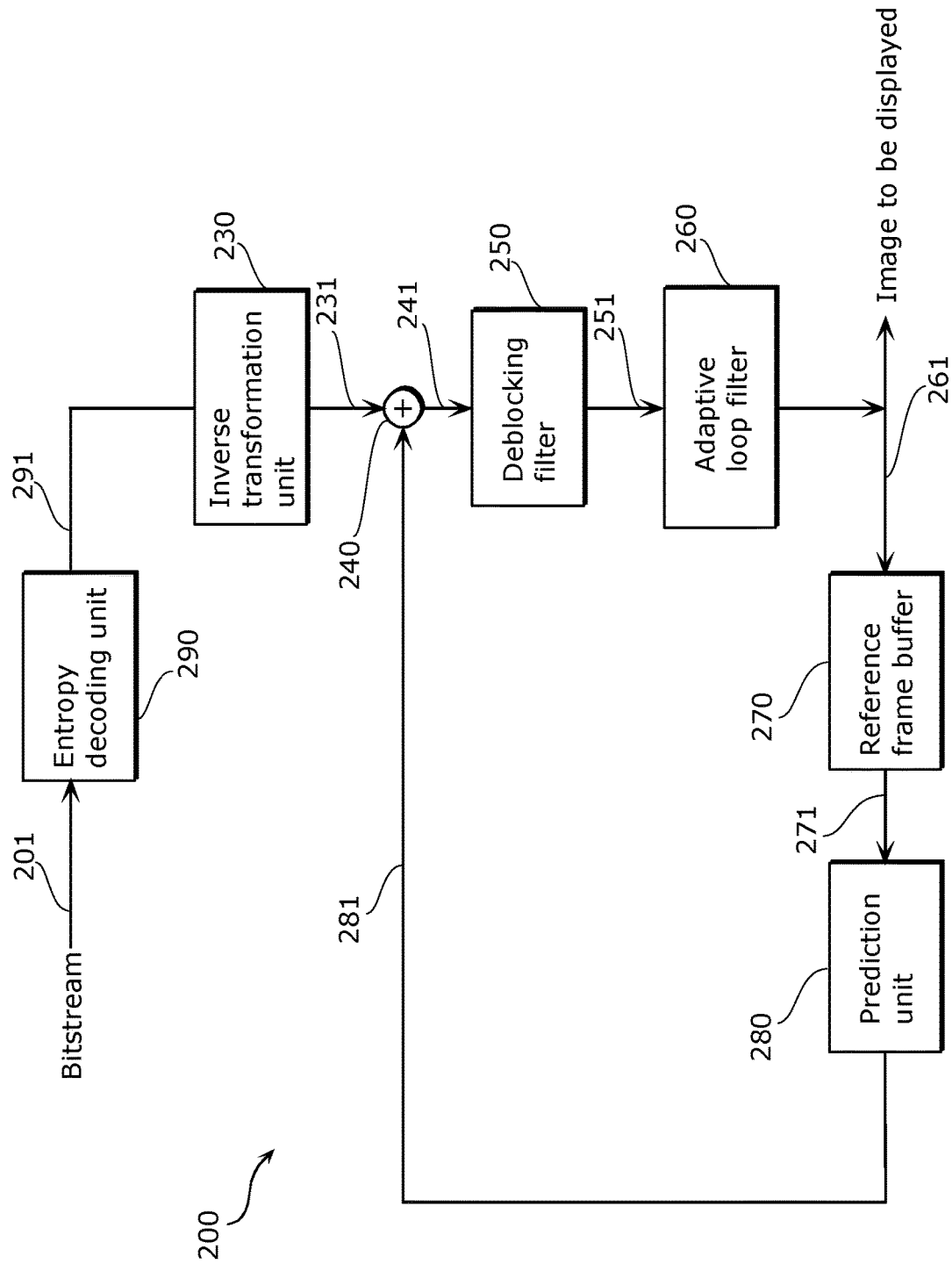
FIG. 2 is a block diagram showing an image decoding apparatus according to the embodiments.

FIG. 2 is a block diagram showing an exemplary image decoding apparatus 200 compliant with H.264/MPEG-4 AVC or HEVC video coding standard.

A coded signal 201 (bitstream) input to the image decoding apparatus 200 is transmitted to an entropy decoding unit 290. The entropy decoding unit 290 decodes the coded signal 201 to obtain a quantization coefficient and information elements necessary for decoding such as motion data and a prediction mode. In addition, the entropy decoding unit 290 inversely scans the obtained quantization coefficient with the purpose of obtaining a two-dimensional array, to generate a quantization coefficient 291, and outputs the quantization coefficient 291 to an inverse transformation unit 230.

The inverse transformation unit 230 inversely quantizes and transforms the quantization coefficient 291 to generate a residual signal 231. The residual signal 231 corresponds to a difference obtained by subtracting a prediction signal from an input image signal that has no quantization noise and error and is input to an image coding apparatus.

A prediction unit 280 generates a prediction signal 281 using temporal prediction or spatial prediction. Normally, decoded information elements further include information such as a prediction type in the case of the intra-prediction, or information necessary for prediction such as motion data in the case of the motion-compensating prediction.

An adder 240 adds the residual signal 231 in a spatial domain and the prediction signal 281 generated by the prediction unit 280, to generate a decoded image signal 241. A deblocking filter 250 performs deblocking filter processing on the decoded image signal 241 to generate a decoded image signal 251. An adaptive loop filter 260 performs sample adaptive offset processing and adaptive loop filter processing on the decoded image signal 251, to generate a decoded image signal 261. The decoded image signal 261 is output as a display image and stored as a decoded image signal 271 in a reference frame buffer 270. The decoded image signal 271 is used for a subsequent block or temporal or spatial prediction of an image.

Compared to H.264/MPEG-4 AVC, HEVC has a function to assist advance parallel processing of coding and decoding. As with H.264/MPEG-4 AVC, HEVC enables partitioning of a frame into slices. Here, each of the slices includes consecutive LCUs in a scanning order. In H.264/MPEG-4 AVC, each slice is decodable, and spatial prediction is not performed between the slices. Thus, it is possible to perform the parallel processing on a per slice basis.

However, the slice has a considerably large header, and there is no dependency between the slices, thereby decreasing compression efficiency. In addition, when the CABAC is performed on a small data block, the efficiency of the CABAC is decreased.

In response to this, wavefront parallel processing (WPP) has been proposed to allow more efficient parallel processing. In the WPP, a probability model after the second LCU in a previous row is processed is used as a CABAC probability model used to reset the first LCU (lead LCU) in each of LCU rows (hereinafter, simply also referred to as "rows") of a picture. This maintains a dependency between blocks. Thus, it is possible to decode the LCU rows in parallel. In addition, processing of each row is delayed by two LCUs relative to the previous row.

Information indicating an entry point, a position at which decoding of an LCU row is started, is signaled in a slice header. It is to be noted that Non Patent Literature (NPL) 1 describes the details of the WPP.

A method for using a tile is available as another approach for enhancing parallelization. A frame (picture) is partitioned into tiles. Each of the tiles is rectangular and includes LCUs. Boundaries between the tiles are set to partition the picture into matrices. In addition, the tiles are processed in a raster scanning order.

All dependencies are lost at the boundary of each tile. The entropy coding such as the CABAC is reset at the beginning of the tile. It is to be noted that only the deblocking filter processing and the sample adaptive offset processing are applied over the boundaries between the tiles. Thus, it is possible to code or decode the tiles in parallel. It is to be noted that Non Patent Literature (NPL) 2 and Non Patent Literature (NPL) 3 describe the details of the tiles.

Moreover, the concepts of dependent slice and entropy slice have been proposed to make the concept of slice suitable more for parallelization than for error resilience, the original purpose of slices in H.264/MPEG-4 AVC. In other words, the following three types of slices are used in HEVC: a normal slice, a dependent slice, and an entropy slice.

The normal slice is a slice already known from H.264/MPEG-4 AVC. The spatial prediction cannot be performed between normal slices. In short, prediction cannot be performed over boundaries between slices. To put it another way, the normal slice is coded without referring to another slice. The CABAC is restarted at the beginning of each slice to allow separate decoding of the slice.

The normal slice is used for the beginning of a frame. Stated differently, each frame must start from the normal slice. The normal slice has a header including parameters necessary for decoding slice data.

The entropy slice is a slice that enables the spatial prediction between a parent slice and the entropy slice, for instance. Here, the parent slice is a normal slice preceding the entropy slice. The parent slice and the entropy slice are parsed independently.

The slice data is parsed independently of the parent slice and the entropy slice except syntax elements of a slice header. In other words, CABAC decoding of the entropy slice requires syntax elements included in a slice header of the parent slice. For example, the syntax elements include switch information indicating whether the slice data includes filtering parameters. When the slice data includes the filtering parameters, a CABAC decoding unit extracts the switch information. Otherwise, the CABAC decoding unit does not assume filtering data. To put it another way, after parsing a slice header of the normal slice, the CABAC decoding unit is capable of processing the parent slice and the entropy slice in parallel.

However, the parent slice may be, for instance, the normal slice, and is required for reconstructing pixel values of the entropy slice. In addition, the CABAC is restarted at the beginning of the slice to allow the independent parsing of the entropy slice.

A slice header shorter than the slice header of the normal slice can be used for the entropy slice. The slice header includes a coding parameter subset regarding information transmitted within the slice header of the normal slice. Information not included in the slice header of the entropy slice is copied from the slice header of the parent slice.

The dependent slice is similar to an entropy slice for which the CABAC is not restarted. The restarting of the CABAC includes an initializing process in which a context table (probability table) is initialized to a default value, and a termination process (terminate process) in the arithmetic coding or arithmetic decoding.

The slice header of the parent slice is used to parse and/or decode the dependent slice. Since the dependent slice cannot be parsed without the parent slice, when the parent slice is not obtained, the dependent slice cannot be decoded. The parent slice is usually a slice preceding the dependent slice in coding order and including a complete slice header. The same holds true for a parent slice of the entropy slice.

Generally, the entropy slice can be considered as depending on header parameters of another slice, and thus the present disclosure can be applied to both the dependent slice and the entropy slice.

As described above, the dependent slice and the entropy slice use the slice header (the information not included in the slice header of the dependent slice) of the preceding slice in coding order of the slices. This rule is recursively applied. It is recognized that a parent slice on which a target dependent slice depends is referable. Referring includes use of the spatial prediction between slices, a common CABAC state, and so on. The dependent slice uses a CABAC context table generated at the end of the preceding slice. In this way, the dependent slice continuously uses the generated table without initializing a CABAC table to a default value. NPL 3 describes the entropy slice and the dependent slice (see "dependent_slice_flag" on page 73, for instance).

In the case of using the WPP, when a dependent slice starts at the beginning of an LCU row and a slice including an LCU located to the upper right of the beginning of the LCU row is indicated as being referable, the dependent slice uses a CABAC context table of the LCU.

HEVC presents several profiles. A profile includes settings of an image coding apparatus and an image decoding apparatus suitable for a particular application. For instance, a "main profile" includes only normal slices and dependent slices, but not entropy slices.

As stated above, a coded slice is encapsulated into a NAL unit, further encapsulated into, for example, a real time protocol (RTP), and finally encapsulated into an internet protocol (IP) packet. This protocol stack or another protocol stack allows transmission of coded video in the Internet or a packet-oriented network such as a proprietary network.

Typically, a network includes at least one router, and the router includes dedicated hardware that operates at ultrahigh speed. The router receives IP packets, parses their headers, and appropriately forwards the IP packets to their respective destinations. The router is required to process communication from many sources, and thus packets that control logic must be as simple as possible. The router at least needs to check destination address fields included in the IP headers, to determine paths through which the IP packets are forwarded. A smart (media-aware) router additionally checks dedicated fields in network protocol headers such as the IP headers, RTP headers, and NALU headers, to further provide support for the quality of service (QoS).

As is clear from the above description of the video coding, the different types of slices defined for the parallel processing such as the dependent slice and the entropy slice differ in significance for image degradation when data are lost. The dependent slice cannot be parsed and decoded without the parent slice. This is because an entropy coding unit or an entropy decoding unit cannot be restarted at the beginning of the dependent slice. Thus, the parent slice can be said to be more important in reconstructing an image or video than the parent slice.

In HEVC, the dependent slice and the entropy slice have a dependency between slices (dependency within a frame) as an additional aspect of the dependency. This dependency is not the only dependency within the frame.

Since parallel processing of slices is performed for each tile, contexts of an arithmetic coding unit and an arithmetic decoding unit are determined by default settings or coded or decoded slices. However, a dependency of a header and a dependency of arithmetic coding initialization are different from each other, and thus there is a possibility of delay or further complexity in contradiction to the purposes of the parallel processing and a dependent slice mechanism.

The dependent slice can be used in conjunction with a parallel processing tool such as the WPP and tiles. In addition, a wavefront (substream) that makes it possible to reduce transmission delay without causing coding loss can be generated using the dependent slice.

The CABAC is not restarted for the dependent slice, and thus the dependent slice can be used as an entry point of a CABAC substream. In addition, to indicate an entry point for independent parsing, information indicating the entry point may be signaled in a bitstream. In particular, when two or more CABAC substreams are encapsulated into a normal slice or a dependent slice, an entry point is signaled explicitly using the number of bytes for each substream. Here, the substream indicates a portion of a stream separately parsable based on the entry point. Moreover, each dependent slice requires a header of a NAL unit, and thus the dependent slice can be used as a "marker" of an entry point. In short, the entry point corresponding to such a marker can be signaled.

It is possible to simultaneously use a method for explicitly signaling an entry point and a method for marking an entry point through a dependent slice. Here, there is a need to identify an entry point of each NAL unit (beginning of each NAL header). It is to be noted that any method can be used for the identification method. For example, the following two methods can be used.

The first method is inserting a start code of 3 bytes at the beginning of each NAL header, for instance. The second method is packetizing each NAL unit into a different packet. In addition, a size of a slice header may be reduced due to the dependency of the slice.

These methods allow parallel CABAC parsing of an entropy slice. This is because the CABAC is always restarted at the beginning of the entropy slice. In parallel processing of the CABAC, a bottleneck can be overcome by the parallel CABAC parsing after consecutive pixel reconstruction processing. Specifically, with a WPP parallelization tool, decoding of each LCU row can be achieved by one processing core. It is to be noted that different LCU rows may be assigned to respective cores. For example, two rows may be assigned to one core, or one row may be assigned to two cores.

Figure 3A:
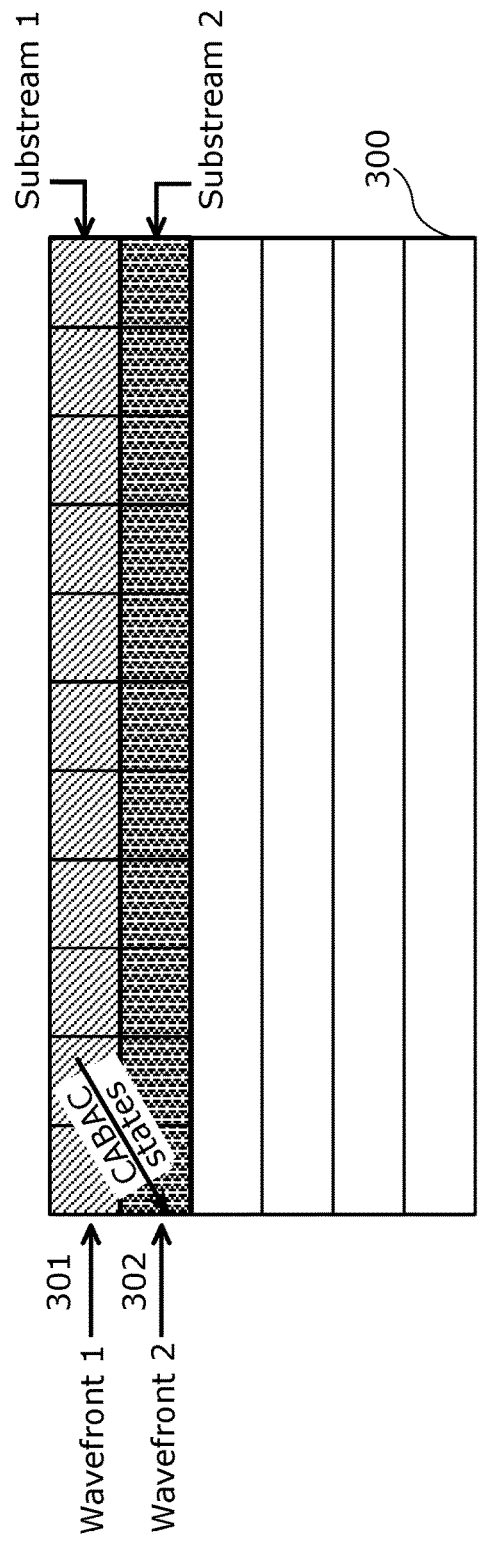
FIG. 3A is a schematic diagram for illustrating WPP according to the embodiments.

FIG. 3A is a diagram showing a picture 300 partitioned into rows. Each of the rows includes largest coding units (LCUs). A row 301 (Wavefront 1) and a row 302 (Wavefront 2) are processed in parallel. As shown by an arrow of CABAC states in FIG. 3A, after the first two LCUs are decoded in the row 301, processing of the row 302 is started. In addition, CABAC states after the first two LCUs of the row 301 are coded or decoded are used for CABAC initialization of the row 302. Thus, the processing of the row 302 can be started after the processing of the first two LCUs of the row 301 is finished. In short, the delay of the two LCUs exists between the two processing cores.

Figure 3B:
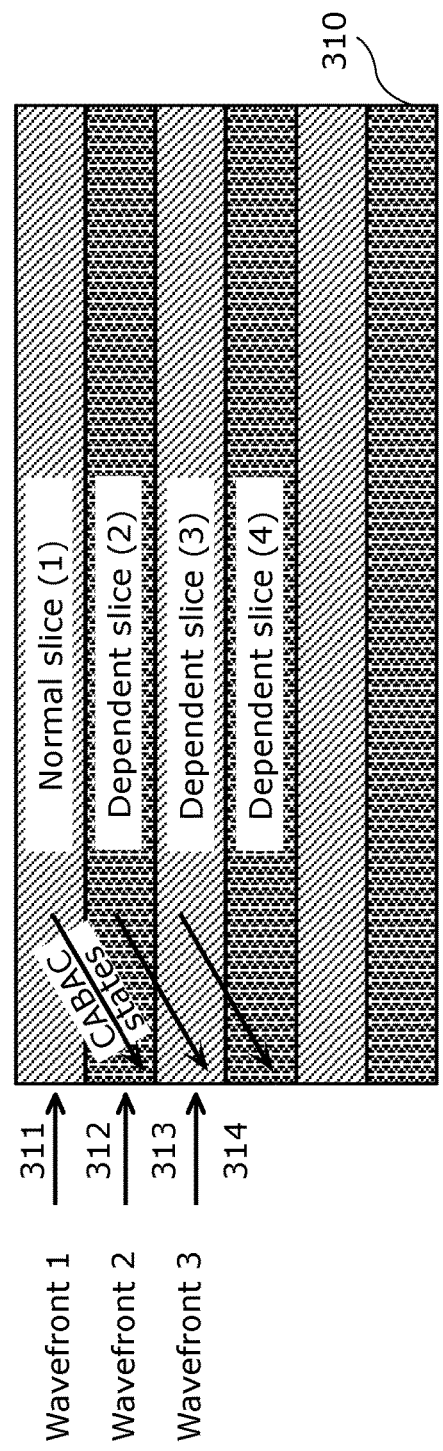
FIG. 3B is a schematic diagram for illustrating dependent slices in WPP according to the embodiments.

FIG. 3B is a diagram showing a usage example of dependent slices for the WPP. A picture 310 shown in FIG. 3B includes rows 311 to 314. Here, the row 311 (Wavefront 1), the row 312 (Wavefront 2), and the row 313 (Wavefront 3) are processed using separate cores.

The dependent slices allow the WPP that is capable of reducing delay. The dependent slices have no complete slice header. Moreover, when entry points (the entry points of the dependent slices which are known for the above rule) are known, the dependent slices can be decoded independently of other slices. Furthermore, the dependent slices allow the WPP suitable for low delay applications without causing coding loss.

In a normal case where a substream (LCU row) is encapsulated into a slice, it is necessary to insert a clear entry point into a slice header to surely perform entropy coding and entropy decoding in parallel. For this reason, transmission of the slice can be prepared only after the last substream of the slice is completely coded. In addition, the slice header is completed only after coding of all substreams in the slice is finished. In other words, transmission of the beginning of the slice cannot be started through packet fragmentation in the RTP/IP layer until processing of the whole slice is finished.

However, when a dependent slice is used, the dependent slice can be used as an entry point marker, and thus it is not necessary to perform notification using an explicit signal of an entry point. Consequently, it is possible to split a normal slice into many dependent slices without coding loss. In addition, the dependent slices can be transmitted immediately after coding of the encapsulated substream is finished (or before the coding in the case of the packet fragmentation).

The dependent slices do not decrease a spatial prediction dependency. In addition, the dependent slices do not decrease a parsing dependency. This is because parsing of a target dependent slice normally requires CABAC states of a preceding slice.

When the dependent slice is not allowed, each LCU row can be used as a slice. Although such a configuration reduces the transmission delay, significant coding loss is caused simultaneously as stated above.

The following assumes a case where a whole frame (picture) is encapsulated into one slice. In this case, to make parallel parsing possible, it is necessary to signal, in a slice header, an entry point of a substream (LCU row). This causes a transmission delay at a frame level. To put it another way, it is necessary to modify the header after the whole frame is coded. The encapsulation of the whole picture into the one slice itself does not worsen the transmission delay. For instance, transmission of part of the slice may be started before the coding is completely finished.

However, when the WPP is used, it is necessary to modify the slice header later to indicate the entry point. Thus, it is necessary to delay the transmission of the whole slice.

As above, the usage of the dependent slice makes it possible to reduce the delay. As shown in FIG. 3B, the picture 310 is partitioned into the row 311, a normal slice, and the rows 312, 313, and 314, dependent slices. When each row is one dependent slice, it is possible to delay transmission of the one row without coding loss. This is because the dependent slice does not decrease the spatial prediction dependency and restart a CABAC engine.

Figure 4A:
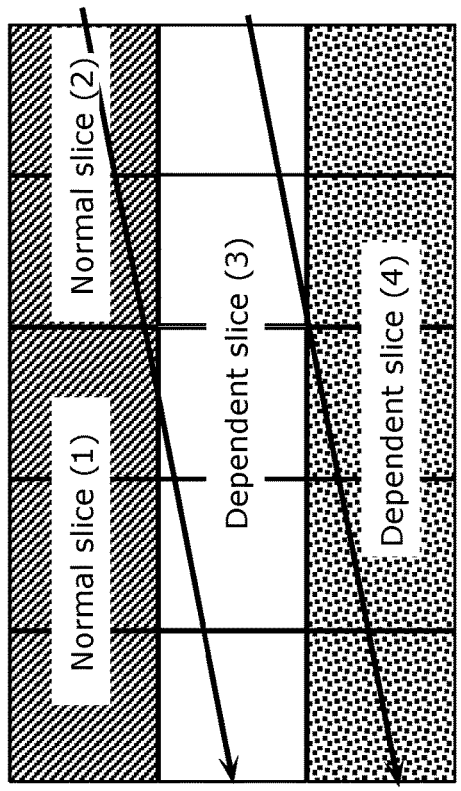
FIG. 4A is a schematic diagram for illustrating dependent slices when WPP is not applied according to the embodiments.
Figure 4B:
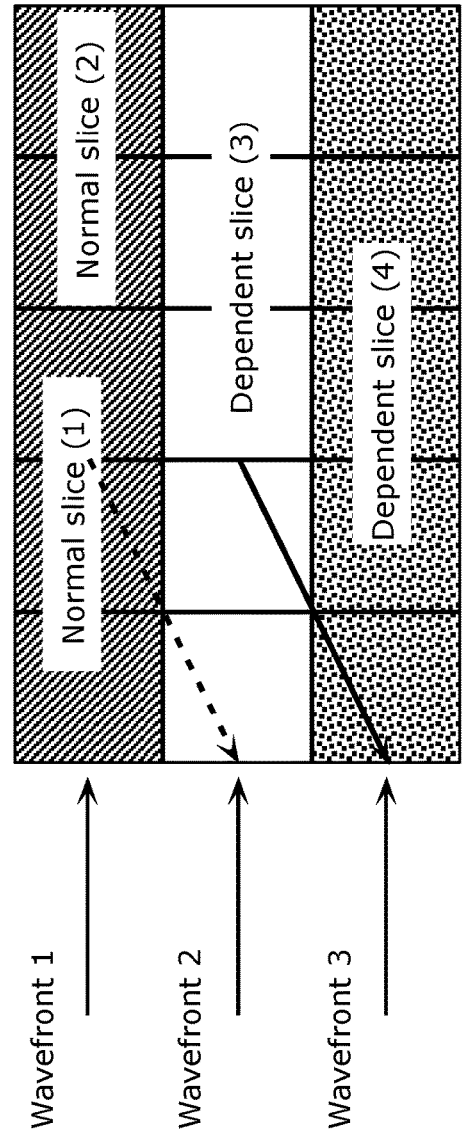
FIG. 4B is a schematic diagram for illustrating dependent slices when WPP is applied according to the embodiments.

FIG. 4A and FIG. 4B each are a diagram showing another example of CABAC initialization. FIG. 4A shows the CABAC initialization when the WPP is not used. The WPP and tiles are both unused. The usage of the normal slices and the dependent slices together is allowed.

A dependent slice (3) copies the header of a normal slice (2). In short, the normal slice (2) is a parent slice of the dependent slice (3). The dependent slice (3) uses a context table generated at the end of the normal slice (2). The dependent slice (3) depends not on a normal slice (1) but on the normal slice (2). In a word, spatial prediction does not exist between the normal slice (1) and the dependent slice (3).

FIG. 4B is a diagram showing the CABAC initialization when the WPP is used. The usage of the normal slices, the dependent slices, and the WPP together is allowed.

A dependent slice (3) copies the header of a normal slice (2). The dependent slice (3) is expected to use a context table generated at the end of the second LCU of the normal slice (1). However, since the slice (2) is a normal slice, it is indicated that the second LCU of the slice (1) cannot be referred to. In short, the slice (1) is not referred to, because the slice (1) is not an immediately preceding slice of a dependent slice in coding order.

However, the slice (2) is used as a reference slice for the slice (3) and a slice (4). In other words, when decoding of the slice (3) is started, it is necessary to initialize CABAC states to a default value (indicated by a dashed arrow in FIG. 4B). The dependent slice (4) uses CABAC states (solid arrow) after the right upper second LCU which conforms to the above-mentioned WPP conditions.

FIG. 5 is a diagram showing an exemplary syntax of a slice header compliant with a current HEVC reference model (HM8.0). A slice header 320 includes a syntax element dependent_slice_flag which indicates whether a target slice is a dependent slice or a normal slice.

As is clear from a row 321 in FIG. 5, when the dependent_slice_flag is equal to 0, the header includes slice header information. In short, the slice has a complete header. Otherwise, the header does not include the slice header information. To put it another way, as above, the dependent slice and an entropy slice have no complete slide header, and refer to the header of a preceding normal slice.

Entry points are signaled later to support parallel processing. Even when the entropy coding unit or the entropy decoding unit is not restarted, it is possible to independently perform parallel decoding of part of a video stream (substream) between the entry points, using the entry points. As stated above, entry points are marked for the dependent slice, the normal slice, and the entropy slice.

In HEVC, several parallel processing tools are available. As mentioned above, the tools include the WPP, the dependent slice, the entropy slice, and the tile. However, since these tools are not compatible with each other, there is a limit to combined usage of the tools. The usage of the tile and the slice together is generally allowed.

However, there is a restriction that in a major profile, one slice needs to be subdivided into an integer number of tiles greater than or equal to 1, and one tile needs to be subdivided into an integer number of slices greater than or equal to 1. This restriction is typically applied to a specific profile (or a specific level of a profile). The purpose of the restriction is to reduce complexity of hardware implementation.

When entropy_coding_sync_enabled_flag of a PPS is equal to 1 (i.e., the WPP is used), and the first coding block in a slice is not the first coding block of the first coding tree block in a row of coding tree blocks in a tile, a condition under which a bitstream meets standards is that the last coding block in the slice belongs to the same row of the coding tree blocks as the first coding block in the slice. A coding tree indicates a structure of an LCU and recursive further subdivision of each of LCUs into four blocks. Stated differently, when the WPP can be used, and the slice does not start at the beginning of a target LCU row, the slice has to end at or before the end of the target LCU row. NPL 3 describes details regarding not only parallel processing means but also HEVC syntax.

The following describes this restriction with reference to FIG. 6. A picture 330 shown in FIG. 6 includes slices 331, 332, and 333, normal slices. The slices 331 and 332 are included in one LCU row. The slice 333 is a non-allowed slice, because the slice 333 extends over LCU rows (three rows in this example). The slice 333 has to end at the end of the first LCU row in accordance with the above restriction.

FIG. 7 is a diagram showing a picture 340 having an allowed slice structure when the WPP is used. The picture 340 includes slices 341, 342, and 343, normal slices, and a slice 344, a dependent slice. The slices 341, 342, and 343 are included in the first LCU row. The slice 344 includes subsequent two rows.

The CABAC initialization of the slice 344 depends on the other slices 341, 342, and/or 343, because the slice 344 is the dependent slice. When any of the slices 342 and 343 is a normal slice as shown in FIG. 7, the slice 344 is initialized to default CABAC states. Otherwise, a WPP table is used. In other words, CABAC states after the second LCU in an LCU row above a target row is processed are used for the initialization.

In this example, as described in FIG. 4B and stated in the related description of the CABAC initialization, the dependent slice 344 is initialized using predetermined default CABAC states.

Thus, the CABAC initialization is based on preceding slices. Thus, processing, especially parsing, of a target slice depends on other slices. Specifically, it is determined whether a CABAC context is initialized with a default value or a WPP value depending on a type of the preceding slices of the target slice. In this way, it is checked whether or not the preceding slices can be used, and an initialization method to be applied to the target slice is determined. In short, processing having a quite complicated order is required. The following describes such processing.

A first slice 341 has at least two LCUs, and thus CABAC states after the first two LCUs are coded or decoded can be referred to.

When a slice 342 or a slice 343 is lost, the slice 344 cannot be accurately decoded. This is because the CABAC initialization cannot be performed due to an unknown type of the slice 342 or the slice 343. In other words, because the CABAC initialization cannot be performed on the slice 344 even when only information about the two preceding slices is absent and the slice 344 has been correctly obtained, data of the correctly obtained slice 344 is discarded. Thus, it is necessary to perform error concealment on the slice 344. From this reason, there is a possibility that image degradation results from distortion due to incomplete error concealment.

Here, in a slice header, most of syntax elements (these are mainly switching of control such as a specific filtering operation) need to be determined for all slices included in a frame. In addition, although some of the syntax elements can be changed on a slice basis, all control parameters determined for a whole frame are held in most of processes by an image coding apparatus. Thus, the following method can be used as an error concealment method. This method requires only information indicating whether a lost slice is a dependent slice or a normal slice.

When packets arrive not in order, a decoding delay increases. In other words, when packet reordering is expected, there is a possibility of increasing the decoding delay. This contradicts with providing an ultra low delay using a dependent slice, the fundamental aim of the WPP.

Figure 8:
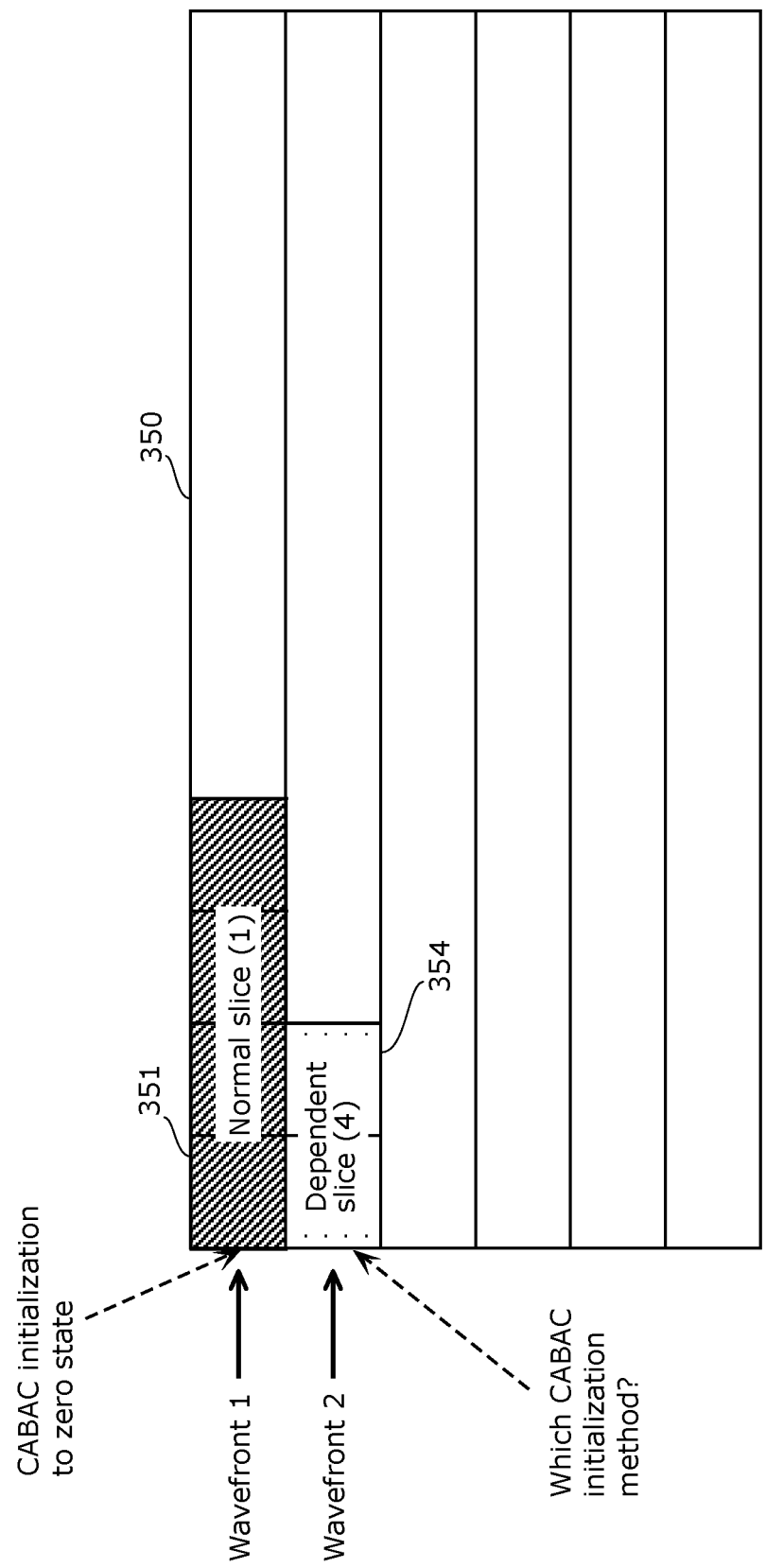
FIG. 8 is a schematic diagram showing a CABAC initialization process according to the embodiments.

FIG. 8 is a diagram showing a further example of the CABAC initialization process. In FIG. 8, the structure of the slices shown in FIG. 7 is assumed. A picture 350 shown in FIG. 8 includes a slice 351 and a slice 354. The slice 351 is a normal slice and the first slice in a frame, and includes four LCUs. The CABAC is initialized to a default state value (zero state) at the beginning of the frame, that is, the beginning of the slice 351. It is to be noted that default states may be present, and in this case, one of the default states is selected. Here, the default state refers to a predetermined value in a probability model of arithmetic coding.

When data of the slice 342 and the slice 343 are absent due to missing or an error although data belonging to a dependent slice 354 is obtained, the dependent slice 354 cannot be decoded. This is because, as stated above, the CABAC engine cannot be initialized without the data of the slices 342 and 343.

Figure 9:
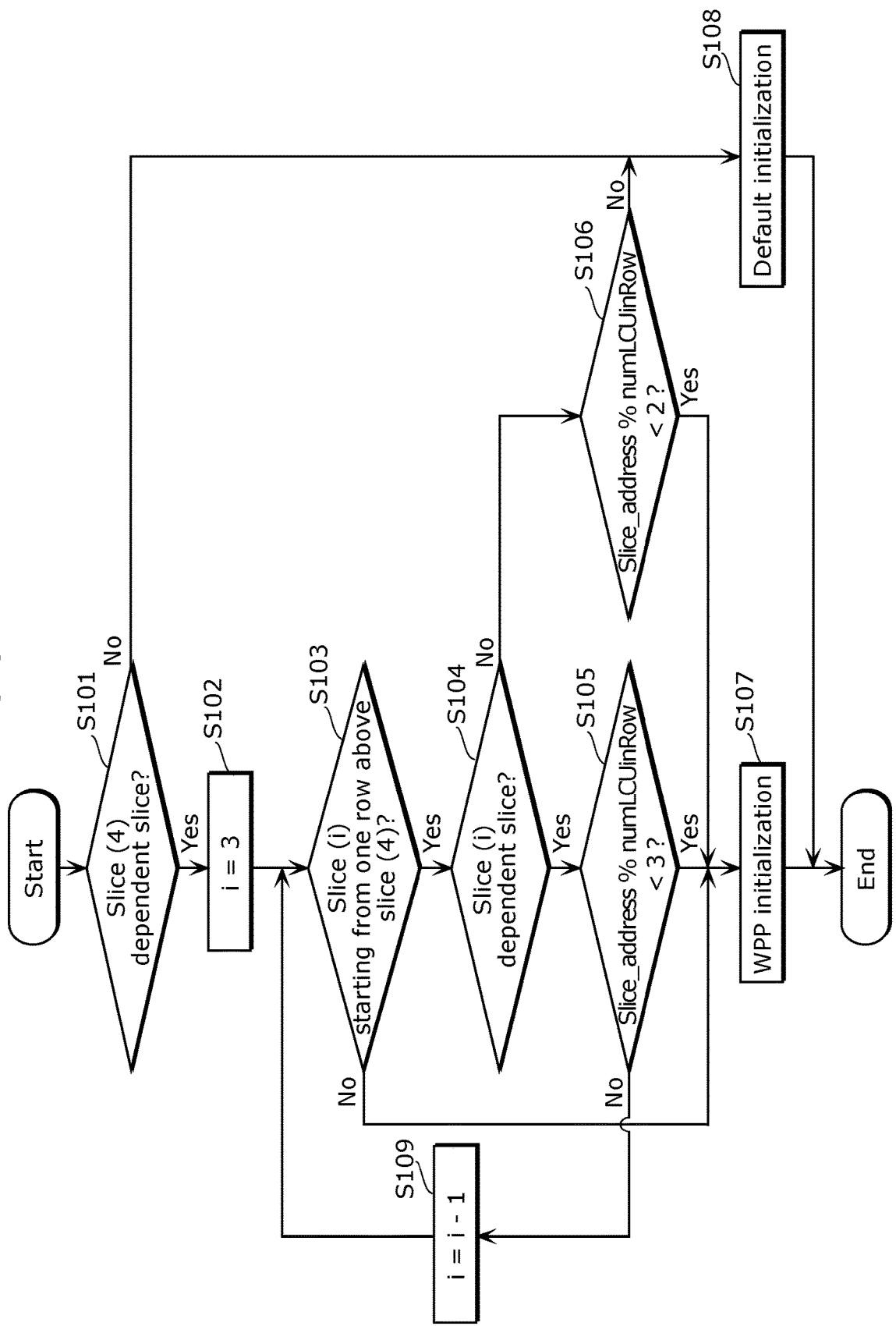
FIG. 9 is a flow chart for a determination process in a CABAC initialization method for a dependent slice depending on characteristics of a preceding slice according to the embodiments.

FIG. 9 is a flow chart for a determination process in an initialization method which is performed when the dependent slice 354 is obtained. To put it another way, this flow chart shows a method of depending on two or more slices in the CABAC initialization.

It is assumed that the following conditions are set for a slice (4) (dependent slice 354). The WPP can be used. dependent_slice_enabled_flag of an SPS is set to 1. The position of the slice (4) satisfies Equation 1.

slice_address % numLCUinRow=0    (Equation 1)

Here, "%" represents a modulo operation (remainder of integer division). The parameter numLCUinRow represents the number of LCUs per row of the picture 350. Thus, the condition of Equation 1 is satisfied at the beginning of the row. The parameter numLCUinRow can be derived from the settings of the SPS.

First, it is determined whether or not the slice (4) is a dependent slice (S101). When the slice (4) is not the dependent slice (No in S101), default initialization is performed.

As shown in FIG. 8, when the slice (4) is the dependent slice (Yes in S101), i is set to 3 (S102). In short, the slice (3) preceding the slice (4) is set as a slice i.

Next, it is determined whether or not the slice i starts from a row above a row of the slice (4) (S103). Here, since i is set to 3, the slice i is the slice (3) preceding a dependent slice to be processed (slice (4)).

When the slice i does not start from the row above the row of the slice (4) (No in S103), WPP initialization (initialization using a WPP table) is performed (S107).

In contrast, when the slice i starts from the row above the row of the slice (4) (Yes in S103), that is, the case shown in FIG. 8, it is determined whether or not the slice i is a dependent slice (S104).

When the slice i is not the dependent slice (No in S104), a start position of the slice i is then analyzed. Specifically, it is determined whether or not slice_address % numLCUinRow is less than 2 (S106). In short, it is determined whether the start position of the slice i is the first LCU or the second LCU in the row.

When slice_address % numLCUinRow is less than 2 (Yes in S106), the WPP initialization is performed (S107). In contrast, when slice_address % numLCUinRow is greater than or equal to 2 (No in S106), the default initialization is performed (S108).

Moreover, when the slice i is the dependent slice (Yes in S104), a start position of the slice i is analyzed. Specifically, it is determined whether or not slice_address % numLCUinRow is less than 3 (S105). In short, it is determined whether the start position of the slice i is the first LCU, the second LCU, or the third LCU in the row.

When slice_address % numLCUinRow is less than 3 (Yes in S105), the WPP initialization is performed (S107). In contrast, when slice_address % numLCUinRow is greater than or equal to 3 (No in S105), the initialization is not performed, and the index i is decreased by 1 (S109). In short, in this example, the slice (2) preceding the target slice (slice (4)) by two slices is set as the slice i. Then, the processes subsequent to step S103 are performed on the slice (2). Moreover, when the same determination is made for the slice (2), the slice (1) is then set as the slice i.

FIG. 10 is a diagram showing a picture 360. The picture 360 includes five slices 361 to 365. The slice 361 is a normal slice and includes the whole first row. The slice 362 is a dependent slice and includes the whole second row. The third row includes the dependent slice 363 and the slice 364. The slice 365 is a dependent slice and includes the whole fourth row.

The following discusses cases where the slice 364 is the dependent slice and where the slice 364 is the normal slice when the slice 364 is lost or delayed. In addition, here, the slice 363 has at least two LCUs.

When the slice 364 is lost, an image decoding apparatus cannot determine a type of the slice 364. When the lost slice 364 is the dependent slice, it is possible to continue decoding of the slice 365 and subsequent slices with a small margin of error in reconstruction processing. This is because, as described with reference to FIGS. 8 and 9, the slice 365 uses CABAC states of the second LCU of the slice 363. Thus, the CABAC initialization processing causes no error. However, since the slice 365 uses spatial prediction from the slice 364, there is a possibility that the pixel reconstruction processing causes an error.

In contrast, when the lost slice 364 is the normal slice, the slice 365 cannot be decoded. This is because some of syntax elements might use information of a slice header of the lost slice 364. Stated differently, it is because the normal slice 364 is a parent slice of the dependent slice 365, and the information of the parent slice is required for parsing and decoding of the dependent slice 365.

When the type of the lost slice 364 is unknown, the image decoding apparatus discards the decodable slice 365 to avoid wrong decoding that is likely to occur when the lost slice 364 is the normal slice. This is inefficient because the slice 365 is discarded even when the data of the slice 365 is correctly obtained. In addition, it is necessary to discard all dependent slices subsequent to the slice 365.

When the slice 364 is the normal slice, a CABAC engine is initialized to a default CABAC value (refer to the case of No in S101 in FIG. 9) to decode the slice 365. Thus, the slice 365 does not depend on the slice 363. In addition, spatial prediction between the slice 363 and the slice 365 is not performed. As above, the CABAC is initialized to the default value at the start position of the slice 365, and thus the dependent slice 365 becomes similar to the normal slice.

However, the normal slice has a complete slice header. In contrast, the slice 365 has only a short slice header and depends on parameters set by a slice header of a preceding normal slice. In other words, when the slice 365 is the dependent slice, although there is the advantage that the size of the header can be reduced, the advantage is not so great. In contrast, when the slice 365 is the normal slice, the slice 365 can be decoded. As just described, in the above cases, the advantage is considered to be greater when the slice 365 is set as the normal slice than when the slice 365 is set as the dependent slice.

However, in the WPP, the dependent slice is designed not to ensure robustness against loss but to enable a WPP operation at an ultra low delay. On the other hand, in the case of an ultra low delay application over a network such as a real-time application, packet loss and packet reordering are expected. In such a case, when the slice 364 can be finally obtained, the slice 365 can be decoded. However, at least an increased delay and the packet loss are caused. Thus, the WPP is performed not in an optimum state in a lossy environment.

FIG. 11 is a diagram showing another problem associated with the CABAC initialization when the WPP is used, and showing a picture 370. The picture 370 includes four slices 371 to 374.

The slice 371 is a normal slice, and the slice 372 is a dependent slice. Here, the slice 371 has at least two LCUs. The first row of the picture 370 includes the slices 371 and 372. The second row of the picture 370 includes the slices 373 and 374, dependent slices.

In this case, an image coding apparatus is assumed to use at least two processor cores. To put it another way, when the WPP is used, the image coding apparatus codes and parses two LCU rows in parallel. Thus, the slice 373 becomes available long before the slice 372 becomes available.

However, since the CABAC initialization for the slice 373 depends on the slice 372, decoding of the slice 373 cannot be started. Thus, it is not possible to make a delay of starting coding or decoding between rows smaller than entire one LCU row. This contradicts with the WPP's purpose of decreasing the delay up to two LCUs.

The following describes parallel processing of coding and transmitting a slice, as shown in FIG. 11. Two processing units such as processor cores and processors simultaneously code the first slices (slice 371 and slice 373) of respective rows. When the coding ends, the coded slices 371 and 373 are encapsulated into packets having packet numbers (packet_id) of 0 and 4, respectively. Here, the packet number of 4 is selected to reserve a small number for the slice 372 and possibly for another NALU.

When coding of the slice 372 is completed, the slice 372 is encapsulated into a packet having a packet number of 1 and is transmitted. In addition, two NAL units having corresponding packet numbers of 2 and 3 and dummy (filler) data are generated to avoid determination of lost packet numbers of 2 and 3 as packet loss.

In HEVC, this is achieved by using a filler_data SEI message or a predetermined NAL unit type reserved for filler data. As above, when a packet ID needs to be increased by 1 for each NAL unit, a filler type NALU is used to fill the gap.

Initialization of a target row depends on the second LCU in a row above the target row. Moreover, when a slice is inserted into after the second LCU, the insertion is problematic in terms of influencing the determination of the CABAC initialization. The present disclosure provides a method for deriving a more efficient relationship between WPP and usage of a dependent slice, based on this analysis and problem. A situation should be avoided where the CABAC initialization for one row depends on another row to maintain efficiency of the WPP.

Moreover, the same problem as above occurs when the tile is used instead of the WPP.

According to an exemplary embodiment disclosed herein, an image decoding method for decoding a bitstream including a coded signal resulting from coding tiles and slices into which an image is partitioned, the method comprising decoding the coded signal, wherein each of the slices is either a normal slice having, in a header, information used for an other slice or a dependent slice which is decoded using information included in a slice header of another slice, and when the normal slice starts from a position other than a beginning of a first tile, a second tile coded next to the first tile does not start from the dependent slice.

With this, it is possible to prevent an occurrence of a case where a slice at the beginning of the second tile refers to a slice at a position other than the beginning of the first tile, thereby increasing efficiency when parallel tile processing and dependent slices are used together.

For instance, in the decoding, the first tile and the second tile may be decoded in parallel, and when the decoding of the second tile is started, the second tile may be decoded without referring to partition information indicating a slice structure of the first tile.

For example, when a slice at a beginning of a third tile is the dependent slice, the dependent slice may include the whole third tile.

For instance, when the first tile includes a slice starting from a position other than the beginning of the first tile, the second tile may not start from the dependent slice.

For example, the image decoding method may further include obtaining, from a slice header of a slice, information indicating whether the slice is either the normal slice or the dependent slice.

For instance, a slice at a beginning of the image may be the normal slice, and each of all other slices may be the dependent slice.

For example, the image decoding method may further include obtaining, from the bitstream, a restriction indicator indicating that partitioning of a picture is restricted.

For instance, the image decoding method may further include obtaining, from the bitstream, an indicator indicating whether or not a parent slice whose slice header is used for the dependent slice starts from a beginning of a tile.

According to an exemplary embodiment disclosed herein, an image coding method for coding tiles and slices into which an image is partitioned, to generate a bitstream, the method comprising:

partitioning the image into the tiles and the slices; and coding the tiles and slices resulting from the partitioning, wherein each of the slices is either a normal slice having, in a header, information used for an other slice or a dependent slice which is decoded using information included in a slice header of another slice, and in the partitioning, when the normal slice starts from a position other than a beginning of a first tile, the image is partitioned into the tiles and the slices to prevent a second tile coded next to the first tile from starting from the dependent slice.

With this, it is possible to prevent an occurrence of a case where a slice at the beginning of the second tile refers to a slice at a position other than the beginning of the first tile, thereby increasing efficiency when parallel tile processing and dependent slices are used together.

For example, in the partitioning, in the case where an image decoding apparatus decodes the first tile and the second tile in parallel, the image may be partitioned into the tiles and the slices to allow the decoding of the second tile without referring to partition information when the image decoding apparatus starts decoding the second tile, the partition information indicating a slice structure of the first tile. For instance, in the partitioning, when a slice at a beginning of a third tile is the dependent slice, the image may be partitioned into the tiles and the slices to cause the dependent slice to include the whole third tile.

For example, in the partitioning, when the first tile includes a slice starting from a position other than the beginning of the first tile, the image may be partitioned into the tiles and the slices to prevent the second tile from starting from the dependent slice.

For instance, the image coding method may further include embedding, into a slice header of a slice, information indicating whether the slice is either the normal slice or the dependent slice.

For example, a slice at a beginning of the image may be the normal slice, and each of all other slices may be the dependent slice.

For instance, the image coding method may further include embedding, into the bitstream, a restriction indicator indicating that partitioning of a picture is restricted.

For example, the image coding method may further include embedding, into the bitstream, an indicator indicating whether or not a parent slice whose slice header is used for the dependent slice starts from a beginning of a tile.

According to an exemplary embodiment disclosed herein, an image decoding apparatus which decodes a bitstream including a coded signal resulting from coding tiles and slices into which an image is partitioned, the apparatus comprising a decoding unit configured to decode the coded signal, wherein each of the slices is either a normal slice having, in a header, information used for an other slice or a dependent slice which is decoded using information included in a slice header of another slice, and when the normal slice starts from a position other than a beginning of a first tile, a second tile coded next to the first tile does not start from the dependent slice.

With this, it is possible to prevent an occurrence of a case where a slice at the beginning of the second tile refers to a slice at a position other than the beginning of the first tile, thereby increasing efficiency when parallel tile processing and dependent slices are used together.

According to an exemplary embodiment disclosed herein, an image coding apparatus which codes tiles and slices into which an image is partitioned, to generate a bitstream, the apparatus comprising: a partitioning unit configured to partition the image into the tiles and the slices; and a coding unit configured to code the tiles and slices resulting from the partitioning, wherein each of the slices is either a normal slice having, in a header, information used for an other slice or a dependent slice which is decoded using information included in a slice header of another slice, and the partitioning unit configured to, when the normal slice starts from a position other than a beginning of a first tile, partition the image into the tiles and the slices to prevent a second tile coded next to the first tile from starting from the dependent slice.

With this, it is possible to prevent an occurrence of a case where a slice at the beginning of the second tile refers to a slice at a position other than the beginning of the first tile, thereby increasing efficiency when parallel tile processing and dependent slices are used together.

According to an exemplary embodiment disclosed herein, an image coding and decoding apparatus may include the image coding apparatus and the image decoding apparatus.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims showing most generic concepts are described as arbitrary structural elements.

Embodiment 1

In an image coding method and an image decoding method according to Embodiment 1, an indicator is added which clearly specifies CABAC initialization.

FIG. 12 is a diagram showing syntax of a slice header according to Embodiment 1. A slice header 380 includes a row 381 having a new syntax element "entropy_default_initialization_flag."

This entropy_deafult_initialization_flag is an indicator indicating, when set to a predetermined value, that CABAC of a slice is initialized with a CABAC default (predetermined) value. The flag is an indicator having the first value such as "1" indicating that a slice is initialized with a CABAC value and the second value such as "0" indicating that the initialization is performed by another method. It is to be noted that the assignments of the values of "1" and "0" may be switched.

The "other method" for determining initialization may be a predetermined method such as initialization based on a value of a preceding slice. However, the "other method" may include another determination flow similar to the flow shown in FIG. 9, thereby possibly deriving an initialization method using a default CABAC value.

An image decoding apparatus according to this embodiment decodes a bitstream of a coded video sequence including image slices at least partially coded by arithmetic coding. The image decoding apparatus includes: a parsing unit which extracts, from bitstream data of a slice, an initialization indicator indicating whether or not an arithmetic decoding probability model of the slice is initialized with a predetermined value; a control unit which controls whether or not the arithmetic decoding probability model is initialized with the predetermined value, according to the initialization indicator; an arithmetic decoding unit which decodes the slice.

For instance, the arithmetic coding may be context adaptive arithmetic coding as defined in HEVC. However, the present disclosure is not limited to this.

The predetermined value is a default value notified to an image coding apparatus and the image decoding apparatus, and does not change with coded content.

The initialization indicator preferably refers to a 1-bit flag with "1" indicating that an arithmetic decoding probability model is initialized with the predetermined value and "0" indicating that an arithmetic decoding probability model is initialized by another method.

Only when a target slice is a dependent slice, the indicator needs to be present. This is because when the target slice is a normal slice, the CABAC default value is used for initialization (refer to the case of No in S101 in FIG. 9). Thus, it is first analyzed whether or not the target slice is the dependent slice by checking a condition dependent_slice_flag==1.

Moreover, when parallel processing of a slice and another slice is performed, the initialization indicator (flag) is advantageous. For example, the parallel processing may be the WPP. Thus, only when a condition entropy_coding_sync_enabled_flag==1 is true, the syntax of the slice header shown in FIG. 12 includes an initialization indicator entropy_default_initialization_flag.

Furthermore, only when the slice starts at the beginning of an LCU row, the initialization indicator is appropriate. This is because immediate initialization of CABAC is only then required to allow the parallel processing. This is indicated by a condition slice_address % PicWidthInCtbsY==0 in the syntax shown in FIG. 12.

As stated above, a syntax element "slice_address" indicates a start of the slice with an offset included in the bitstream. "PicWidthInCtbsY" indicates a width of a frame with the number of units of coding tree blocks (LCUs).

As shown in the row 381, a logical product of the three conditions is used for determination. In other words, only when Equation 2 below is true, entropy_default_initialization_flag is transmitted to clearly signal the initialization method.

$$\text{dependent\_slice\_flag}==1\ \&\&\ \text{entropy\_coding\_sync\_enabled\_flag}==1\ \&\ \text{slice\_address}\ \%\ \text{PicWidthInCtibsY}==0 \quad \text{(Equation 2)}$$

When Equation 2 is not true, the initialization is performed based on a normal method, that is, WPP rules.

To put it another way, the image coding method and the image decoding method according to this embodiment include: subdividing a slice of an image into coding units corresponding to pixel blocks of the image; and extracting, by the parsing unit, an initialization indicator of header data, only when the slice is a dependent slice. An arithmetic decoding unit of dependent slices is initialized based on a context of an arithmetic decoding unit of parent slices corresponding to the respective dependent slices.

Moreover, only when parallel decoding of a row composed of the coding units is allowed, the parsing unit may extract the initialization indicator of the header data.

Stated differently, according to this embodiment, the slice of the image is subdivided into the coding units corresponding to the pixel blocks of the image, and the initialization indicator of the header data is extracted by the parsing unit only when the slice starts from the beginning of the row composed of the coding unit blocks of the image.

Figure 13:
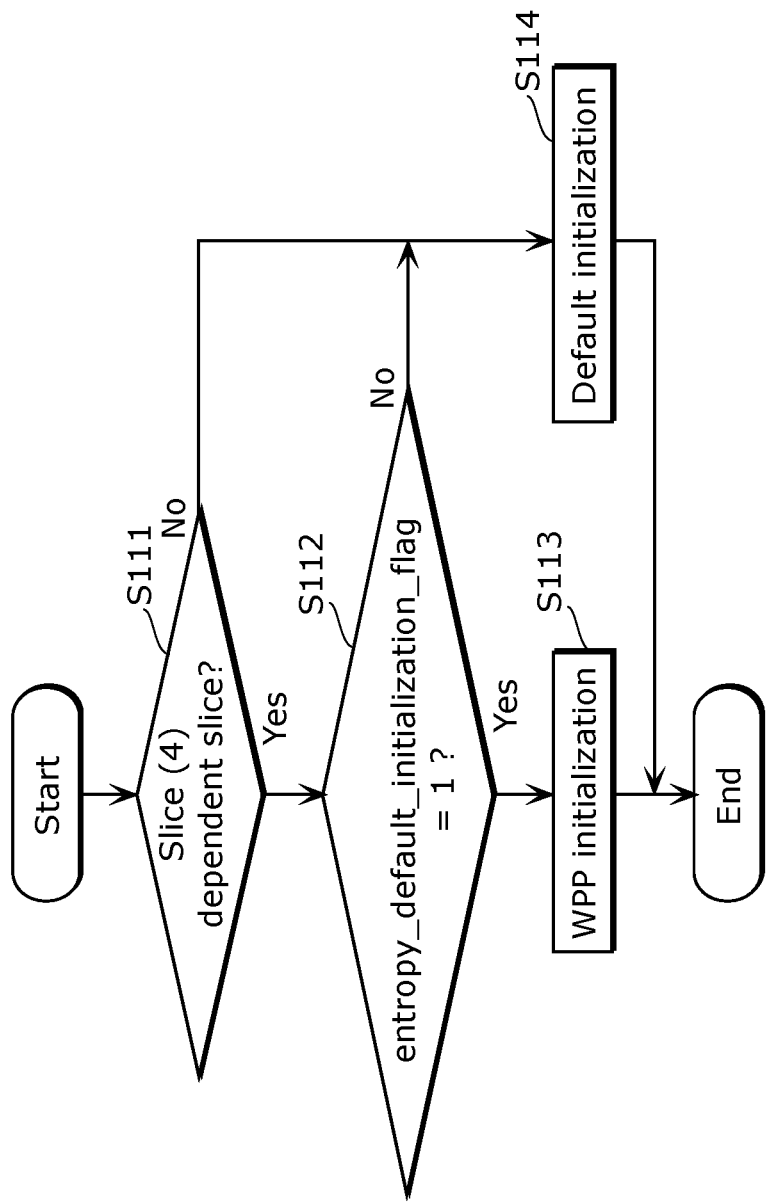
FIG. 13 is a flow chart for a determination process in a CABAC initialization method for a dependent slice according to Embodiment 1.

FIG. 13 is a flow chart for a CABAC initialization determination method for a slice according to this embodiment. FIG. 13 assumes a case of the picture 350 shown in FIG. 8. Assuming that the slice (4) (slice 354) and the slice (1) (slice 351) are parsed in parallel, the following determination is made.

First, it is determined whether or not the slice (4) is a dependent slice (S111). When the slice (4) is the dependent slice and other conditions (parallel processing of rows is performed and a slice starts at the beginning of an LCU row) are satisfied (Yes in S111), an initialization indicator "entropy_default_initialization_flag" is checked to determine an initialization execution method (S112).

When the entropy_default_initialization_flag indicates application of default initialization (No in S112), the default initialization is applied (S114). In contrast, when the entropy_default_initialization_flag does not indicate the application of the default initialization (Yes in S112), initialization of the WPP is applied in which a preceding slice is referred to (S113).

It is to be noted that this embodiment is not limited to signaling the initialization indicator in the slice header. The same indicator may be embedded in another data structure, e.g. a supplemental enhancement information message.

Embodiment 2

Embodiment 1 makes it possible to achieve efficient parallel LCU row processing such as the WPP and the dependent slice. On the other hand, a new syntax element is embedded in a slice header. In response, independence of CABAC initialization for slices during parallel processing may be achieved by modifying initialization rules, to avoid addition of the new syntax element.

In Embodiment 2, the definition of the dependent slice and operations for dependent slice by an image coding apparatus and an image decoding apparatus are modified. This can be achieved by adding restrictions to bitstream standards.

In other words, the image decoding apparatus according to this embodiment decodes a bitstream of a coded video sequence including image slices subdivided into coding units and at least partially coded by arithmetic coding. The image decoding apparatus includes a parsing unit which extracts, from a bitstream, a first row of coding units and a second row of coding units, wherein the coding units of the first row and the second row are assigned to slices to avoid referring to partition information of a first slice in the first row when an arithmetic decoding unit for a second slice in the second row is initialized. A start position of the first slice in the first row is behind the second slice in the second row by a predetermined number of coding units. The image decoding apparatus further includes the arithmetic decoding unit which performs arithmetic decoding of the first slice and the second slice at least partially in parallel, to decode each of the slices.

Figure 14:
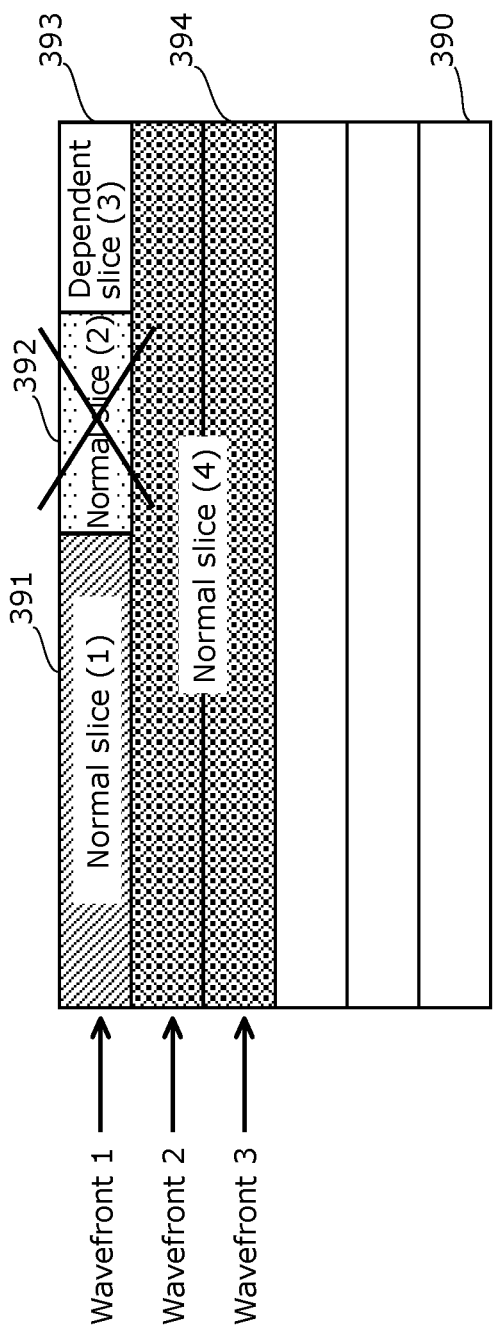
FIG. 14 is a diagram showing an exemplary picture partitioned into slices according to Embodiment 2.

FIG. 14 is a diagram for describing the function of this embodiment, and showing a picture 390 partitioned into slices. The picture 390 includes four slices that are a normal slice 391, a normal slice 392, a dependent slice 393, and a normal slice 394.

The three slices 391, 392, and 393 are included in the first row of coding units (LCUs). The slice 394 includes the whole second and third rows.

The first exemplary restriction applied to slicing and parallel processing on a row basis is that "when entropy_code_sync_enabled_flag and dependent_slice_enabled_flag are equal to 1, a normal slice may start only at the beginning of a row of coding tree blocks." In addition, the both flags, the entropy_code_sync_enabled_flag and the dependent_slice_enabled_flag, are included in a picture parameter set. It is to be noted that a coding tree block (CTB) and a largest coding unit (LCU) refer to the same unit. The CTB is used in a standard text (refer to NPL 3). In addition, although the LCU is used in a standard text of the previous version, the CTB is used in a standard text of the current version.

When the normal slice starts only at the beginning of a row of coding units, a dependent slice in another row which is subsequent to the normal slice may always refer to CABAC states of the normal slice. Here, the CABAC states are CABAC states after the first LCU or the first two LCUs are processed by the WPP. In addition, since a header of the dependent slice depends on a header of the normal slice preceding the dependent slice, when the normal slice 394 is lost, it is necessary to discard the dependent slice.

The first exemplary restriction does not need to be strict. It is only necessary to make at least one or two LCUs of the normal slice in a preceding row available to the dependent slice, to allow application of WPP initialization.

Alternatively, the second exemplary restriction may be applied as another restriction (rule). In the second exemplary restriction, a normal slice does not start after the second coding tree block in a row of coding tree blocks. The normal slice has to start at the beginning of an LCU row, and thus, for example, it is not acceptable to set the second slice 392 as the normal slice as shown in FIG. 14.

It is to be noted that the first slice may have a start position no more behind than the second coding unit in the first row. Moreover, the first slice may be a normal slice, and the second slice may be a dependent slice using a slice header of the normal slice. Furthermore, the start position of the first slice may be the beginning of the first row.

Figure 15:
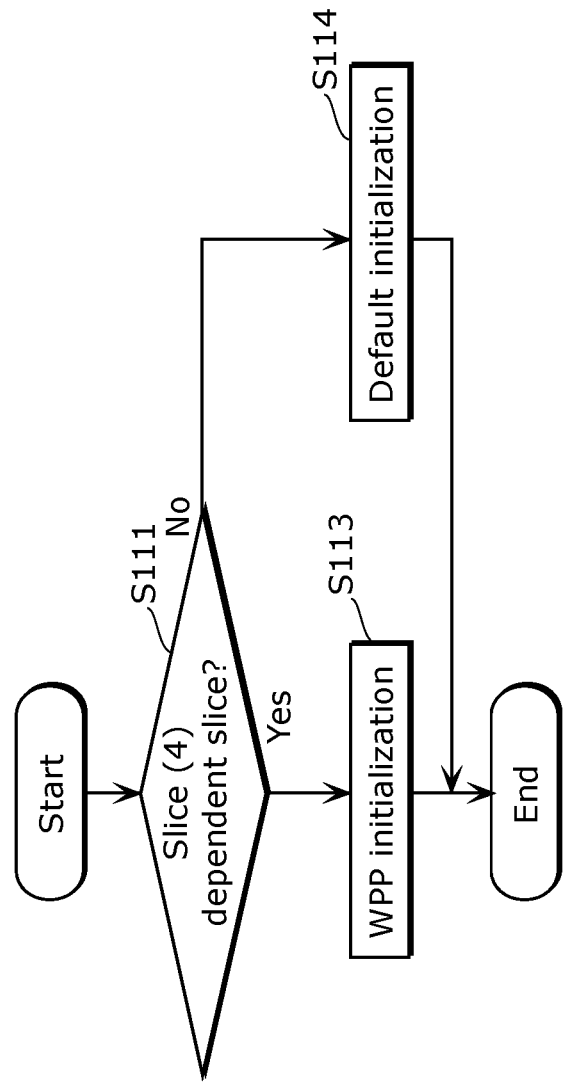
FIG. 15 is a flow chart for a determination process in a CABAC initialization method according to Embodiment 2.

FIG. 15 is a flow chart for a determination process in a CABAC initialization method when the above rules are set. The following describes the determination process using the example shown in FIG. 8.

First, it is determined whether or not the slice (4) is a dependent slice (S111). When the slice (4) is the dependent slice (Yes in S111), WWP initialization is performed (S113). In contrast, when the slice (4) is not the dependent slice (No in S111), default initialization is performed (S114).

As described above, a context adaptive entropy coding unit is used in an image coding method according to this embodiment. The image coding method is applied to a picture frame partitioned into at least two portions. The at least two portions are a first portion and a second portion which can be at least partially coded and decoded in parallel.

According to this embodiment, initialization of a context table of the second portion of a stream is determined, when the first portion of a substream is subdivided into slices, by a method that does not depend on the subdivision of the first portion. For instance, the WPP is performed for each row (each LCU row), and thus a portion of the stream may correspond to the LCU row.

It is to be noted that the present disclosure is not limited to the above exemplary restrictions. The exemplary restrictions may be formulated in a different manner. The following describes other exemplary restrictions.

When a normal slice satisfies a condition of Equation 3, a slice starting at the beginning of a subsequent LCU row is not a dependent slice.

$$\text{slice\_address} \% \text{PicWidthInCtbsY} > 1 \quad \text{(Equation 3)}$$

For the sake of shorthand, the condition may be represented by Equation 4.

$$\text{slice\_address} \% \text{PicWidthInCtbsY} \mathrel{!}= 0 \quad \text{(Equation 4)}$$

Here, "!=" indicates inequality. When entropy_coding_sync_enabled_flag is equal to 1, that is, parallel processing of an LCU row is allowed, these restrictions are applicable. Moreover, "slice_address" indicates a position of a slice starting in a bitstream, and the parameter "PicWidthInCtbsY" indicates a width of a picture (frame) in an LCU (coding tree block).

To put it another way, when the normal slice does not start at the beginning of the row, a slice starting in an immediately subsequent row is not a dependent slice (third exemplary restriction). This condition eliminates the need for waiting decoding of a slice in the second row until a normal slice at a position in the first row is parsed (decoded).

The following describes the influence of the third exemplary restriction with reference to FIG. 16. A picture 400 shown in FIG. 16 includes three slices 401 to 403 included in the first row. Among the three slices, the first two slices 401 and 402 are normal slices, and the third slice 403 is a dependent slice.

This condition does not allow setting of the fourth slice 404 as the dependent slice. This is indicated in FIG. 16 by marking a cross to the slice 404.

Thus, the bitstream may include normal slices and dependent slices, and decoding of the normal slices and the dependent slices is based on parameters signaled in slice headers of the normal slices. When a normal slice starts at a position after the beginning of an LCU row, the next LCU row does not start with a dependent slice.

The following describes the fourth exemplary restriction with reference to FIG. 17. When entropy_coding_sync_enabled_flag and dependent_slice_enabled_flag are equal to 1, no normal slice other than the first slice in a frame is allowed (fourth exemplary restriction).

Stated differently, when parallel processing is allowed and dependent slices are enabled, a normal slice is allowed only as the first slice in the frame. In short, all the slices in the frame are the dependent slices except the first slice.

A picture 410 shown in FIG. 17 includes five slices 411 to 415. The slices 411, 412, and 415 are normal slices, and the slices 413 and 414 are dependent slices. The normal slices 412 to 415 are not allowed except the first normal slice 411 according to the fourth exemplary restriction. In short, the slices 412 and 415 have to be the dependent slices.

It is to be noted that the usage of the fourth exemplary restriction causes a demerit regarding robustness against packet loss. The normal slices are usually used to reduce a dependency or error propagation in a lossy environment. A frame where only the first slice is the normal slice assumes a risk that all slices cannot be decoded when the first slice cannot be decoded.

Moreover, the following restriction may be used as another restriction. When a slice (normal or dependent slice) starts in the middle of an LCU row (i.e., a position different from the beginning of the row), the next row of coding units does not start with a dependent slice (fifth exemplary restriction).

It is to be noted that as is clear to a person skilled in the art, it is possible to arbitrarily combine the restrictions described above. In other words, the first to fifth exemplary restrictions may be applied in combination.

The following further describes another exemplary restriction. When entropy_coding_sync_enabled_flag is equal to 1, one LCU row cannot be subdivided into slices (sixth exemplary restriction). When this restriction is applied, the slices 412 and 413 are not allowed in the slice structure shown in FIG. 17. To put it another way, when parallel processing of rows of coding units is allowed, a slice is allowed only to include one whole row of coding units or whole rows of coding units.

As stated above, the bitstream includes the normal slices and the dependent slices. The decoding of the normal slices and the dependent slices is based on the parameters signaled in the slice headers of the normal slices. After it is determined that only the first slice in an image would be a normal slice and remaining slices would be dependent slices, the image is partitioned into slices.

Each of the slices includes all of an m number of rows of coding units. Here, m is an integer greater than or equal to 1.

When the dependent slices are enabled and one of the WPP and tile is enabled in addition to or instead of the application of the restriction, an indicator indicating the restriction may be embedded in the bitstream. For instance, this indicator is embedded in an SPS or a PPS. It is to be noted that the indicator may be embedded in another message such as an SEI message or in any video usability information (VUI) message.

The image decoding apparatus identifies a restriction to be applied, based on the indicator. For example, this restriction is that a normal slice is allowed only at the beginning of an LCU row (WPP) or a tile. It is to be noted that this is merely an exemplary restriction, and any of the above-mentioned restrictions, a combination of the restrictions, or an additional restriction not explicitly described may be applied.

For instance, the indicator may be a 1-bit flag indicating, for a predetermined restriction, whether or not the restriction is to be applied. Selectable restrictions may be available, and information indicating a selected restriction is signaled in the bitstream to the image decoding apparatus. Stated differently, instead of explicitly limiting the usage as described in the above examples, the image coding apparatus may notify the image decoding apparatus that such restrictions are used. Thus, any of the examples regarding the restrictions can be applied.

It is to be noted that it is not necessary to determine whether or not to add the indicator depending on whether or not the WPP or tile is enabled.

As described above, this embodiment makes it possible to prevent the dependent slice processing from being delayed by at least two or at least three coding units, by the CABAC initialization in view of the preceding slices in the parallel processing. With this, the parallel processing of coding, decoding, and parsing of the rows can be efficiently performed.

It is to be noted that the present disclosure is not limited by this embodiment in which the slicing method is limited. In addition, the restriction may relate to a slice from which a CABAC context can be obtained.

Embodiment 3

In Embodiment 3, a CABAC initialization method for a dependent slice at a time of WPP is changed. Specifically, the parent slice assignment rule for the dependent slice is changed.

For instance, a rule is determined in which a dependent slice always obtains a slice header and a CABAC context from the same slice regardless of subdivision of an LCU row into slices (and/or a type of a subsequent slice).

Figure 18:
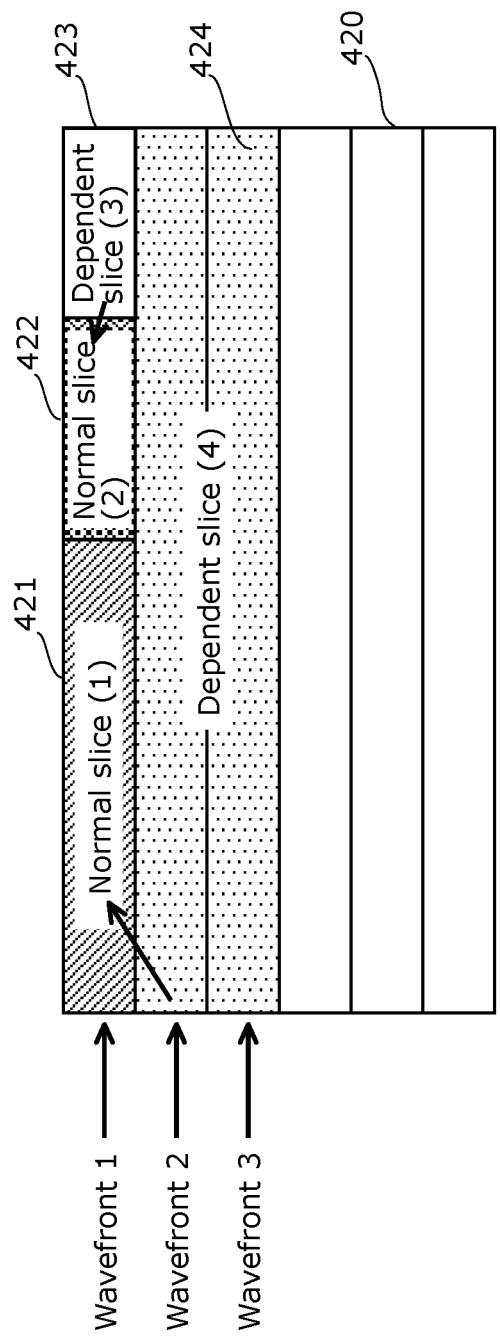
FIG. 18 is a diagram showing an exemplary picture partitioned into slices according to Embodiment 3.

A picture 420 shown in FIG. 18 includes slices 421 to 424. In current HEVC, the slice 422 is a parent slice of the dependent slice 424. In other words, a slice header of the dependent slice 424 is obtained from the slice 422, a closest preceding normal slice.

As described with reference to FIG. 9, there is a case where CABAC initialization is performed on the dependent slice using a normal slice at the beginning of a preceding LCU row. However, when the slice 422 is lost, although the CABAC initialization can be performed on the slice 424, the slice 424 cannot be decoded due to the absence of slice header information.

In view of this, in this embodiment, the dependent slice has, as the parent slice, a closest normal slice starting from the same row as the dependent slice or a row preceding the row of the dependent slice.

In this embodiment, as shown in FIG. 19, the parent slice of the slice 424 is set as the slice 421 according to this rule. The CABAC initialization is performed on the dependent slice 424 using a slice header of the slice 421 as well as CABAC states of the slice 421.

In addition, an arithmetic coding unit of each dependent slice sets a slice dependency to perform initialization based on a context of an arithmetic decoding unit of the parent slice.

It is to be noted that information indicating a CABAC context table used for slice initialization may be explicitly signaled in an SEI message. In short, all initialization values considered to be used for CABAC engine initialization may be explicitly signaled in the SEI message.

Embodiment 4

Embodiment 4 describes a case where not the WPP but tiles are used.

The problem described above for the WPP also occurs in such a case. However, CABAC context table initialization denotes setting a CABAC context table to either a default initial value or a previously stored value. In the case of a tile, (even when the tile starts with a dependent slice) the CABAC context table is initialized to a default value at the beginning of the tile.

However, when a normal slice is present in the middle of the tile, some of syntax elements included in a slice header of the normal slice need to be modified. One of the syntax elements is a flag indicating ON/OFF of sample adaptive offset processing, for instance. When the flag indicates "ON," a CABAC engine filters parameters while parsing slice data. As above, this relates to state control of the CABAC engine. The following describes the state control in detail below.

FIG. 19 is a diagram showing syntax of a slice header according to this embodiment. This slice header includes dependent_slice_flag, an indicator relating to a dependency.

Figure 20:
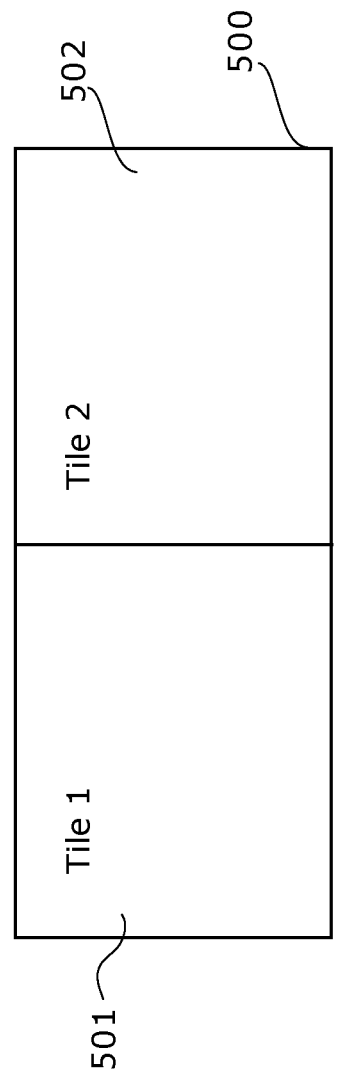
FIG. 20 is a diagram showing an exemplary picture partitioned into tiles according to Embodiment 4.

FIG. 20 is a diagram showing a picture 500 partitioned into two tiles 501 and 502. As shown in FIG. 20, the tiles differ from slices in partitioning a picture with a vertical line. A picture can be normally partitioned into tiles. Partition information of each of the tiles is signaled in a picture parameter set (PPS) relating to the picture.

As stated above, the tile is one of the tools which enable the parallel processing. In short, the tiles may be decoded in parallel. It is to be noted that loop filter processing is usually performed lastly at tile boundaries after tile reconstruction.

The picture parameter set includes information about the number and positions of tiles in a picture. The tiles are similar to the slices in that spatial prediction between tiles is not allowed. Here, the "spatial prediction" denotes intra-prediction, motion vector prediction, or referring to a parameter. Here, the parameter refers to a sample adaptive offset parameter, another parameter relating to a picture, or a parameter relating to another tile.

An entropy coding unit and an entropy decoding unit are restarted at the beginning of each tile.

FIG. 21A is a diagram showing a processing order of coding units such as coding tree blocks and largest coding units. This order is also referred to as Z scan or raster scan. FIG. 21A shows a case where no tile is enabled. In other words, FIG. 21A shows a case where one tile is set per picture. It is to be noted that the WPP may be enabled.

FIG. 21B is a diagram showing a frame including two tiles 511 and 512 resulting from partitioning the frame with a boundary 513. A processing order when two or more tiles are present in a frame is determined as follows.

First, an order of all tiles is determined by a normal raster scan order described above for the LCUs. This order starts from the tile 511 and ends at the title 512 as shown in FIG. 21B.

Next, an order of LCUs in each tile is determined using the normal raster scan order as shown by arrows in FIG. 21B. Finally, the last LCU in each title is connected to the first LCU in a subsequent title. In this way, the order shown in FIG. 21B is determined. It is to be noted that, for example, NPL 3 describes the details of the processing order.

An LCU scan order is used for the slices. Thus, when a slice A precedes a slice B in coding order, all LCUs in the slice A precede all LCUs in the slice B.

On the other hand, when the tiles are used, the coding units are scanned in an order different from the order applied when only the slices are used (no tile is used). Specifically, when only the slices are used, coding units in a picture are scanned by the so-called Z scan. The Z scan starts from the upper left coding unit in the picture, continues along the first row rightward, and starts from the coding unit at the left end of the second row to the coding unit at the right end of the second row after the right end of the first row is scanned. The scan continues to the last coding unit in the last row in such an order.

When the slices are used as consecutive coding units in the Z scan order, this usage is efficient. However, when the tiles are used as the same, coding or decoding order of the coding units is changed from the Z scan order. Specifically, scanning is performed in each tile in the Z scan order. In short, the scanning in the Z scan order is never performed over the tiles. Thus, the coding or decoding of the coding units in the tile starts from the upper left coding unit in the tile and ends at the lower right coding unit in the same. In addition, the tiles in the picture are ordered in the Z scan order as above.

In the current HEVC standard, a restriction regarding the usage of tiles and slices in combination is placed. Specifically, a slice is only allowed to include an integer number of complete tiles. In addition, a tile is only allowed to include an integer number of complete slices.

A syntax element tiles_enabled_flag is included as part of a sequence parameter set (SPS) in syntax of a bitstream. Setting this syntax element to a logical value "1" enables the usage of tiles.

When the tiles are used, the WPP cannot be used. Thus, when the tiles are used, a syntax element entropy_coding_sync_enabled_flag of the SPS for controlling the usage of the WPP is set to a logical value "0."

Figure 22B:
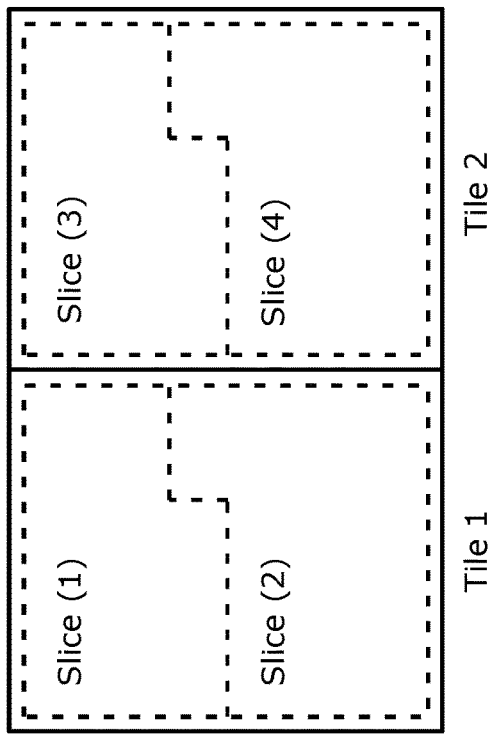
FIG. 22B is a diagram showing a relationship between a tile and a slice according to Embodiment 4.
Figure 22C:
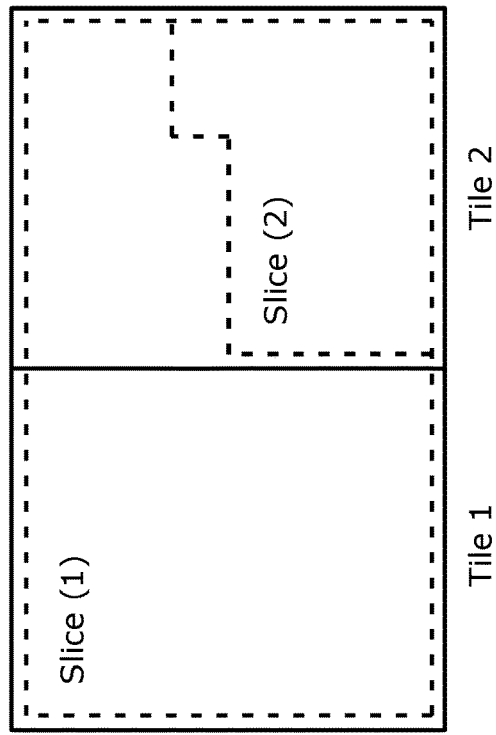
FIG. 22C is a diagram showing a relationship between a tile and a slice according to Embodiment 4.
Figure 22A:
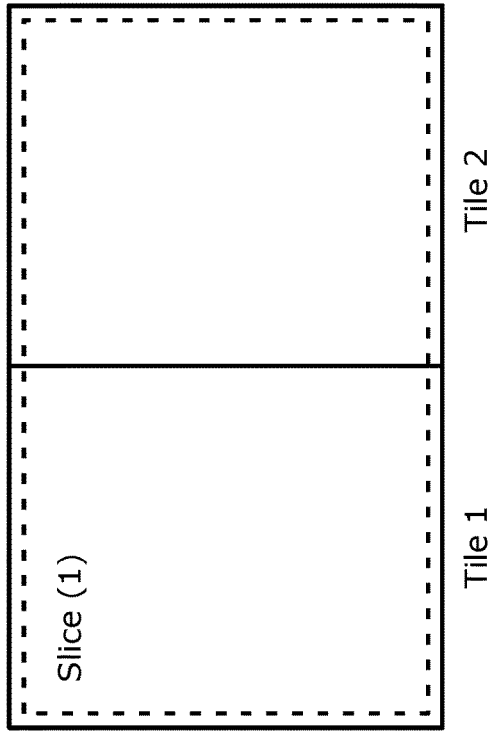
FIG. 22A is a diagram showing a relationship between a tile and a slice according to Embodiment 4.

Each of FIG. 22A to FIG. 22C is a diagram for illustrating a restriction when tiles and slices are used simultaneously. As shown in FIG. 22A, a slice is allowed to be subdivided into two tiles. In this example, a slice (1) includes a whole picture and is subdivided into two tiles having the same size.

In an example shown in FIG. 22B, a picture is partitioned into two tiles. In addition, each of the tiles is subdivided into two slices. Specifically, the picture is partitioned into a tile 1 and a tile 2. The tile 1 and the tile 2 includes the left half and the right half of the picture, respectively. The title 1 is subdivided into two slices, a slice 1 and a slice 2, and the tile 2 is subdivided into two slices, a slice 3 and a slice 4.

FIG. 22C is a diagram showing a non-allowed slice and tile structure. In this example, a slice 1 is included in both a tile 1 and a tile 2. In contrast, a slice 2 is present only in the tile 2. Thus, neither the tile 1 nor the tile 2 includes an integer number of complete tiles. Similarly, neither the slice 1 nor the slice 2 includes an integer number of complete tiles.

These rules are applied to the simultaneous usage of slices and tiles. However, a case of using slices of different types is not considered in the rules. To put it another way, it is not considered whether a slice is a normal slice or a dependent slice.

Figure 23:
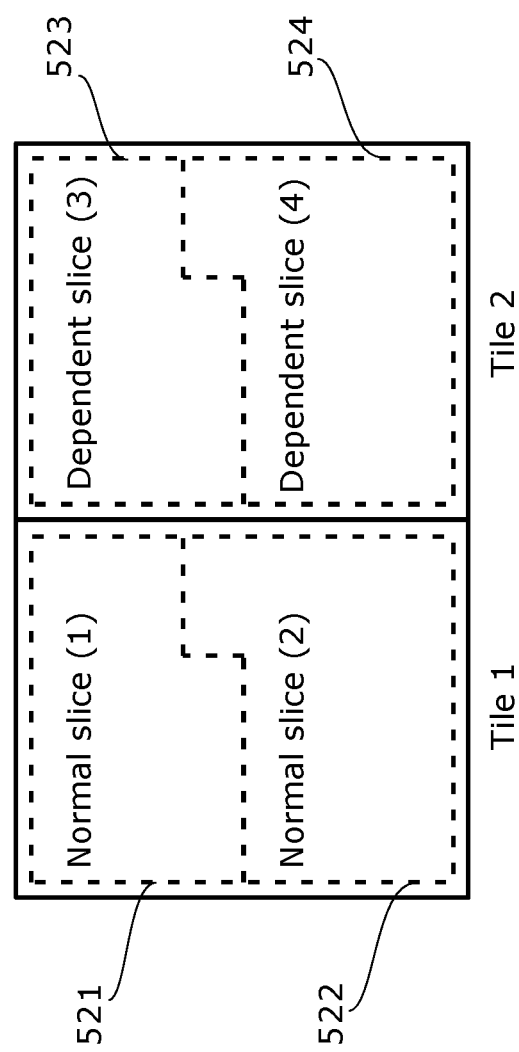
FIG. 23 is an example of partitioning a picture into tiles and slices according to Embodiment 4.

FIG. 23 is a diagram showing an example of partitioning a picture into tiles and slices. This partitioning is allowed according to the above restrictions. The partitioning corresponds to the example shown in FIG. 22B. Slices 521 and 522 included in a tile 1 are normal slices. Slices 523 and 524 included in a tile 2 are dependent slices.

Figure 24:
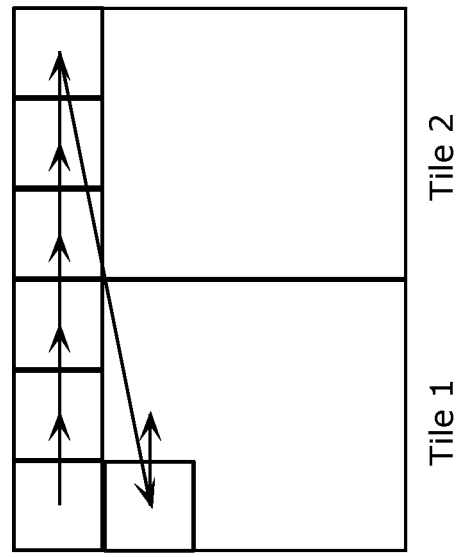
FIG. 24 is a diagram showing a decoding order for a picture partitioned into tiles according to Embodiment 4.

FIG. 24 is a diagram showing a scanning order when a single core is used for processing of coding units in a picture, especially for decoding or coding of the coding units. As shown in FIG. 24, when tile subdivision is not performed, the single core decodes the coding units in the Z scan order.

However, a CABAC engine is re-initialized according to the definition of tiles, that is, tile boundaries. Stated differently, CABAC states at the tile boundaries need to be stored for later initialization. Thus, a single core decoding order requires jumping in the bitstream. This is because the tile subdivision changes the coding order of the coding units.

Moreover, when dependent slices are enabled, the single core decoding is more complicated. The following exemplifies decoding of the picture partitioned as shown in FIG. 23.

In the first step, the first coding unit row of the slice 521 is decoded. In the second step, a slice address of the slice 522 is decoded. The slice address is signaled in a slice header of the slice 522. The slice address is expressed in the number of LCUs and indicates a position in a bitstream at which a slice starts. In addition, the slice address is different from the first coding unit in the tile 2.

In the third step, the slice 523 is decoded. A slice address of this slice is correct, but the slice is a dependent slice. Thus, the slice 523 uses the slice header of the slice 522 in the tile 1. For this reason, the decoding process jumps back to the slice 522, and the header of the slice 522 is decoded. Then, the decoding process jumps forward to return to the decoding of the slice 523. Subsequently, the decoding of the slice 523 is started.

As is clear from this brief example, an image decoding apparatus needs to jump back and forth in the bitstream, and to perform an additional check when decoding of the tile 2 is started. This is because the usage of the dependent slices causes a dependency between the tiles.

In response, this embodiment achieves a method for allowing effective application of dependent slices and tiles. Specifically, this embodiment makes it possible to surely perform appropriate coding and decoding in a normal order, by putting a restriction regarding partitioning of a picture into slices and tiles.

The image decoding apparatus according to this embodiment decodes a bitstream of a coded video sequence including frames each including image slices and image tiles. Each of the image slices and the image tiles includes coding units. The image decoding apparatus includes a parsing unit which extracts (parses), from a bitstream, a tile 1 and a tile 2 coded next to the tile 1. Each of the frames is partitioned into slices and tiles to eliminate the need for partition information of the tile 1 in decoding of the tile 2 by an arithmetic decoding unit.

The image decoding apparatus further includes the arithmetic decoding unit which decodes a slice by performing arithmetic decoding on the tile 1 and the tile 2 at least partially in parallel.

Moreover, an image coding apparatus according to this embodiment codes, into a bitstream, a video including image slices each subdivided into coding units, using at least partially arithmetic coding.

The image coding apparatus includes: a bitstream generating unit which embeds a first tile and a second tile coded next to the first tile into the bitstream; and an arithmetic coding unit which partitions each of frames into slices and tiles to eliminate the need for partition information of the first tile when an arithmetic decoding unit decodes the second tile, and which codes each of the slices by performing arithmetic coding on the first tile and the second tile at least partially in parallel.

In the first exemplary restriction of this embodiment, when the tiles are enabled and at the same time the dependent slices can be used, the normal slice starts only at the beginning of the tile. In short, when tiles_enabled_flag is equal to 1 and at the same time dependent_slices_enabled_flag is equal to 1, each normal slice has to start at the start position of a tile.

Here, the both the entropy_code_sync_enabled_flag and the dependent_slice_enabled_flag are included in a picture parameter set.

It is to be noted that when dependent_slices_enabled_flag is equal to 0, only the normal slices are used. With this, the above problem is avoided. This corresponds to the case where all the slices are the normal slices in the picture shown in FIG. 22B.

As stated above, in the first exemplary restriction, the slice (normal slice) whose header is used for another slice always starts at the beginning of the tile. In other words, the slice at the beginning of an image is the normal slice, and the other slices are the dependent slices. In short, the normal slice is only allowed as the slice at the beginning of the image. In addition, slices other than the slice at the beginning of the image are always the dependent slices. For instance, a picture shown in FIG. 25C is allowed, but a picture shown in FIG. 25B is not allowed.

In the second exemplary restriction of this embodiment, when the tiles are enabled and the normal slice starts at the position other than the start position of the tile, the tile to be coded next does not start with the dependent slice. To put it another way, when tiles_enabled_flag is equal to 1 and slice_address is equal to a start address of a tile, the next tile does not start with the dependent slice.

Thus, as described with reference to FIG. 23, the process of jumping back to the slice header of the normal slice 522 does not occur when the dependent slice 523 is decoded. In short, the slice 523 is not allowed as the dependent slice. This is because the normal slice 522 starts not at the start position of the tile but in the tile.

Consequently, in this embodiment, when the slice (normal slice) whose header is used for another slice does not start at the beginning of the tile, the tile coded next to the tile does not start from a slice (dependent slice) which is decoded using a header of an other slice.

Thus, in the second exemplary restriction, when the normal slice starts at the position other than the beginning of the first tile, the second tile coded next to the first tile does not start with the dependent slice. Stated differently, when at least one of the second slice and a subsequent slice of the first tile is the normal slice, the slice at the beginning of the second tile is the normal slice.

Figure 25A:
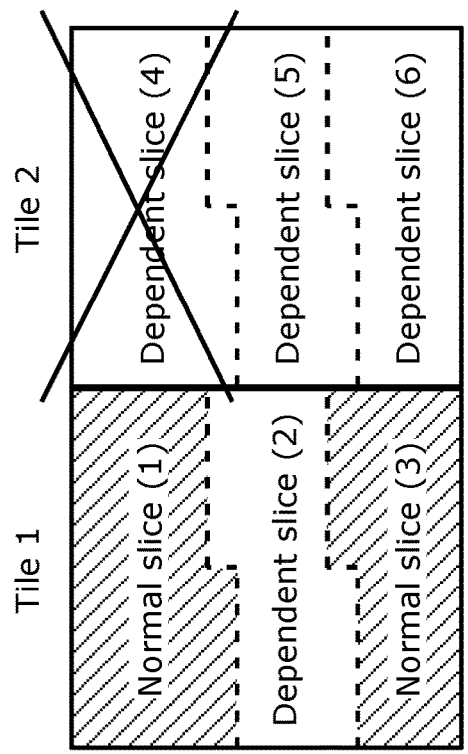
FIG. 25A is a diagram showing an exemplary non-allowed slice structure according to Embodiment 4.
Figure 25C:
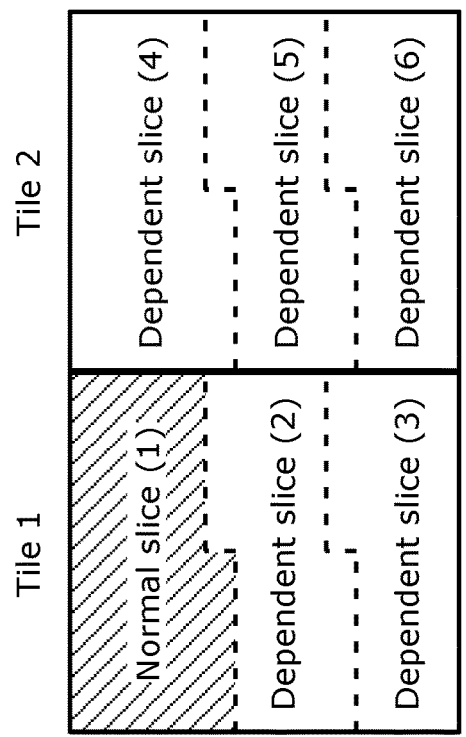
FIG. 25C is a diagram showing an exemplary allowed slice structure according to Embodiment 4.
Figure 25B:
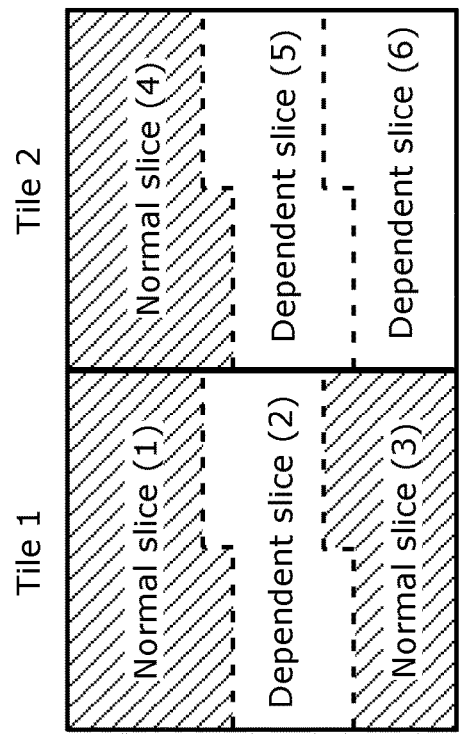
FIG. 25B is a diagram showing an exemplary allowed slice structure according to Embodiment 4.

For example, as shown in FIG. 25A, when a slice (3) in a tile 1 is present, a slice (4) at the beginning of a tile 2 cannot be set as a dependent slice. In addition, when at least one of a slice (2) and the slice (3) is a normal slice, the slice (4) cannot be set as the dependent slice. As a result, as shown in FIG. 25B, the slice (4) needs to be set as the normal slice. Moreover, in the second exemplary restriction, the picture shown in FIG. 25C is also allowed.

In the third exemplary restriction of this embodiment, when the tile starts with the dependent slice, a complete tile is included in the dependent slice. In other words, when the tile starts from the slice which is decoded using a header of another slice, the whole tile is included in the slice.

Figure 26A:
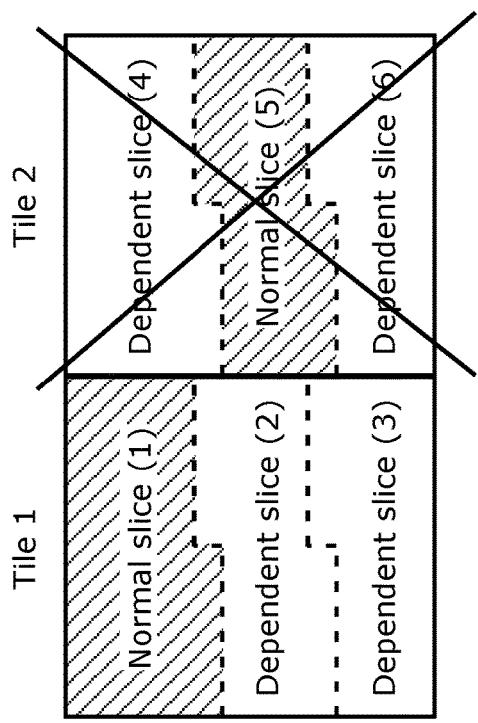
FIG. 26A is a diagram showing an exemplary non-allowed slice structure according to Embodiment 4.
Figure 26B:
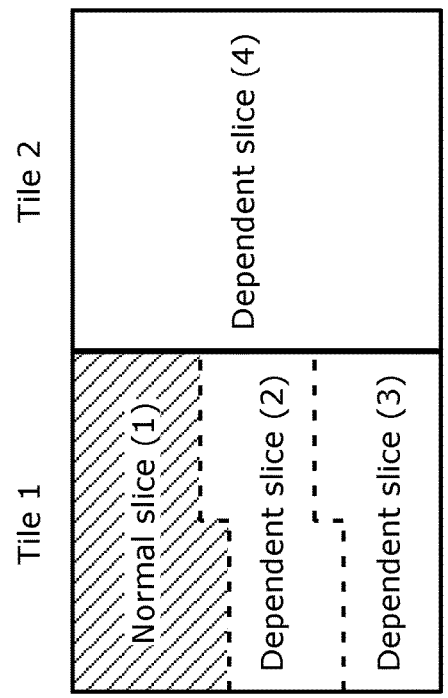
FIG. 26B is a diagram showing an exemplary allowed slice structure according to Embodiment 4.

Thus, in the third exemplary restriction, when the slice at the beginning of the third tile is the dependent slice, the dependent slice includes the whole third tile. To put it another way, the third tile includes only one dependent slice. For instance, as shown in FIG. 26A, when a tile 2 starts from a dependent slice (4), the tile 2 is not allowed to include slices. Thus, as shown in FIG. 26B, the tile 2 needs to include only one dependent slice (4).

In the fourth exemplary restriction of this embodiment, when tiles_enabled_flag is equal to 1 and the slice (normal slice or dependent slice) starts in the middle of the tile, the tile to be coded next does not start from the dependent slice. It is to be noted that the phrase "in the middle of the tile" denotes not the actual middle but that the first CTB of a slice is not the first CTB of a tile. In short, the phrase "in the middle of the tile" denotes within a tile.

This means that when a slice does not start at the beginning of a tile, a tile to be coded next does not start from a slice which uses a header of another slice. To put it another way, when the first tile includes a slice starting at a position other than the beginning of the first tile (first tile includes slices), the second tile does not start from a dependent slice. For example, as shown in FIG. 27A, when a tile 1 includes tiles, a slice (4) at the beginning of a tile 2 is not allowed to be set as the dependent slice. As a result, as shown in FIG. 27B, the slice (4) at the beginning of the tile 2 needs to be set as a normal slice.

It is to be noted that this embodiment relating to the tiles and the other embodiments can be combined, and particular rules and restrictions may be also combined.

In the other exemplary restriction of this embodiment, when tiles_enabled_flag is equal to 1, the dependent slice is not allowed. Stated differently, the dependent slices are allowed to be used with the WPP but not with the tiles. With this, an additional problem when the tiles are used can be avoided. In short, when the tiles are used, the slice does not use a header of another slice for decoding.

When the dependent slices are enabled and one of the WPP and tile is enabled in addition to or instead of the application of the restriction, an indicator indicating the restriction may be embedded in the bitstream. For instance, this indicator is embedded in an SPS or a PPS. It is to be noted that the indicator may be embedded in another message such as an SEI message or in any video usability information (VUI) message.

The image decoding apparatus identifies a restriction to be applied, based on the indicator. For example, this restriction is that a normal slice may start only at the beginning of a tile (beginning of an LCU row in the case of the WPP). It is to be noted that this is merely an exemplary restriction, and any of the above-mentioned restrictions, a combination of the restrictions, or an additional restriction not explicitly described may be applied.

For instance, the indicator may be a 1-bit flag indicating, for a predetermined restriction, whether or not the restriction is to be applied. Selectable restrictions may be available, and information indicating a selected restriction is signaled in the bitstream to the image decoding apparatus. Stated differently, instead of explicitly limiting the usage as described in the above examples, the image coding apparatus may notify the image decoding apparatus that such restrictions are used. Thus, any of the examples regarding the restrictions can be applied.

According to an exemplary embodiment disclosed herein, an image decoding method includes obtaining, from a bitstream, a restriction indicator indicating that partitioning of a picture is restricted. According to an exemplary embodiment disclosed herein, an image coding method includes embedding, into a bitstream, a restriction indicator indicating that partitioning of a picture is restricted.

It is to be noted that it is not necessary to determine whether or not to add the indicator depending on whether or not the WPP or tile is enabled. In addition, when the indicator is added, the dependent slice does not need to be enabled. In short, the indicator can be added regardless of whether or not the usage of the dependent slice is enabled.

Moreover, an indicator which indicates that a parent slice of a target slice starts at the beginning of a tile may be added to a bitstream. In other words, according to an exemplary embodiment disclosed herein, an image decoding method includes obtaining, from a bitstream, an indicator indicating whether or not a parent slice whose slice header is used for a dependent slice starts at the beginning of a tile. According to an exemplary embodiment disclosed herein, an image decoding method includes embedding, into a bitstream, an indicator indicating whether or not a parent slice whose slice header is used for a dependent slice starts at the beginning of a tile.

Moreover, an indicator which indicates that all slices in a picture use the same slice header may be added to a bitstream. In other words, this indicator indicates that all syntax elements which are present in a header of a normal slice and absent from a header of a dependent slice are the same for all the slices in the picture.

Thus, a restriction indicator which indicates that partitioning of a picture is restricted by a predetermined rule may be included in a bitstream.

Moreover, an indicator which indicates whether or not a parent slice of a target slice starts at the beginning of a tile may be embedded into a bitstream. Here, a header of the parent slice is used for the target slice.

According to an exemplary embodiment disclosed herein, an image decoding method is an image decoding method for decoding a bitstream including a coded signal resulting from coding tiles and slices into which an image is partitioned, the method including decoding the coded signal. According to an exemplary embodiment disclosed herein, an image coding method is an image coding method for generating a bitstream by coding tiles and slices into which an image is partitioned, the method including: partitioning an image into tiles and slices; and coding the tiles and the slices resulting from the partition.

Each of the slices is either a normal slice or a dependent slice. The normal slice is a slice having, in a slice header, information likely to be used for another slice. The dependent slice is a slice which is decoded using information included in a slice header of another slice. Here, the other slice is, for instance, a normal slice preceding and being closest to the dependent slice.

In the partitioning, the image is partitioned into the tiles and the slices to satisfy one or more of the above-mentioned restrictions.

In the decoding, a first tile and a second tile may be decoded in parallel, and when decoding of the second tile is started, the second tile may be decoded without referring to partition information indicating a slice structure of the first tile. Moreover, in the partitioning, when an image decoding apparatus decodes a first tile and a second tile in parallel, and when the image decoding apparatus starts decoding the second tile, the image may be partitioned into the tiles and the slices to allow the decoding of the second tile without referring to partition information indicating a slice structure of the first tile.

Here, the partition information is, for example, information indicating a slice position (start position) or a position of a slice header. The image decoding apparatus jumps the target tile by referring to the partition information.

As stated above, the slice header includes the information (dependent_slice_flag) indicating whether the slice is the normal slice or the dependent slice. In other words, the image decoding method includes obtaining, from a slice header, information indicating whether a slice is a normal slice or a dependent slice. In addition, the image coding method includes embedding, into a slice header, information indicating whether a slice is a normal slice or a dependent slice.

The same problem described for the WPP also occurs for the tiles. Thus, the above solution can be applied to the tiles. When the tiles are enabled in stead of the WPP, part on which parallel processing is performed is not an LCU row but a tile composed of LCUs. To put it another way, the solution can be directly applied to the tile by replacing the LCU row with the tile.

As stated above, the bitstream may include the normal slices and the dependent slices, and the decoding of the normal slices and the dependent slices is based on the parameters signaled in the slice headers of the normal slices.

According to an exemplary embodiment disclosed herein, when a normal slice does not start at a start position of a tile, a restriction that a dependent slice dependent on the normal slice cannot follow the normal slice is applied.

According to an exemplary embodiment disclosed herein, a restriction that an image is partitioned into slices is applied to cause only the first slice in the image to be a normal slice and the remaining slices to be dependent slices.

The slice dependency is caused by the arithmetic decoding unit of each dependent slice using a slice header of a parent slice.

According to an exemplary embodiment disclosed herein, when a dependent slice is applicable, a restriction indicator is embedded into a bitstream. The dependent slice is a slice which includes coded image data and uses parameters of a header of another slice.

The restriction may be any of the above restrictions, a combination of such restrictions, or a restriction other than the exemplary restrictions.

According to an exemplary embodiment disclosed herein, an apparatus is an apparatus which decodes a bitstream of a coded video sequence including image slices and image tiles that are at least partially coded by arithmetic coding, the apparatus including: a parsing unit which extracts, from data for a slice of the bitstream, an initialization indicator indicating whether or not an arithmetic decoding probability model of the slice is initialized with a predetermined value;

a control unit which controls whether or not the arithmetic decoding probability model is initialized with the predetermined value; and an arithmetic decoding unit which decodes the slice by arithmetic decoding.

According to an exemplary embodiment disclosed herein, an apparatus is an apparatus which at least partially codes a video sequence including image slices by arithmetic coding, to generate a bitstream, the apparatus including: a bitstream generating unit which embeds, into data for a slice of the bitstream, an initialization indicator indicating whether or not an arithmetic coding probability model of the slice is initialized with a predetermined value; a control unit which controls whether or not the arithmetic coding probability model is initialized with the predetermined value; and an arithmetic coding unit which codes the slice.

For instance, the initialization indicator is embedded into header data of the slice.

For example, the initialization indicator is a 1-bit flag. In the 1-bit flag, "1" indicates that the arithmetic decoding probability mode is initialized with the predetermined value, and "0" indicates that the arithmetic decoding probability mode is initialized by another method.

For instance, a slice of an image may be subdivided into coding units corresponding to pixel blocks of the image, and only when the slice is a dependent slice that is a slice using parameters of a header of another slice, the parsing unit may extract an initialization indicator of header data.

For example, only when parallel decoding of tiles is allowed, the parsing unit may extract the initialization indicator of the header data. Alternatively, only when a slice starts at the beginning of a tile, the parsing unit may extract the initialization indicator of the header data.

For instance, the initialization indicator is embedded into an SEI message outside of a slice header.

It is to be noted that the term "slice (normal slice or dependent slice)" used in the above description is sometimes referred to as a "slice segment (normal slice segment or dependent slice segment)." In this case, a unit including one or more consecutive slice segments is referred to as a "slice." Specifically, one slice includes one normal slice segment and one or more consecutive dependent slice segments following the normal slice segment. Stated differently, when a normal slice segment immediately follows another normal slice segment, a slice includes only the normal slice segment. In addition, when one or more dependent slice segments immediately follow a normal slice segment, a slice includes the normal slice segment and the one or more dependent slice segments. In a word, one slice ranges from a normal slice segment to one or more dependent slices immediately preceding the next normal slice segment.

When such a definition is used, the above-mentioned restrictions for the tiles and slices correspond to the following definitions.

One or both of the following conditions shall be fulfilled for each slice and tile. (1) All coding tree units in a slice belong to the same tile. (2) All coding tree units in a tile belong to the same slice.

Here, the coding tree units are the same in meaning as the above-mentioned LCUs and coding tree blocks.

In addition, one or both of the following conditions shall be fulfilled for each slice segment and tile. (1) All coding tree units in a slice segment belong to the same tile. (2) All coding tree units in a tile belong to the same slice segment.

Although the image coding method and the image decoding method according to the embodiments have been described thus far, the present disclosure is not limited to the embodiments.

The image coding method and the image decoding method are performed by the image coding apparatus and the image decoding apparatus, respectively. The image coding apparatus and the image decoding apparatus have the same structures as, for instance, those shown in FIG. 1 and FIG. 2, respectively, and characteristics steps included in the image coding method and the image decoding method are executed by any of the respective processing units shown in FIG. 1 and FIG. 2 or processing units not shown.

Moreover, the respective processing units included in the image coding apparatus and the image decoding apparatus according to the embodiments are typically implemented as an LSI which is an integrated circuit. These processing units may be individually configured as single chips or may be configured so that a part or all of the processing units are included in a single chip.

Furthermore, the method of circuit integration is not limited to LSIs, and implementation through a dedicated circuit or a genera-purpose processor is also possible. A Field Programmable Gate Array (FPGA) which allows programming after LSI manufacturing or a reconfigurable processor which allows reconfiguration of the connections and settings of the circuit cells inside the LSI may also be used.

In the respective embodiments, the respective constituent elements are configured using dedicated hardware, but may also be implemented by executing software programs suited to the respective constituent elements. The respective constituent elements may be implemented through the reading and execution of a software program recorded on a recording medium such as a hard disk or semiconductor memory by a program execution unit such as a CPU and a processor.

In other words, each of the image coding apparatus and the image decoding apparatus includes control circuitry and storage electrically connected to the control circuitry (accessible from the control circuitry). The control circuitry includes at least one of the dedicated hardware and the program execution unit. In addition, when the control circuitry includes the program execution unit, the storage stores a software program executed by the program execution unit.

Moreover, the present disclosure may be the software program, or a non-transitory computer-readable recording medium on which the program is recorded. Furthermore, it goes without saying that the program can be distributed via a transmission medium such as the Internet.

Moreover, all numerical figures used in the forgoing description are merely exemplified for describing the present disclosure in specific terms, and thus the present disclosure is not limited to the exemplified numerical figures.

Furthermore, the separation of the function blocks in the block diagrams is merely an example, and plural function blocks may be implemented as a single function block, a single function block may be separated into plural function blocks, or part of functions of a function block may be transferred to another function block. In addition, the functions of function blocks having similar functions may be processed, in parallel or by time-sharing, by single hardware or software.

Moreover, the sequence in which the steps included in the image coding method and the image decoding method are executed is given as an example to describe the present disclosure in specific terms, and thus other sequences are possible. Furthermore, part of the steps may be executed simultaneously (in parallel) with another step.

The herein disclosed subject matter is to be considered descriptive and illustrative only, and the appended Claims are of a scope intended to cover and encompass not only the particular embodiments disclosed, but also equivalent structures, methods, and/or uses. Various modifications to the embodiments that can be conceived by those skilled in the art, and forms configured by combining constituent elements in different embodiments without departing from the teachings of the present disclosure are included in the scope of one or more aspects of the present disclosure.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 28:
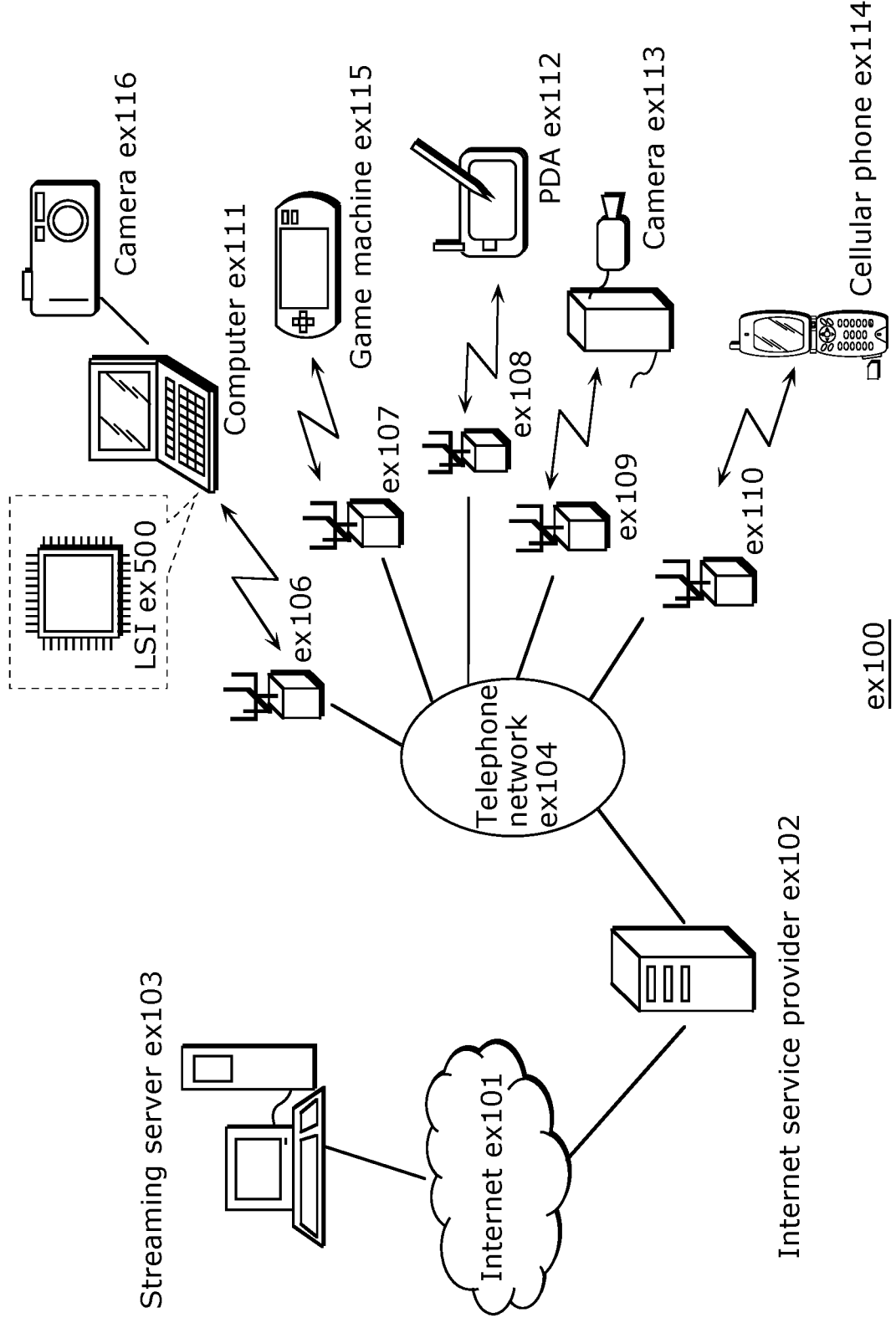
FIG. 28 shows an overall configuration of a content providing system for implementing content distribution services.

FIG. 28 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 28, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 29:
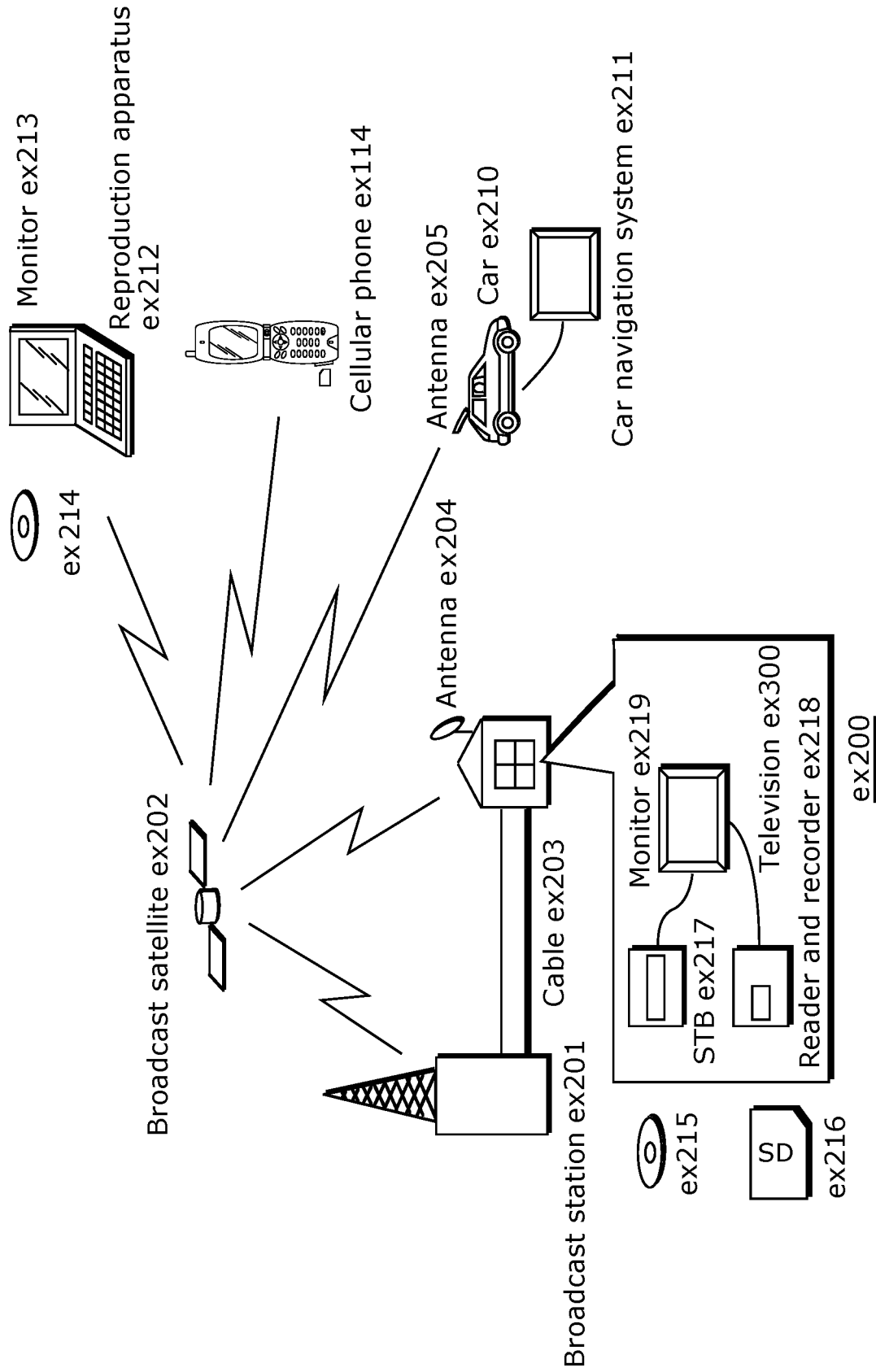
FIG. 29 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 29. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 30:
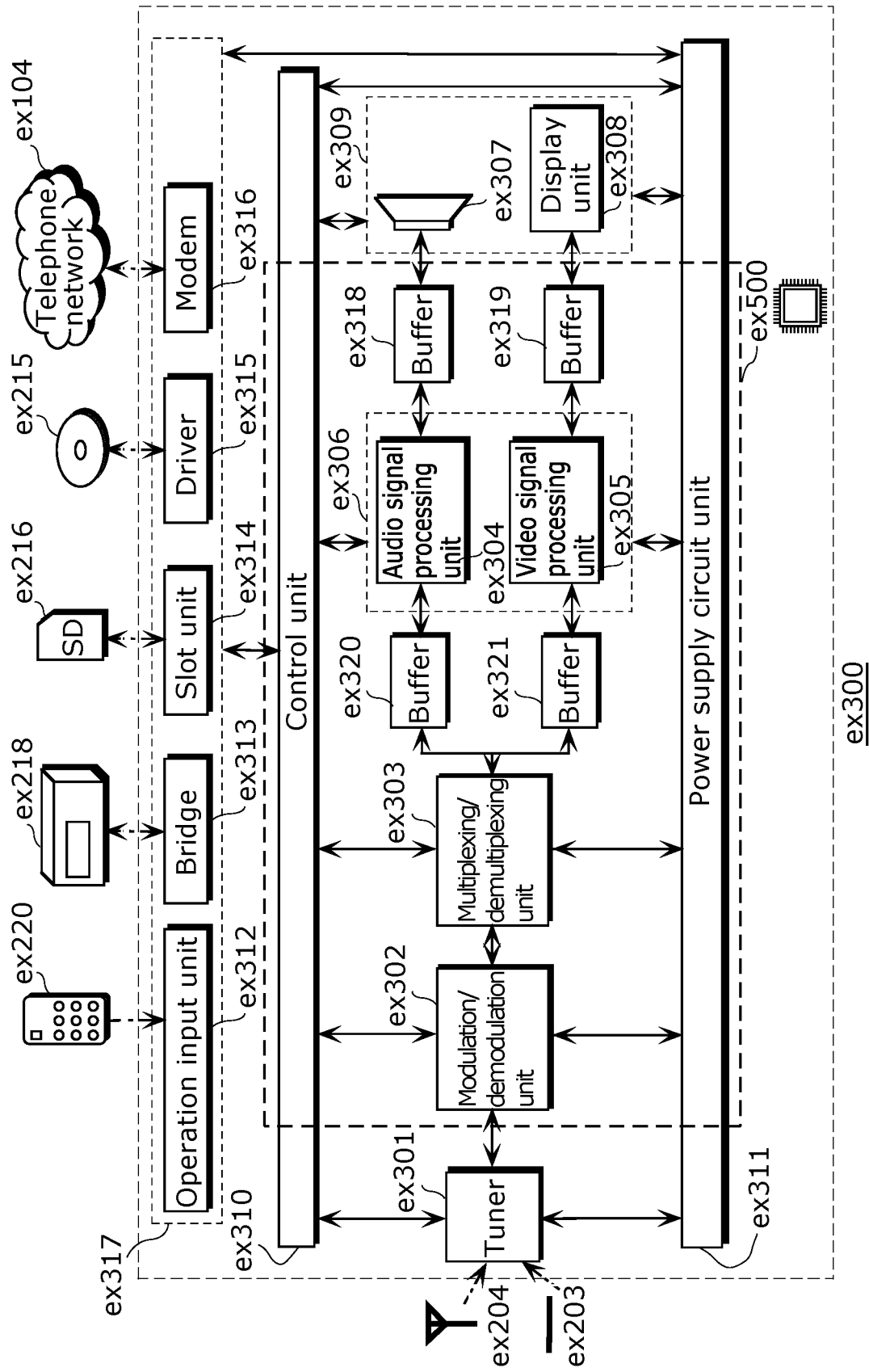
FIG. 30 shows a block diagram illustrating an example of a configuration of a television.

FIG. 30 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 31:
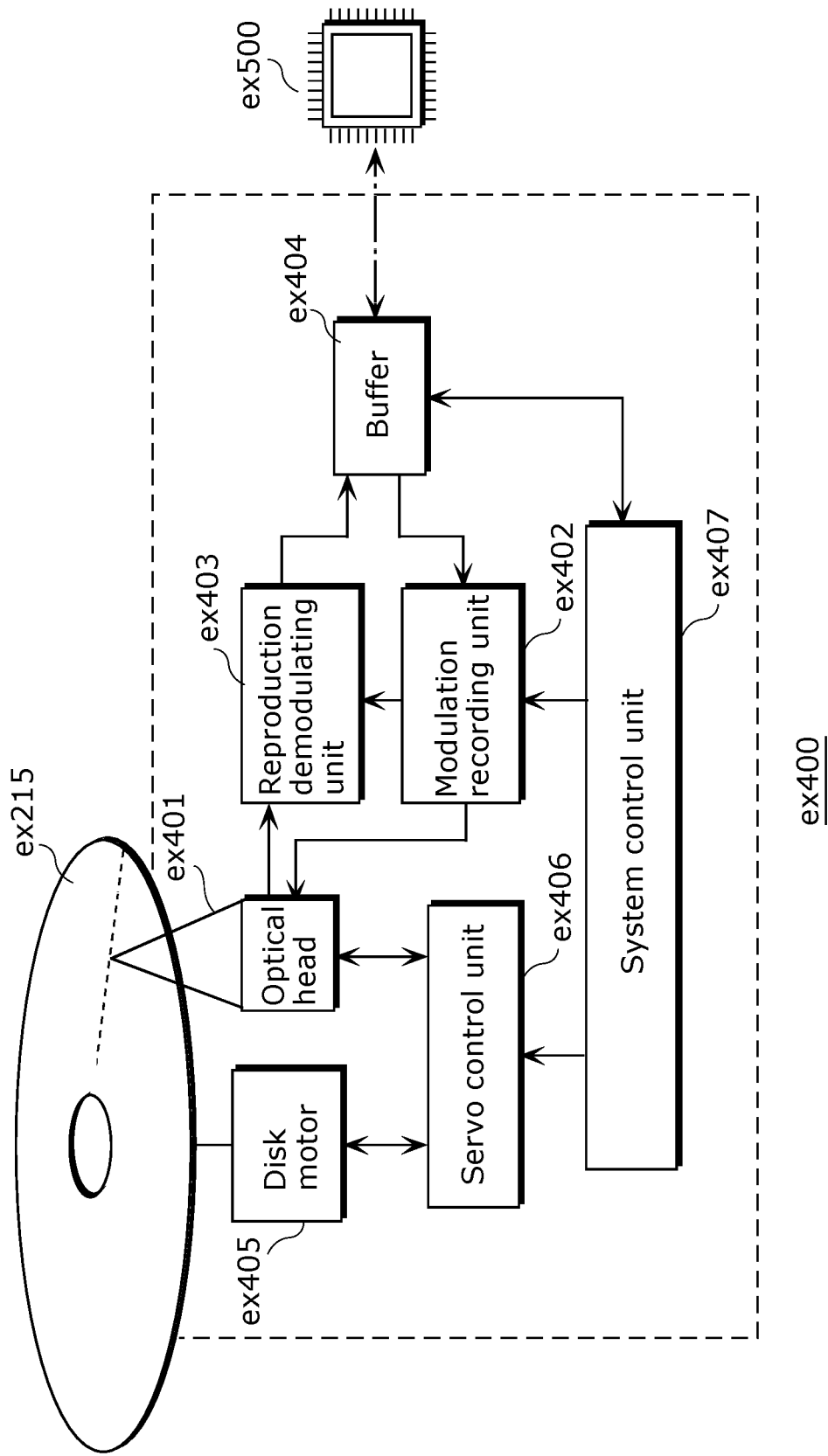
FIG. 31 shows a block diagram illustrating an example of a configuration of an information reproducing/recording unit that reads and writes information from and on a recording medium that is an optical disk.

As an example, FIG. 31 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215.

The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 32:
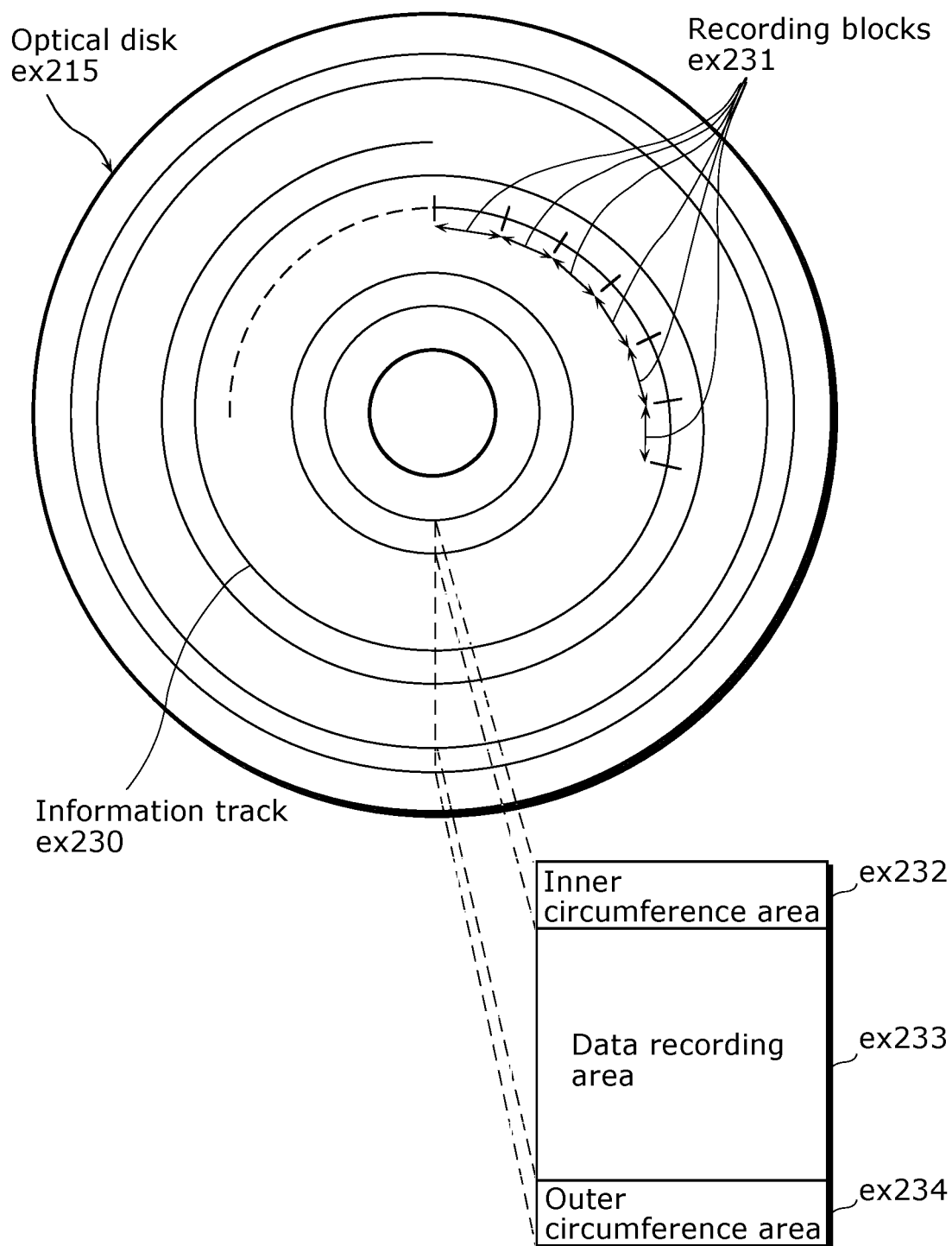
FIG. 32 shows an example of a configuration of a recording medium that is an optical disk.

FIG. 32 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 30. The same will be true for the configuration of the computer ex111, the cellular phone ex114, and others.

Figure 33A:
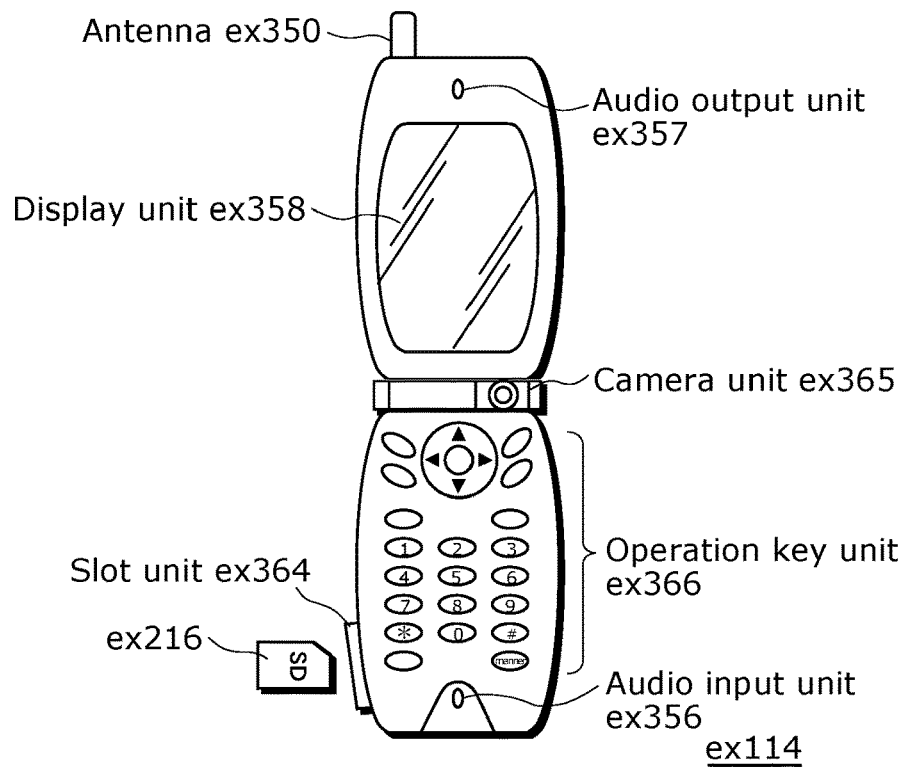
FIG. 33A shows an example of a cellular phone.

FIG. 33A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 33B:
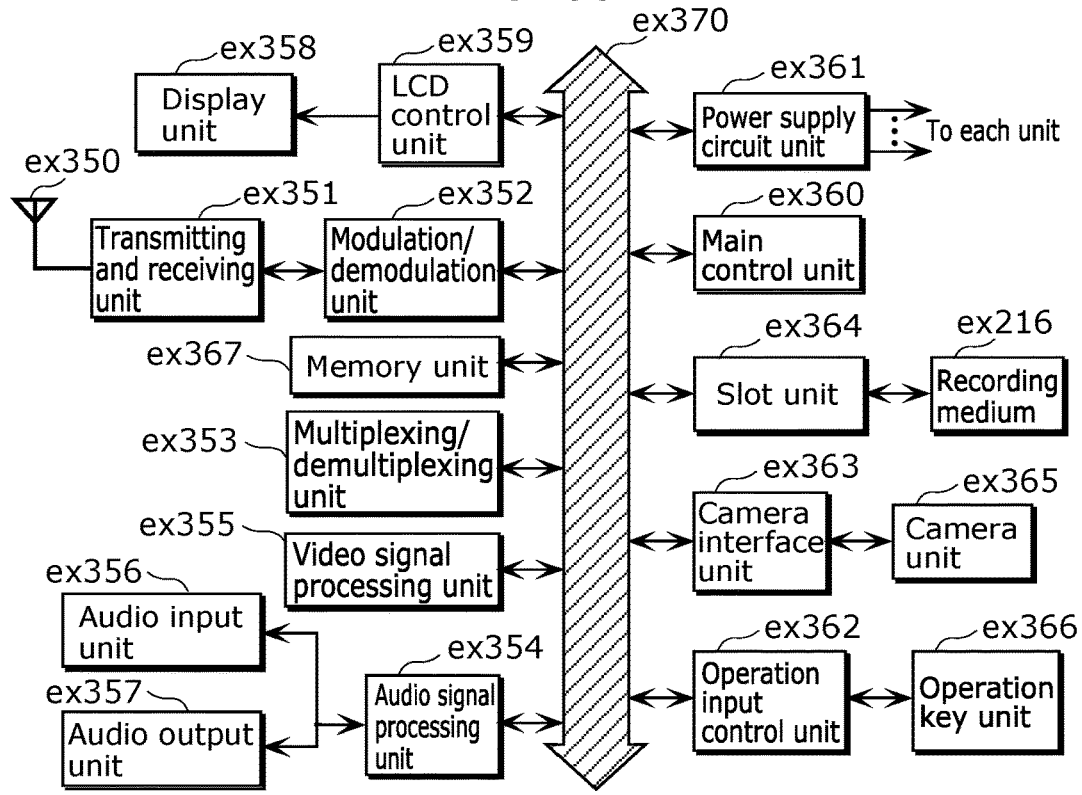
FIG. 33B shows a block diagram illustrating an example of a configuration of a cellular phone.

Next, an example of a configuration of the cellular phone ex114 will be described with reference to FIG. 33B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 34 illustrates a structure of the multiplexed data. As illustrated in FIG. 34, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 35:
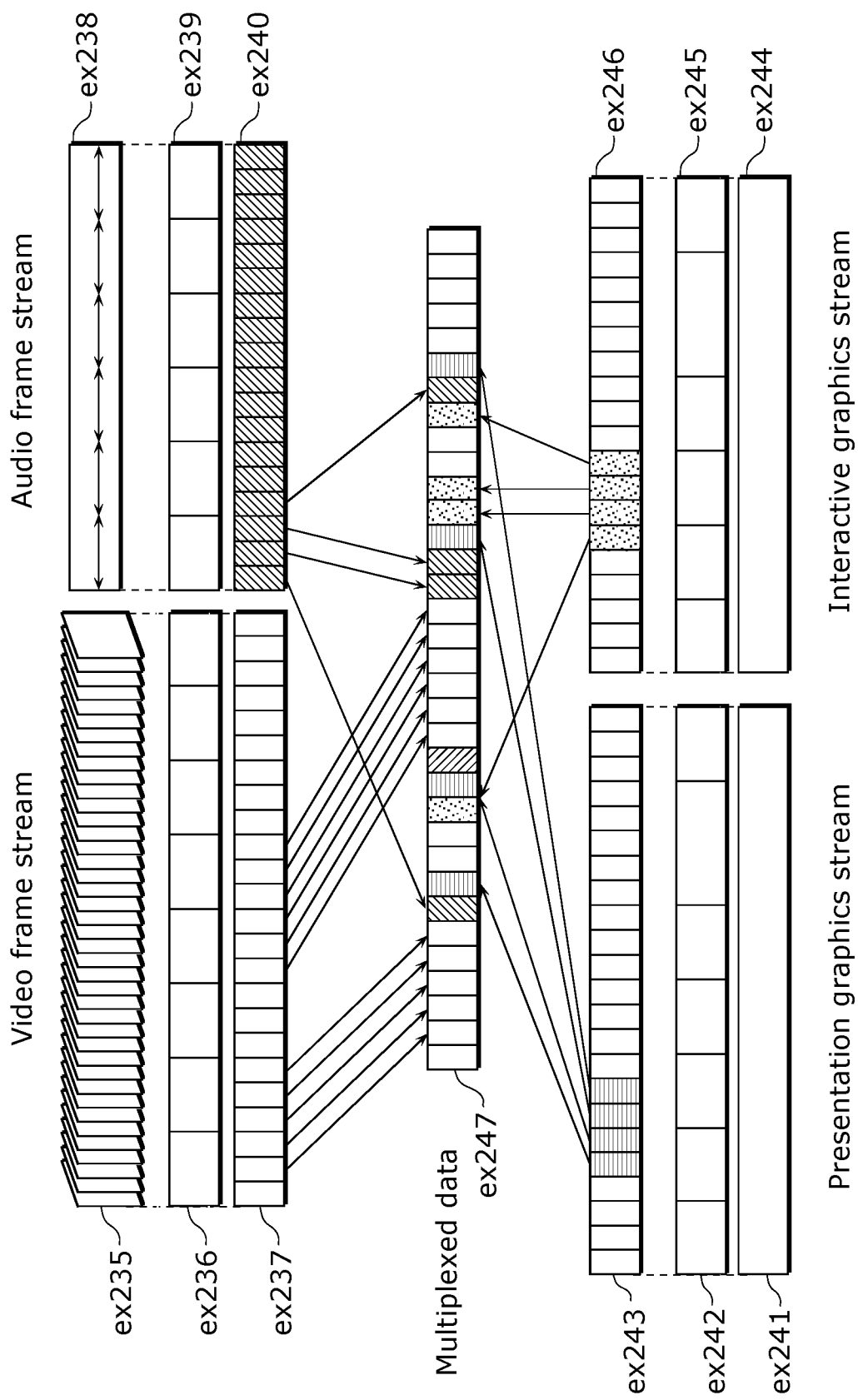
FIG. 35 schematically shows how each stream is multiplexed in multiplexed data.

FIG. 35 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 36:
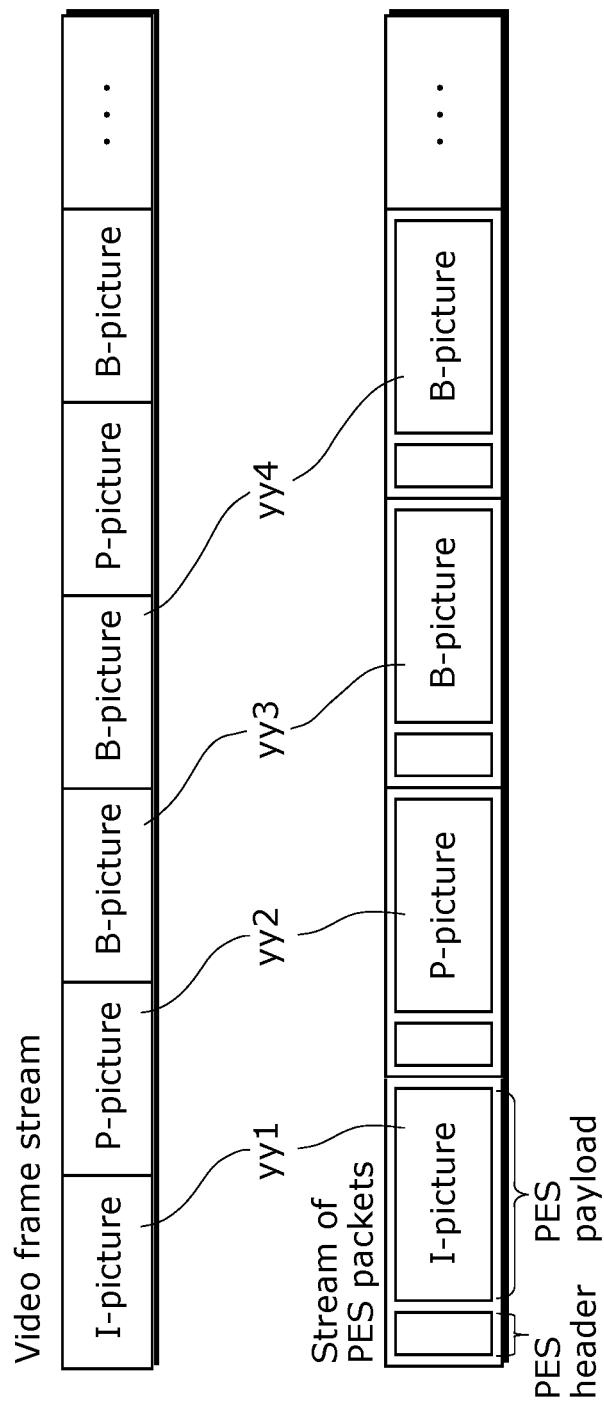
FIG. 36 shows how a video stream is stored in a stream of PES packets in more detail.

FIG. 36 illustrates how a video stream is stored in a stream of PES packets in more detail. The first bar in FIG. 36 shows a video frame stream in a video stream. The second bar shows the stream of PES packets. As indicated by arrows denoted as yy1, yy2, yy3, and yy4 in FIG. 36, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 37 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 37. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 38:
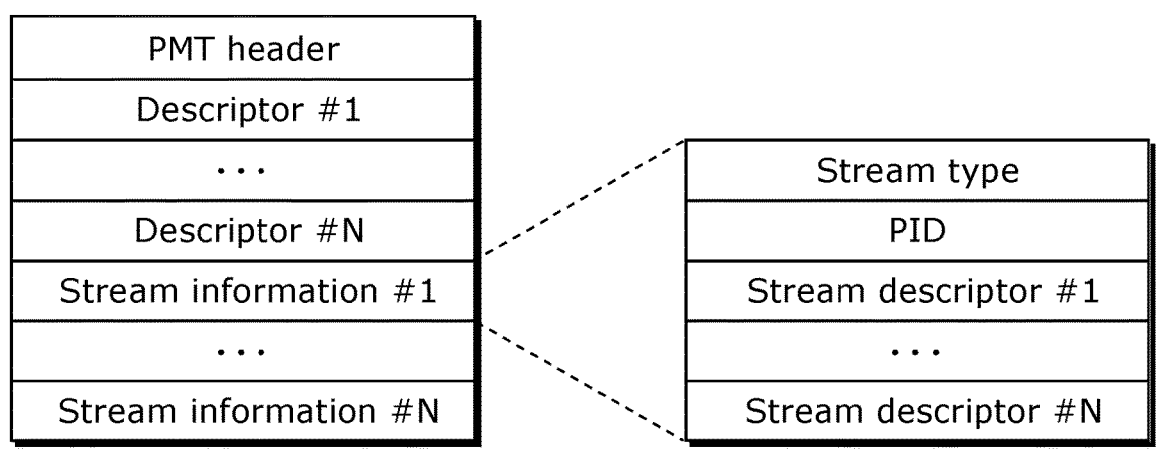
FIG. 38 illustrates a data structure of a PMT.

FIG. 38 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 39:
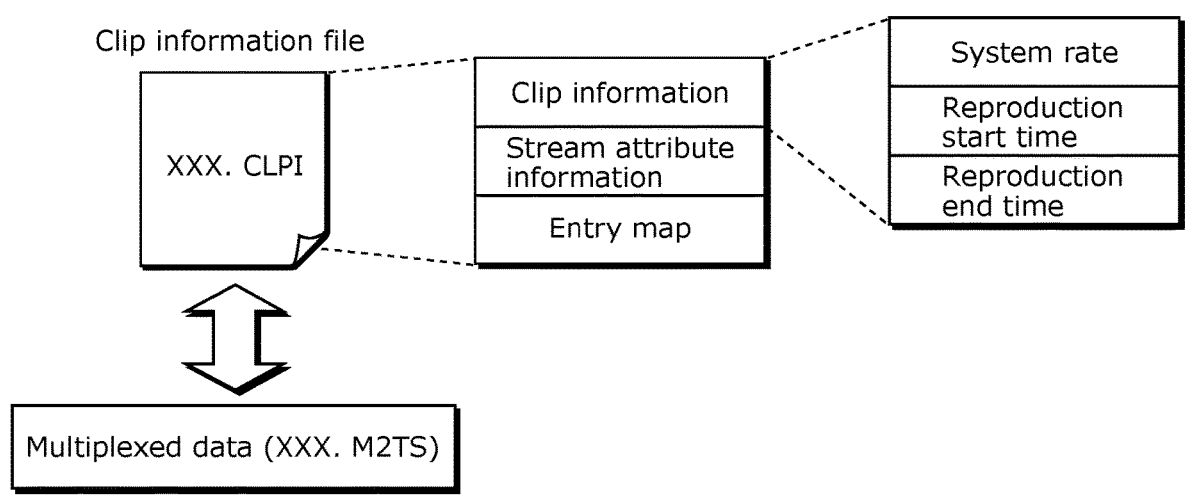
FIG. 39 shows an internal structure of multiplexed data information.

Each of the multiplexed data information files is management information of the multiplexed data as shown in FIG. 39. The multiplexed data information files are in one to one correspondence with the multiplexed data, and each of the files includes multiplexed data information, stream attribute information, and an entry map.

As illustrated in FIG. 39, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 40:
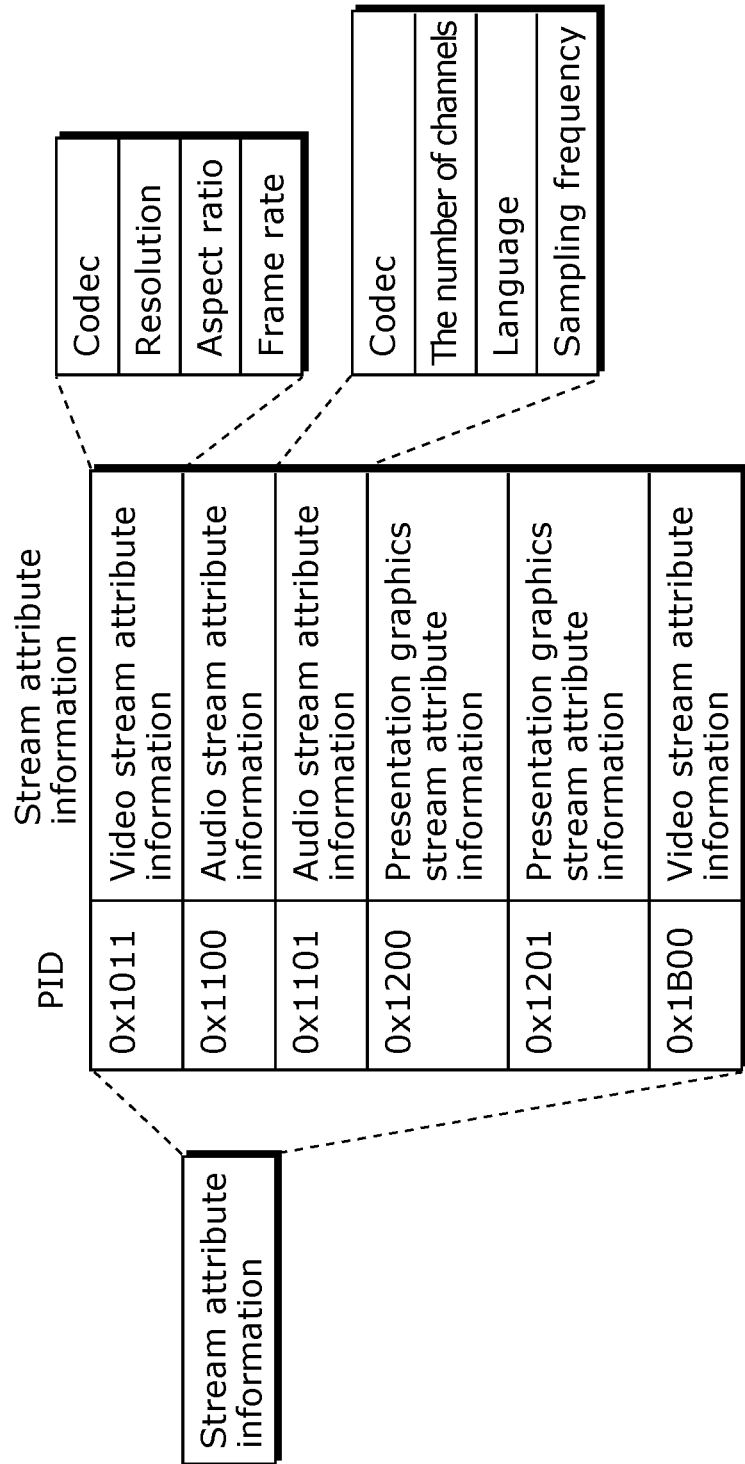
FIG. 40 shows an internal structure of stream attribute information.

As shown in FIG. 40, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 41:
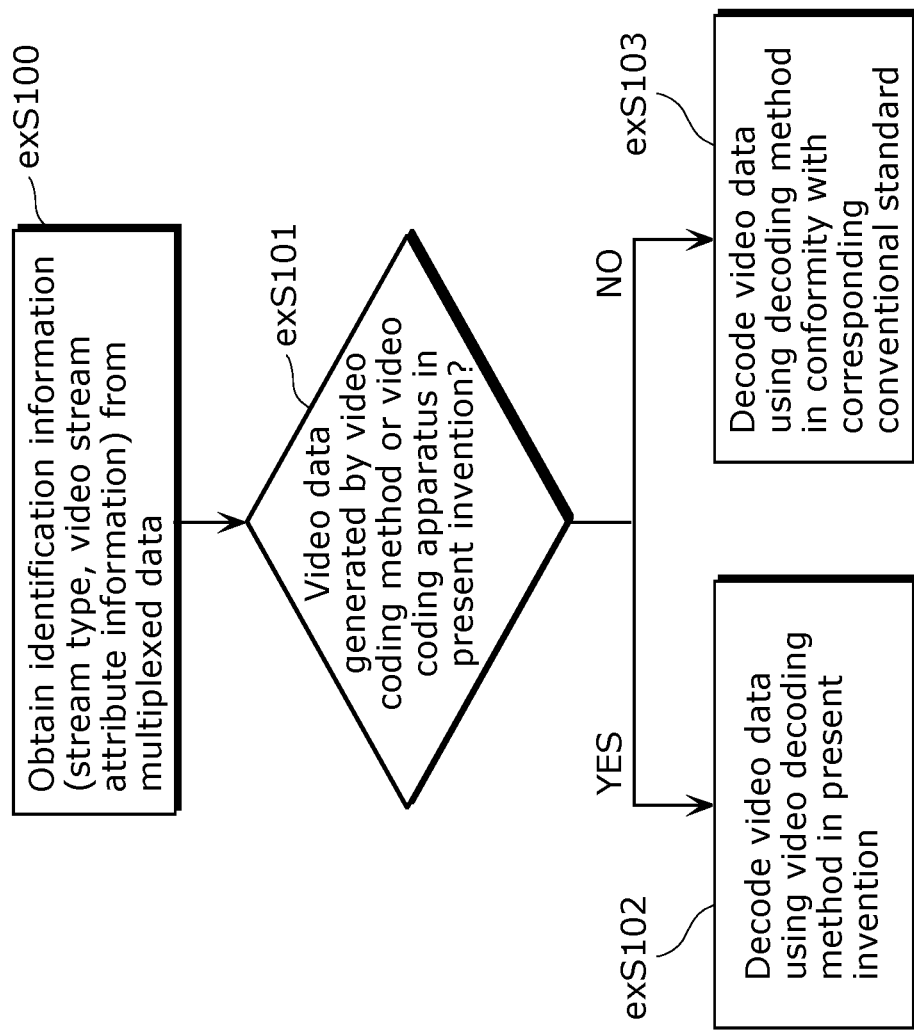
FIG. 41 shows steps for identifying video data.

Furthermore, FIG. 41 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 42:
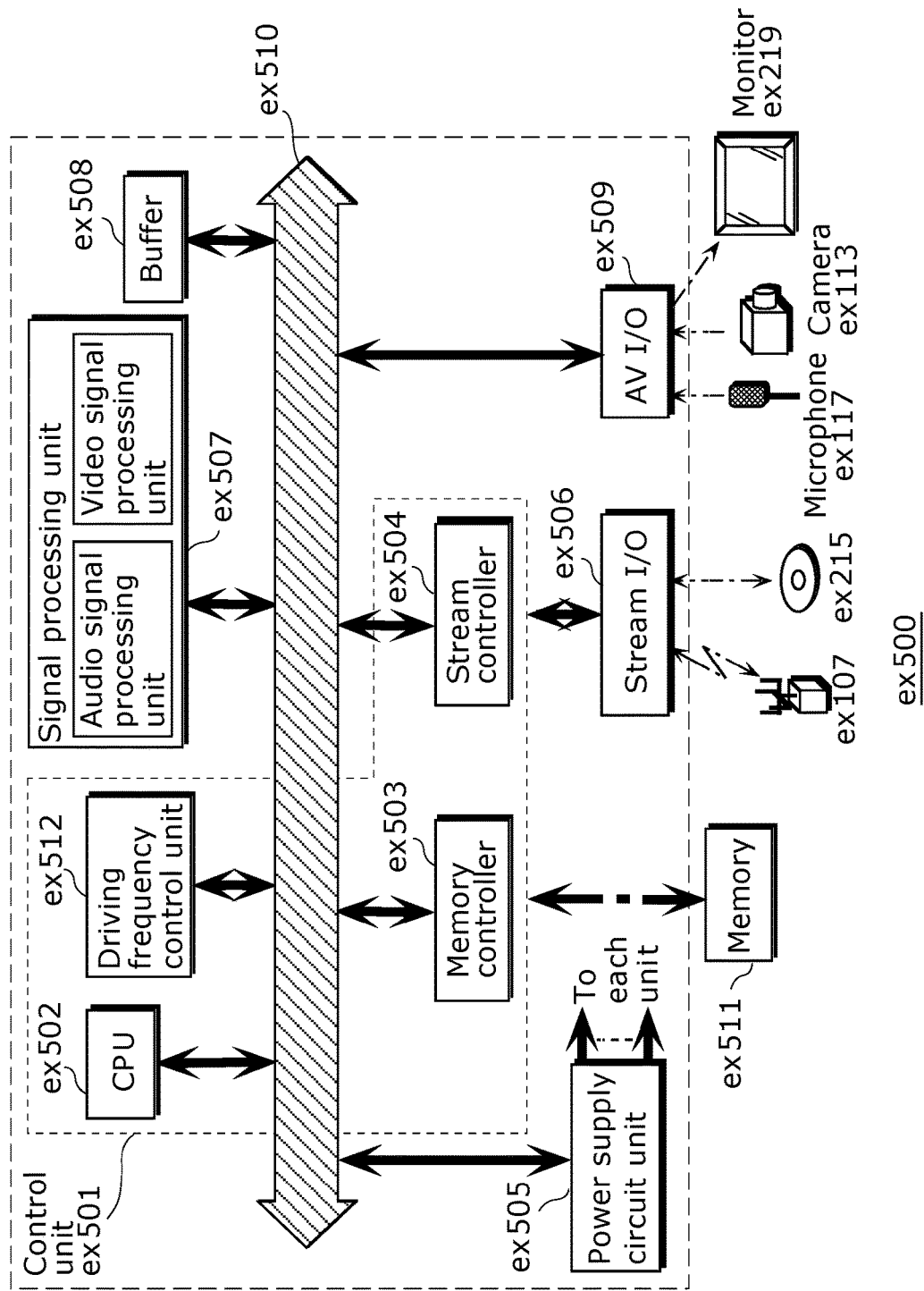
FIG. 42 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 42 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV JO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and the moving picture decoding method described in each of the embodiments, by loading or reading, from a memory, a program included in software or firmware.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 43:
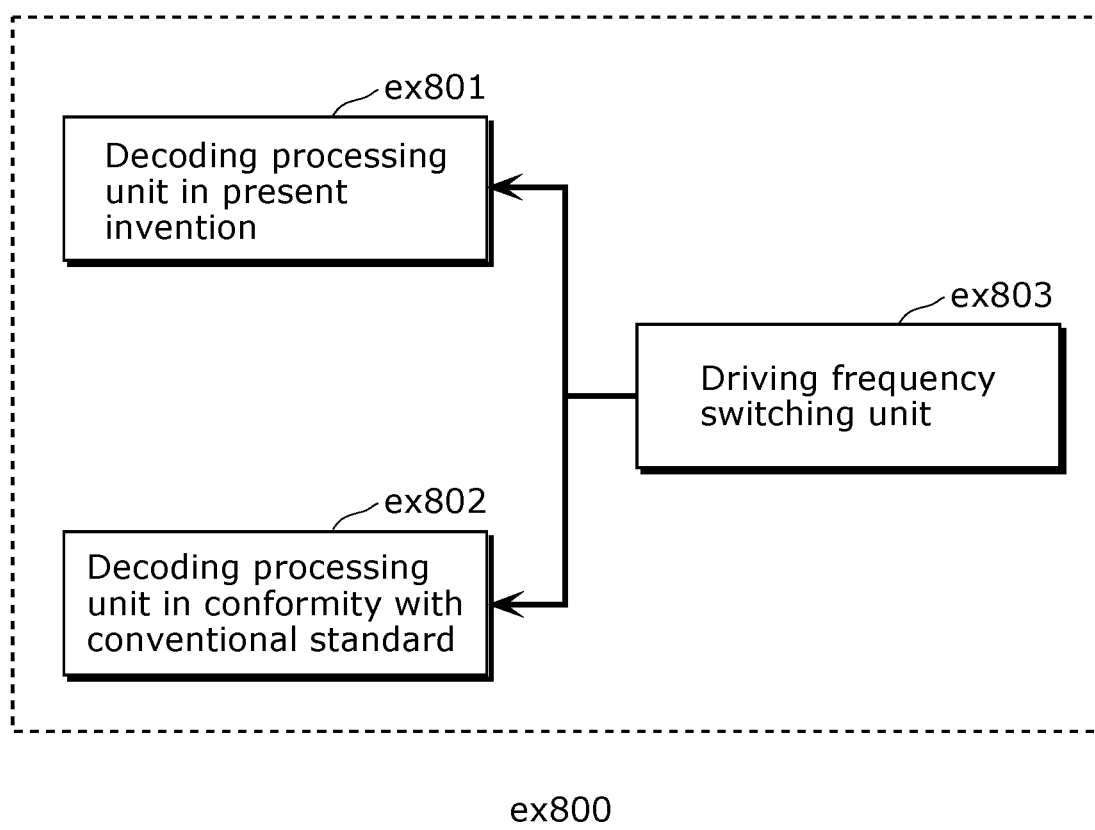
FIG. 43 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 43 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 42. Here, each of the decoding processing unit ex801 that executes the moving picture decoding method described in each of embodiments and the decoding processing unit ex802 that conforms to the conventional standard corresponds to the signal processing unit ex507 in FIG. 42. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 45. The driving frequency can be selected by storing the look-up table in the buffer ex508 and in an internal memory of an LSI, and with reference to the look-up table by the CPU ex502.

Figure 44:
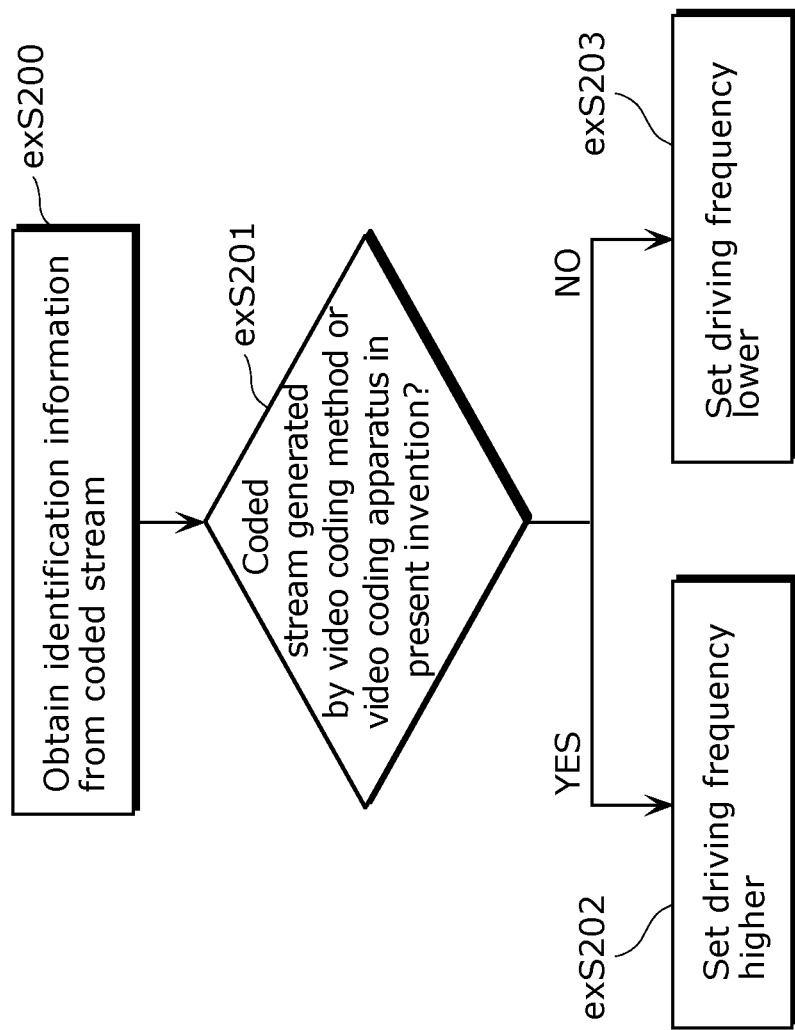
FIG. 44 shows steps for identifying video data and switching between driving frequencies.

FIG. 44 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 46A:
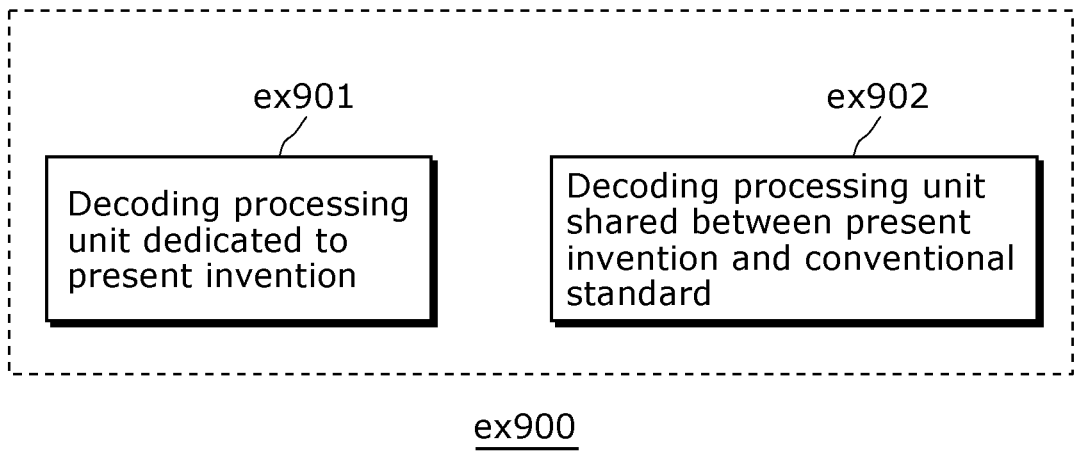
FIG. 46A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 46A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by partitioning of a picture in particular, for example, the dedicated decoding processing unit ex901 is used for the partitioning of a picture. Otherwise, the decoding processing unit is probably shared for one of the inverse quantization, entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 46B:
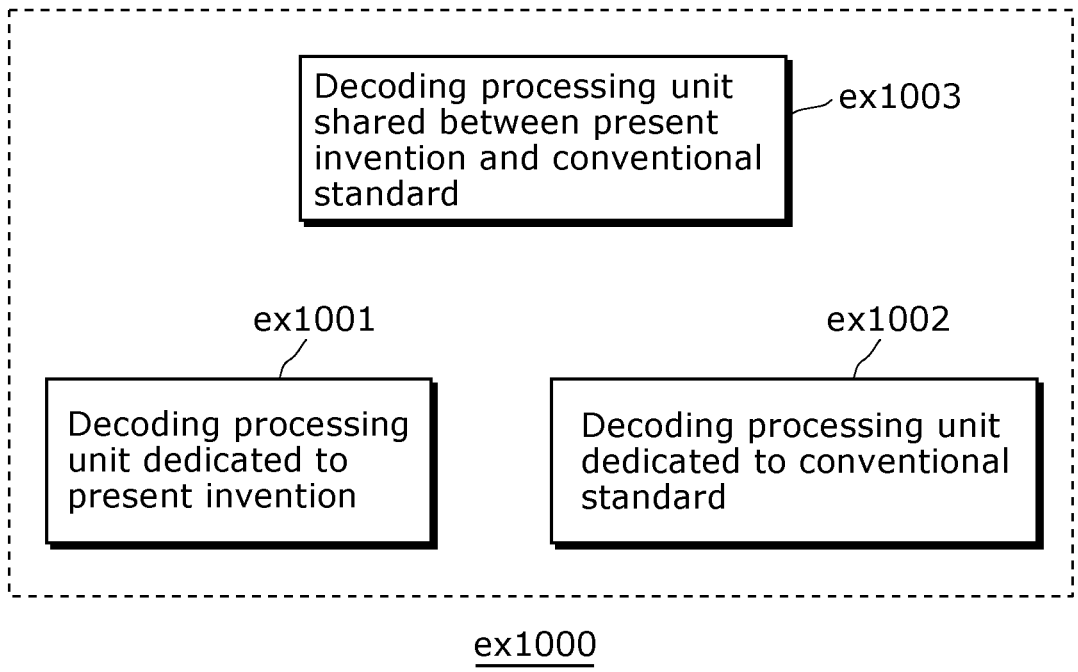
FIG. 46B is a diagram showing another example of a configuration for sharing a module of the signal processing unit.

Furthermore, ex1000 in FIG. 46B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The present disclosure can be applied to an image coding method, an image decoding method, an image coding apparatus, and an image decoding method. In addition, the present disclosure can be used for high-resolution information display devices and image-capturing devices which include image coding apparatuses, such as a television, a digital video recorder, a car navigation system, a cellular phone, a digital still camera, and a digital video camera.

The invention claimed is:

1. Circuitry for decoding a bitstream including a coded signal resulting from coding tiles and slices into which an image is partitioned, the circuitry executing operations comprising:
obtaining, from the bitstream, a restriction indicator indicating that partitioning of a picture is restricted; and
decoding the coded signal based on the restriction indicator,
wherein each of the slices is either a normal slice having, in a header, information used for an other slice or a dependent slice which is decoded using information included in a slice header of another slice,
when the normal slice starts from a position other than a beginning of a first tile, a second tile coded next to the first tile does not start from the dependent slice, and
each of the tiles is subdivided into an integer number of slices.

* * * * *

UNITED STATES PATENT AND TRADEMARK OFFICE
CERTIFICATE OF CORRECTION

| | | |
|---|---|---|
| PATENT NO. | : 10,992,944 B2 | Page 1 of 1 |
| APPLICATION NO. | : 16/506359 | |
| DATED | : April 27, 2021 | |
| INVENTOR(S) | : Esenlik et al. | |

It is certified that error appears in the above-identified patent and that said Letters Patent is hereby corrected as shown below:

On the Title Page

In Item (72), Line 1, "Semih Esenlik, Nazilli (FR); Matthias" should read --Semih Esenlik, Nazilli (TR); Matthias--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*